United States Patent
Spence et al.

(10) Patent No.: US 11,908,153 B2
(45) Date of Patent: Feb. 20, 2024

(54) SYSTEM AND METHOD OF MEASURING DISTANCES RELATED TO AN OBJECT UTILIZING ANCILLARY OBJECTS

(71) Applicant: WexEnergy Innovations LLC, Rochester, NY (US)

(72) Inventors: John Patrick Spence, Albany, NY (US); Ronald Myron Wexler, Rochester, NY (US)

(73) Assignee: WEXENERGY INNOVATIONS LLC, Rochester, NY (US)

( * ) Notice: Subject to any disclaimer, the term of this patent is extended or adjusted under 35 U.S.C. 154(b) by 0 days.

(21) Appl. No.: 17/238,296

(22) Filed: Apr. 23, 2021

(65) Prior Publication Data
US 2021/0334995 A1 Oct. 28, 2021

Related U.S. Application Data

(60) Provisional application No. 63/014,365, filed on Apr. 23, 2020.

(51) Int. Cl.
*G06K 9/00* (2022.01)
*G06T 7/60* (2017.01)
(Continued)

(52) U.S. Cl.
CPC .................. *G06T 7/60* (2013.01); *G06T 7/13* (2017.01); *G06T 7/50* (2017.01); *G06T 7/73* (2017.01);
(Continued)

(58) Field of Classification Search
CPC .... G06T 7/60; G06T 7/13; G06T 7/50; G06T 7/73; G06T 2207/10024; G06T 2207/20164; G06T 2207/30204
See application file for complete search history.

(56) References Cited

U.S. PATENT DOCUMENTS 7,293,368 B1 * 11/2007 Faulk .................. G01C 11/00
33/760
8,885,916 B1 * 11/2014 Maurer .................... G06T 7/60
348/137
(Continued)

FOREIGN PATENT DOCUMENTS

BR           PI0600506 A  * 11/2006
WO    WO-2019215638 A1 * 11/2019  ............. G01B 11/02

OTHER PUBLICATIONS

Automatic Calibration of an Industrial RGB-D Camera Network Using Retroreflective Fiducial Markers, Atle Aalerud et al, MPDI, Mar. 2019, pp. 1-24 (Year: 2019).*

(Continued)

*Primary Examiner* — Jayesh A Patel
(74) *Attorney, Agent, or Firm* — Troutman Pepper Hamilton Sanders LLP (Rochester)

(57) ABSTRACT

A system and method for measuring distances related to a target object depicted in an image. A captured digital image is obtained containing a scene with a target object whose dimension is to be measured. The digital image may contain a target object dimension identified by one or more ancillary objects and a reference object in the same or different planes. Image processing is performed to find the reference object using known fiducial patterns printed on the reference object, metadata supplied by a user and/or by the detection of colored papers in the scene of the captured image. Once located and measured, the reference object is used to calculate a pixel scale factor used to measure the target object dimensions. Target object dimensions are provided to an automated or semi-automated measurement process, design and manufacturing system such that customized parts for a supplemental fenestration are provided to end users.

18 Claims, 32 Drawing Sheets

(51) Int. Cl.
*G06T 7/50* (2017.01)
*G06T 7/73* (2017.01)
*G06T 7/13* (2017.01)

(52) U.S. Cl.
CPC ............. *G06T 2207/10024* (2013.01); *G06T 2207/20164* (2013.01); *G06T 2207/30204* (2013.01)

(56) References Cited

U.S. PATENT DOCUMENTS

| | | | | |
|---|---|---|---|---|
| 8,923,650 | B2* | 12/2014 | Wexler | G06V 10/48 |
| | | | | 382/286 |
| 9,230,339 | B2* | 1/2016 | Wexler | G01B 11/022 |
| 9,691,163 | B2* | 6/2017 | Wexler | G06T 7/62 |
| 10,346,999 | B2* | 7/2019 | Wexler | G06T 7/62 |
| 2014/0193039 | A1* | 7/2014 | Wexler | E06B 7/16 |
| | | | | 382/106 |
| 2014/0314276 | A1* | 10/2014 | Wexler | G06T 3/0012 |
| | | | | 382/103 |
| 2014/0334669 | A1 | 11/2014 | Acharya | |
| 2015/0116691 | A1 | 4/2015 | Likholyot | |
| 2016/0012611 | A1* | 1/2016 | Wexler | G06T 7/62 |
| | | | | 382/103 |
| 2017/0284799 | A1* | 10/2017 | Wexler | G06T 7/62 |
| 2020/0143453 | A1* | 5/2020 | Ripley | G06T 7/62 |
| 2020/0394820 | A1* | 12/2020 | Rohde | G01S 7/4972 |

OTHER PUBLICATIONS

Segmentation and Histogram Generation Using the HSV Color Space for Image Retrieval, Shamik Sural et al., IEEE, 2002, pp. II-589 to II-592 (Year: 2002).*
Understanding Color Models: A Review, Noor A. Ibraheem et al., ARPN, 2012, pp. 265-275 (Year: 2012).*
Detector of Traffic Signs with using Hue-Saturation-Value color model, Tomas Harasthy et al., ISSN, 2013, pp. 21-25 (Year: 2013).*
Interactive Color Image Segmentation using HSV Color Space, D. Hema et al., ISSN:2321-3388, 2019, pp. 37-41 (Year: 2019).*
Face detection techniques: a review, Ashu Kumar et al., Springer, Aug. 4, 2018, pp. 927-948 (Year: 2018).*
International Search Report and Written Opinion for PCT/US21/28751, dated Jul. 27, 2021.
International Preliminary Report on Patentability for PCT/US2021/028751, dated Oct. 25, 2022.

* cited by examiner

SYSTEM AND METHOD OF MEASURING DISTANCES RELATED TO AN OBJECT UTILIZING ANCILLARY OBJECTS This application claims the benefit of Provisional Application Ser. No. 63/014,365 filed Apr. 23, 2020, which is hereby incorporated by reference in its entirety.

FIELD

The present technology relates generally to image processing and in particular to a system and method for measuring the distances related to a target object depicted in an image utilizing ancillary objects and the construction and delivery of supplemental window materials for fenestration.

BACKGROUND

In recognition of the ecological and cost impact of fossil fuels and other conventional energy sources, significant effort has been expended in developing methods for more efficient use of such energy sources. An important area of energy use for which greater energy efficiency is needed is the heating and cooling of spaces in which human activity is desired. Many approaches have been developed to decrease the amount heat transfer through the shell of such spaces. One of the most active and important areas of activity is the transfer of energy through fenestration where the activity has included use of window films or inserts, increasing the number of window glazings per opening and window treatments such as drapes, blinds, etc. While these approaches have shown considerable improvement in building energy efficiency, significant problems prevent more widespread and effective utilization.

Several problems exist in the approaches to minimizing heat transfer through fenestration. In particular for existing windows, it is desirable to maintain the optical transparency of the window, operation of the window treatments (e.g., blinds) and windows and the aesthetics of the interior view of the window while providing thermal insulation. Furthermore, reuse of the insulating materials is highly desirable so that new materials do not need to be purchased each season. When adding supplemental window elements such as films, film support elements and window treatments, ease of installation (including measurement and fabrication), reusability and storage and aesthetics during and after use are very important while obtaining the thermal and radiation insulation desired. With window films intended for creating an additional "dead air" space adjacent to the window as well as window treatments, accurate measurement of the film dimensions is necessary, often requiring the assistance of a professional with the associated added cost and time. Other window films, such as tints, infrared or ultraviolet reflective or absorbing films, or low-e films, adhere directly to the windowpane and have similar issues. Additionally, with the wide acceptance of mobile device applications that enable window treatment aesthetic choices to be made using images, it is desirable to add image based measurement capability to such applications.

Because of their optical transparency, windows present challenges when attempting to make photogrammetric measurements during the daytime using image-based methods. For example, the outdoor scene viewed through a window can make identification of windowpane related features, such as pane to frame transitions or sash edges and corners, difficult. In addition, the outdoor scene viewed through the window and backlighting conditions can make location of objects located on the interior of the window used for photogrammetric measurements difficult to find using automated techniques.

SUMMARY

The present technology relates to a system and method for measuring the distances related to an object depicted in an image and the construction and delivery of supplemental window materials for fenestration. One example of the present technology provides a method of photogrammetric measurement in which a digital image is obtained that contains a target object dimension and a reference object dimension in substantially the same plane or line.

Another example of the present technology provides a method of photogrammetric measurement in which a digital image is obtained that contains a target object dimension identified by an ancillary object and a reference object dimension in different planes. Automation of examples of the present technology is facilitated by using fiducial patterns on reference and optional ancillary objects that are recognized by an image analysis algorithm.

A further example of the present technology provides use of digital image processing thresholding methods with images of fenestration in which the background area of the transparent portion of the fenestration has contrast relative to the fenestration components visible in the image adjacent to the transparent portion of the fenestration. In each example, a digital image undergoes digital image processing to provide improved measurement capability.

Another example of the present technology provides use of reference object features, fiducial patterns or ancillary objects having highly saturated colors. Such objects can be more easily found in a saturation image when the background area viewed through the transparent portion of the fenestration has inconsistent scene content relative to the fenestration components visible in the image adjacent to the transparent portion of the fenestration, or there is backlighting of the transparent portion of the fenestration.

A further example of the present technology provides use of digital image processing methods with images of fenestration in which the background area of the transparent portion of the fenestration has inconsistent scene content, as viewed through the transparent portion of the fenestration, and inconsistent illumination of non-transparent fenestration elements adjacent to the transparent portion of the fenestration where reference objects and/or ancillary objects are used to locate windowpane corners and/or edges.

Another example of the present technology provides use of reference objects and ancillary objects having optical transmittance characteristics such that reference object edges, fiducial patterns or other features on the reference object are detectable with automated or semi-automated methods under either front or back lighting conditions, or using both front and back lighting.

In examples of the present technology, information regarding a target object, such as fenestration, and its immediate surroundings is provided to an automated or semi-automated measurement process, design and manufacturing system such that customized parts are provided to end users. In one method of the present technology, a digital image is obtained that contains at least a portion of an observable constraint dimension to which a customized part is to conform wherein the digital image contains a reference object having a reference dimension and calculating a constraint dimension from the digital image based on a reference dimension. The custom part is then designed and manufactured based on a calculated constraint dimension.

Another example of the present technology provides an improved information gathering method and data extraction where the measurements used to design custom parts that meet the needs of the fenestration and user are obtained from photographic information, e.g., digital images. The customized parts may include materials that provide for thermal insulation, emissivity control, tinting, window treatments or mounting support for such materials.

The advantages of the system and method of measuring distances associated with fixed buildings, mobile homes, travel trailers and other habitations include the following.

The ease of specification of the supplemental element is improved for the end user. The involvement of the end user in specifying, fabricating and installing the supplemental element is minimized. The end user's involvement is relatively easy to perform so the end user does not require a professional and requires minimal time commitment. Further, when automated measurements are employed using image processing and metadata, such measurements may be easily associated and maintained with the specific fenestration location.

The accuracy of the automated measurement is relatively high. This relates to ease of use and removing the potential for end user error from the process. Utilization of easily obtained and ubiquitous objects, apparatus and materials in an automated process allows the process to provide accurate measurement of object dimensions. This is important for end user satisfaction and minimizing return of product. In addition, measurement accuracy allows for reduced cost and waste as well as ease of use.

The technology includes a capability for visual confirmation of designed parts and remote or customized support of end user installation. This relates to the ease with which a design may be confirmed by the end user prior to fabrication. Since the end user and service provider or fabricator may view the same image easily, any necessary correction to the design prior to fabrication is facilitated by the use of a digital image. In addition, the digital image may be used as part of remote installation support or customized media that may be used by the end user for each installation. This enhances end user satisfaction with the delivered product and minimizes waste of time and materials due to design error.

There is thus provided in accordance with the technology, a method of estimating at least one dimension of a target object within a digital image which includes a reference object and one or more pane ancillary objects for aiding in determining the dimension of the target object, the method comprising obtaining a digital image containing the target object, reference object and one or more pane ancillary objects, locating the reference object in the digital image, calculating a pixel scale factor based on both measured and known dimensions of the reference object, locating the one or more pane ancillary objects and a corner or edge thereof in the digital image, locating the target object in the digital image utilizing the corner or edge of one or more pane ancillary objects, and calculating the at least one dimension of the target object in accordance with the pixel scale factor.

The present technology further provides a method of estimating at least one dimension of a target object within a digital image that includes one or more reference objects having highly saturated color fiducial patterns and one or more pane ancillary objects having highly saturated color or highly saturated colored fiducial patterns for aiding in determining the dimension of the target object, the method comprising obtaining a digital image containing the target object, reference object and one or more pane ancillary objects, locating the reference object in the digital image, calculating a pixel scale factor based on both measured and known dimensions of the reference object, locating the one or more pane ancillary objects and a corner or edge thereof in the digital image, locating the target object in the digital image utilizing the corner or edge of one or more pane ancillary objects, and calculating the at least one dimension of the target object in accordance with the pixel scale factor.

There is also provided in accordance with the technology, a method of estimating at least one dimension of a target object within a digital image which includes one or more pane ancillary objects highly saturated color or highly saturated colored fiducial patterns for aiding in determining the dimension of the target object, the method comprising obtaining a digital image containing the target object and one or more pane ancillary objects, obtaining depth measurement using a light detection method, calculating a pixel scale factor using the depth measurement, locating the one or more pane ancillary objects and a corner or edge thereof in the digital image, locating the target object in the digital image utilizing the corner or edge of one or more pane ancillary objects, and calculating the at least one dimension of the target object in accordance with the pixel scale factor.

There is also provided in accordance with the technology, a method of determining the location of a target object corner of a target object within a digital image which includes one or more reference objects in which a reference object has a feature that is at a known location on the reference object relative to a corner or edge of the reference object that is placed at the corner of the target object, the target object corner or edge location obtained being used as a source corner or edge location for a perspective correction operation.

There is also provided in accordance with the technology, a method of providing simultaneous camera calibration and one or both of providing a reference object and/or an ancillary object, each of which is located in a target object corner of a target object within a digital image and located in an outer third of the digital image.

There is further provided in accordance with the technology, a method of determining the location of a target object corner of a target object within a digital image which includes one or more reference objects in which a reference object has a linear feature that is at a known location on the reference object relative to an edge of the reference object that is placed at the corner of the target object, a digital extension of the linear feature being used to locate a second target object corner or corner region of interest.

There is also provided in accordance with the technology, a method of estimating at least one dimension of a non-transparent target object captured within a digital image which includes a reference object for aiding in determining the dimension of the target object, the method comprising obtaining a digital image containing the target object, reference object, one or more adhering objects for affixing the reference object in substantially the same plane as the target object, and one or more contrast providing objects for providing background contrast between the reference object and the background adjacent to the edges of the reference object, locating the reference object in the digital image aided by at least one of (a) a known fiducial pattern printed on the reference object, (b) metadata indicating the approximate location of either the reference object or the one or more adhering objects, and (c) the location, color and/or visible shape of the one or more contrast providing objects, calculating a pixel scale factor based on both measured and known dimensions of the reference object, locating the target object in the digital image, and calculating the at least one dimension of the target object in accordance with the pixel scale factor.

There is further provided in accordance with the technology, a method of estimating at least one dimension of a target object within a digital image which includes a reference object and one or more ancillary objects for aiding in determining the dimension of the target object, the method comprising obtaining on a mobile device a digital image containing the target object, reference object and one or more ancillary objects, transmitting the digital image to a server in communication with the mobile device, and receiving from the server at least one dimension of the target object, the dimension obtained by locating the reference object in the digital image, calculating a pixel scale factor based on both measured and known dimensions of the reference object, locating the one or more ancillary objects and a corner or edge thereof in the digital image, locating the target object in the digital image utilizing the corner or edge of one or more ancillary objects, and calculating the at least one dimension of the target object in accordance with the pixel scale factor.

BRIEF DESCRIPTION OF THE DRAWINGS

The technology is herein described, by way of example only, with reference to the accompanying drawings, wherein.

DETAILED DESCRIPTION

Figure 1:
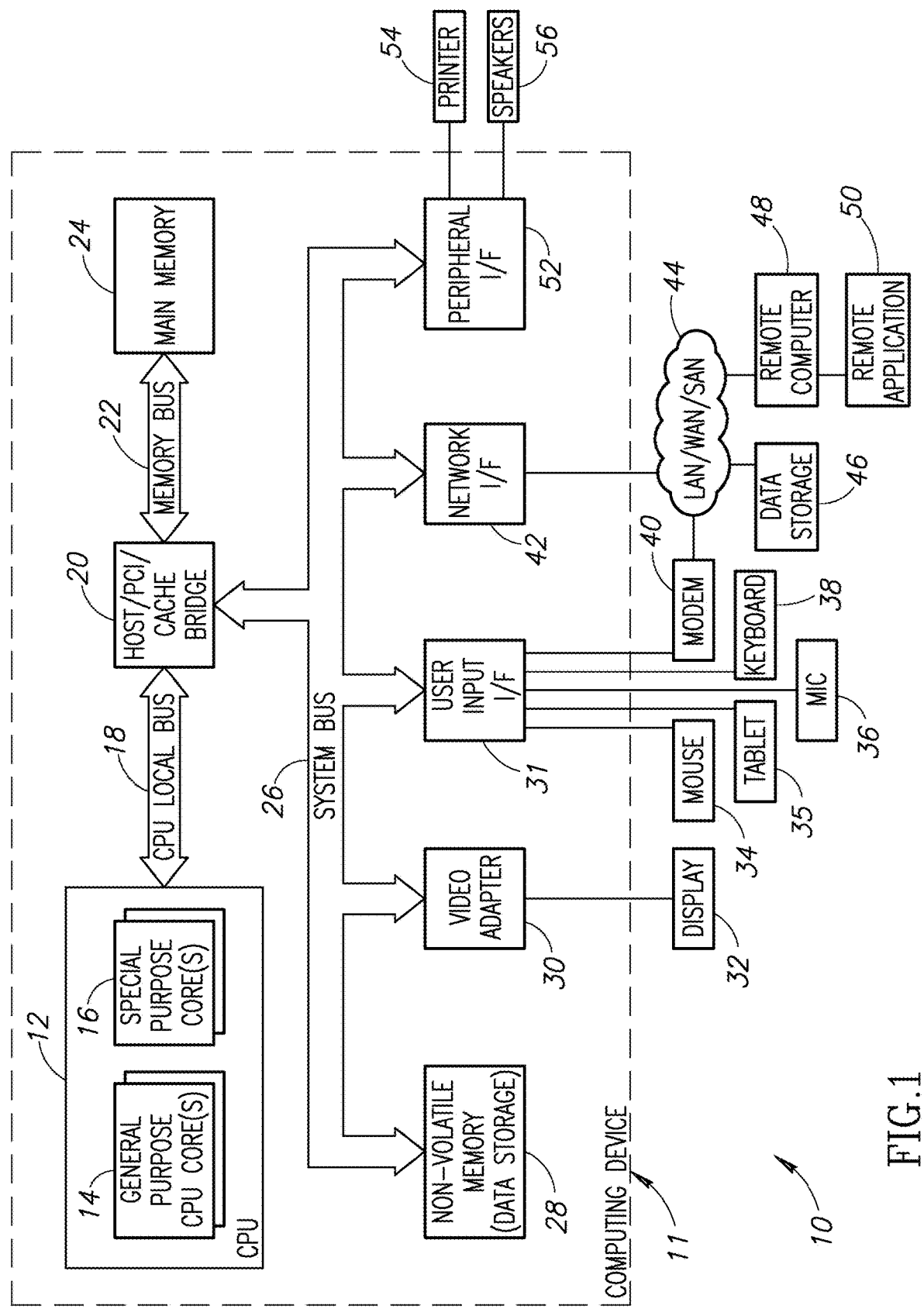
FIG. 1 is a block diagram illustrating an example computer processing system adapted to implement the measurement and image processing mechanism of the present technology.

The present technology provides a system and method for the measurement of distances related to a target object depicted in an image and the construction and delivery of supplemental materials and parts for fenestration. One example of the technology includes a method of photogrammetric measurement in which a digital image is obtained that contains a target object dimension and a reference object dimension in substantially the same plane or line. The digital image then undergoes digital image processing to provide improved measurement capability. In examples of the present technology, information regarding a target object, such as fenestration, and its immediate surroundings is provided to an automated or semi-automated measurement process, design and manufacturing system such that customized materials and parts are provided to end users.

In one method of the present technology, a digital image is obtained that contains at least a portion of an observable constraint dimension to which a customized part conforms wherein the digital image contains a reference object having a reference dimension. A constraint dimension is then calculated from the digital image based on a reference dimension. The custom part is then designed and manufactured based on a calculated constraint dimension.

As will be appreciated by one skilled in the art, one or more examples of the present technology may be embodied as a system, method, computer program product or any combination thereof. Accordingly, the present technology may take the form of an entirely hardware example, an entirely software example (including firmware, resident software, micro-code, etc.) or an example combining software and hardware aspects that may all generally be referred to herein as a "circuit," "module" or "system." Furthermore, the present technology may take the form of a computer program product embodied in any tangible medium of expression having computer usable program code embodied in the medium.

The technology or portions thereof may be described in the general context of computer-executable instructions, such as program modules, being executed by a computer. Generally, program modules include routines, programs, objects, components, data structures, etc., that perform particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CDROM), optical storage device or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present technology may be written in any combination of one or more programming languages, including an object oriented programming language such as Java, Smalltalk, Swift, C++, C#or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present technology is described below with reference to flowchart illustrations and/or block diagrams of methods, apparatus (systems) and computer program products according to examples of the technology. It will be understood that each block of the flowchart illustrations and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The technology is operational with numerous general purpose or special purpose computing system environments or configurations. Examples of well-known computing systems, environments, and/or configurations that may be suitable for use with the technology include, but are not limited to, personal computers, server computers, cloud computing, hand-held or laptop devices, multiprocessor systems, microprocessor, microcontroller or microcomputer based systems, set top boxes, programmable consumer electronics, ASIC or FPGA core, DSP core, network PCs, minicomputers, mainframe computers, distributed computing environments that include any of the above systems or devices, and the like.

A block diagram illustrating an example computer processing system adapted to implement the distance measurement and image processing mechanism of the present technology is shown in FIG. 1. The exemplary computer processing system, generally referenced 10, for implementing the technology comprises a general purpose computing device 11. Computing device 11 comprises central processing unit (CPU) 12, host/PCI/cache bridge 20 and main memory 24.

The CPU 12 comprises one or more general purpose CPU cores 14 and optionally one or more special purpose cores 16 (e.g., DSP core, floating point, etc.). The one or more general purpose cores execute general purpose opcodes while the special purpose cores executes functions specific to their purpose. The CPU 12 is coupled through the CPU local bus 18 to a host/PCI/cache bridge or chipset 20. A second level (i.e. L2) cache memory (not shown) may be coupled to a cache controller in the chipset. For some processors, the external cache may comprise an L1 or first level cache. The bridge or chipset 20 couples to main memory 24 via memory bus 22. The main memory comprises dynamic random access memory (DRAM) or extended data out (EDO) memory, or other types of memory such as ROM, static RAM, flash, and non-volatile static random access memory (NVSRAM), bubble memory, etc.

The computing device 11 also comprises various system components coupled to the CPU via system bus 26 (e.g., PCI). The host/PCI/cache bridge or chipset 20 interfaces to the system bus 26, such as peripheral component interconnect (PCI) bus. The system bus 26 may comprise any of several types of well-known bus structures using any of a variety of bus architectures. Example architectures include Industry Standard Architecture (ISA) bus, Micro Channel Architecture (MCA) bus, Enhanced ISA (EISA) bus, Video Electronics Standards Associate (VESA) local bus and Peripheral Component Interconnect (PCI) also known as Mezzanine bus.

Various components connected to the system bus include, but are not limited to, non-volatile memory (e.g., disk based data storage) 28, video/graphics adapter 30 connected to display 32, user input interface (I/F) controller 31 connected to one or more input devices such mouse 34, tablet 35, microphone 36, keyboard 38 and modem 40, network interface controller 42, peripheral interface controller 52 connected to one or more external peripherals such as printer 54 and speakers 56. The network interface controller 42 is coupled to one or more devices, such as data storage 46, remote computer 48 running one or more remote applications 50, via a network 44 which may comprise the Internet cloud, a local area network (LAN), wide area network (WAN), storage area network (SAN), etc. A small computer systems interface (SCSI) adapter (not shown) may also be coupled to the system bus. The SCSI adapter can couple to various SCSI devices such as a CD-ROM drive, tape drive, etc.

The non-volatile memory 28 may include various removable/non-removable, volatile/nonvolatile computer storage media, such as hard disk drives that reads from or writes to non-removable, nonvolatile magnetic media, a magnetic disk drive that reads from or writes to a removable, nonvolatile magnetic disk, an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

A user may enter commands and information into the computer through input devices connected to the user input interface 31. Examples of input devices include a keyboard and pointing device, mouse, trackball or touch pad. Other input devices may include a microphone, joystick, game pad, satellite dish, scanner, etc.

The computer 11 may operate in a networked environment via connections to one or more remote computers, such as a remote computer 48. The remote computer may comprise a personal computer (PC), server, router, network PC, peer device or other common network node, and typically includes many or all of the elements described supra. Such networking environments are commonplace in offices, enterprise-wide computer networks, intranets and the Internet.

When used in a LAN networking environment, the computer 11 is connected to the LAN 44 via network interface 42. When used in a WAN networking environment, the computer 11 includes a modem 40 or other means for establishing communications over the WAN, such as the Internet. The modem 40, which may be internal or external, is connected to the system bus 26 via user input interface 31, or other appropriate mechanism.

The computing system environment, generally referenced 10, is an example of a suitable computing environment and is not intended to suggest any limitation as to the scope of use or functionality of the technology. Neither should the computing environment be interpreted as having any dependency or requirement relating to any one or combination of components illustrated in the exemplary operating environment.

In one example, the software adapted to implement the system and methods of the present technology can also reside in the cloud. Cloud computing provides computation, software, data access and storage services that do not require end-user knowledge of the physical location and configuration of the system that delivers the services. Cloud computing encompasses any subscription-based or pay-per-use service and typically involves provisioning of dynamically scalable and often virtualized resources. Cloud computing providers deliver applications via the internet, which can be accessed from a web browser, while the business software and data are stored on servers at a remote location.

In another example, software adapted to implement the system and methods of the present technology is adapted to reside on a tangible, non-transitory computer readable medium. Computer readable media can be any available media that can be accessed by the computer and capable of storing for later reading by a computer a computer program implementing the method of this technology. Computer readable media includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data such as a magnetic disk within a disk drive unit. The software adapted to implement the system and methods of the present technology may also reside, in whole or in part, in the static or dynamic main memories or in firmware within the processor of the computer system (i.e. within microcontroller, microprocessor or microcomputer internal memory).

Other digital computer system configurations can also be employed to implement the system and methods of the present technology, and to the extent that a particular system configuration is capable of implementing the system and methods of this technology, it is equivalent to the representative digital computer system of FIG. 1 and within the spirit and scope of this technology.

Once they are programmed to perform particular functions pursuant to instructions from program software that implements the system and methods of this technology, such digital computer systems in effect become special purpose computers particular to the method of this technology. The techniques necessary for this are well known to those skilled in the art of computer systems.

It is noted that computer programs implementing the system and methods of this technology will commonly be distributed to users via Internet download or on a distribution medium such as floppy disk, CDROM, DVD, flash memory, portable hard disk drive, etc. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this technology. All these operations are well known to those skilled in the art of computer systems.

The flowchart and block diagrams in the Figures illustrate the architecture, functionality, and operation of possible implementations of systems, methods and computer program products according to various examples of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

One or more of the image processing techniques described herein may be performed using machine learning models. The machine learning models may be trained based on a training data set including various images including reference objects. In one example, the machine learning model is a neural network, such as an artificial or convolutional neural network, although other types of neural networks or machine learning models can also be used in other examples. In one example, the neural network is a fully convolutional neural network. In other examples, other machine learning models may be employed for the image processing, such as decision trees; instant-based learning, Bayesian methods, reinforcement learning, inductive logic programming, or support vector machines. One skilled in the art will understand that various machine learning models could be employed and the present technology is not limited thereby.

Figure 2:
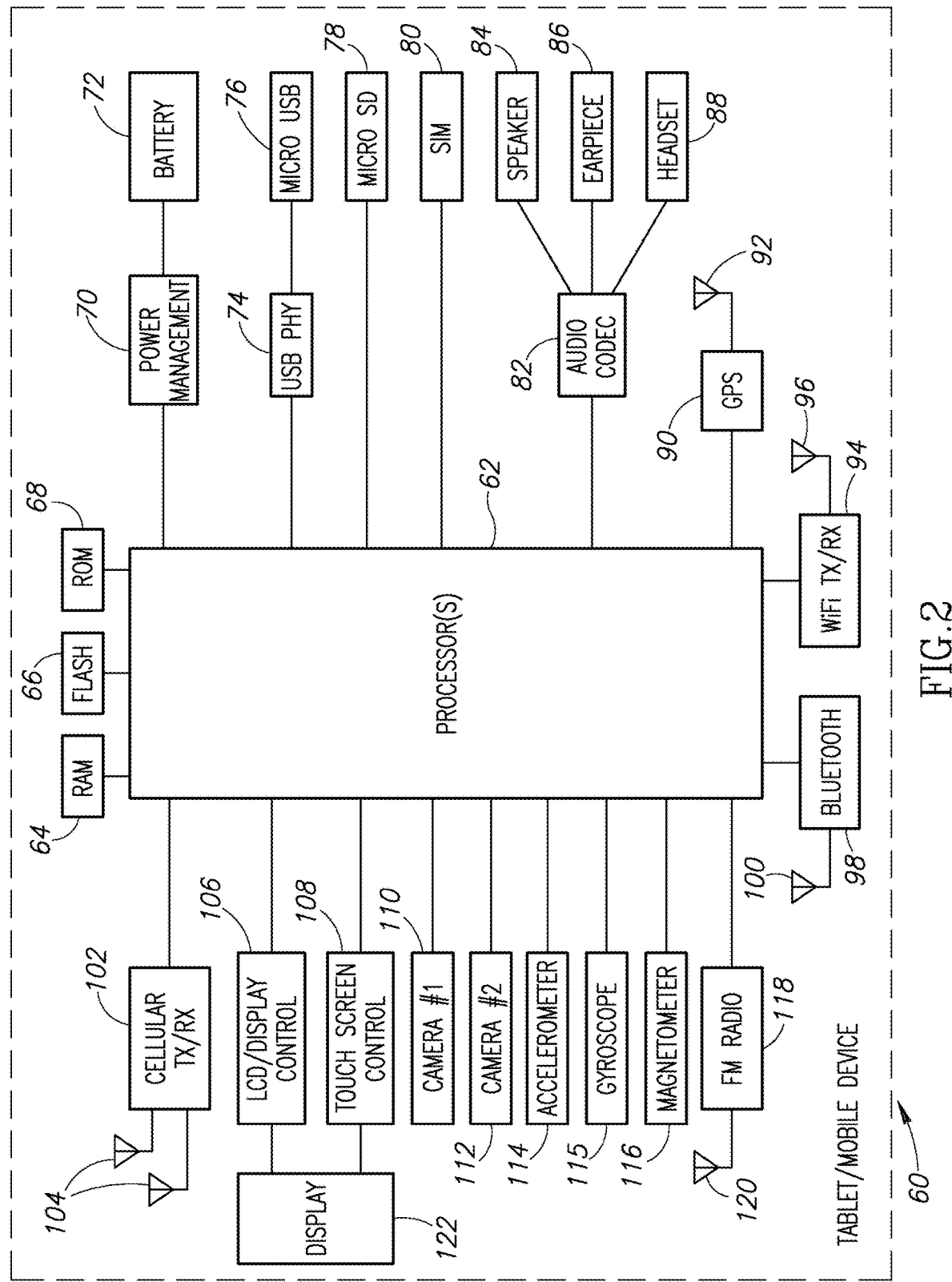
FIG. 2 is a high level block diagram illustrating an example tablet/mobile device incorporating the measurement and image processing mechanism of the present technology.

Tablet/Mobile Device Incorporating the Mechanism for Measuring the Distances Related to a Target Object A high-level block diagram illustrating an example tablet/mobile device incorporating the distance measuring mechanism of the present technology is shown in FIG. 2. The mobile device is preferably a two-way communication device having voice and/or data communication capabilities. In addition, the device optionally has the capability to communicate with other computer systems via the Internet. Note that the mobile device may comprise any suitable wired or wireless device such as multimedia player, mobile communication device, digital still or video camera, cellular phone, smartphone, iPhone, PDA, PNA, Bluetooth device, tablet computing device such as the iPad or other iOS device, Android device, Surface, Nexus, Google Glass, etc. For illustration purposes only, the device is shown as a mobile device, such as a cellular based telephone, smartphone or superphone. Note that this example is not intended to limit the scope of the mechanism as the technology can be implemented in a wide variety of communication devices. It is further appreciated the mobile device shown is intentionally simplified to illustrate only certain components, as the mobile device may comprise other components and subsystems beyond those shown.

The mobile device, generally referenced 60, comprises one or more processors 62 which may comprise a baseband processor, CPU, microprocessor, DSP, etc., optionally having both analog and digital portions. The mobile device may comprise a plurality of cellular radios 102 and associated antennas 104. Radios for the basic cellular link and any number of other wireless standards and Radio Access Technologies (RATs) may be included. Examples include, but are not limited to, Code Division Multiple Access (CDMA), Personal Communication Services (PCS), Global System for Mobile Communication (GSM)/GPRS/EDGE 3G; WCDMA; WiMAX for providing WiMAX wireless connectivity when within the range of a WiMAX wireless network; Bluetooth for providing Bluetooth wireless connectivity when within the range of a Bluetooth wireless network; WLAN for providing wireless connectivity when in a hot spot or within the range of an ad hoc, infrastructure or mesh based wireless LAN (WLAN) network; near field communications; UWB; GPS receiver for receiving GPS radio signals transmitted from one or more orbiting GPS satellites, FM transceiver provides the user the ability to listen to FM broadcasts as well as the ability to transmit audio over an unused FM station at low power, such as for playback over a car or home stereo system having an FM receiver, digital broadcast television, etc.

The mobile device may also comprise internal volatile storage 64 (e.g., RAM) and persistent storage 68 (e.g., ROM) and flash memory 66. Persistent storage 68 also stores applications executable by processor(s) 62 including the related data files used by those applications to allow device 60 to perform its intended functions. Several optional user-interface devices include trackball/thumbwheel which may comprise a depressible thumbwheel/trackball that is used for navigation, selection of menu choices and confirmation of action, keypad/keyboard such as arranged in QWERTY fashion for entering alphanumeric data and a numeric keypad for entering dialing digits and for other controls and inputs (the keyboard may also contain symbol, function and command keys such as a phone send/end key, a menu key and an escape key), headset 88, earpiece 86 and/or speaker 84, microphone(s) and associated audio codec 82 or other multimedia codecs, vibrator for alerting a user, one or more cameras and related circuitry 110, 112, display(s) 122 and associated display controller 106 and touchscreen control 108. Serial ports include a micro USB port 76 and related USB PHY 74 and micro SD port 78. Other interface connections may include SPI, SDIO, PCI, USB, etc. for providing a serial link to a user's PC or other device. SIM/RUIM card 80 provides the interface to a user's SIM or RUIM card for storing user data such as address book entries, user identification, etc.

Portable power is provided by the battery 72 coupled to power management circuitry 70. External power is provided via USB power or an AC/DC adapter connected to the power management circuitry that is operative to manage the charging and discharging of the battery. In addition to a battery and AC/DC external power source, additional optional power sources each with its own power limitations, include: a speaker phone, DC/DC power source, and any bus powered power source (e.g., USB device in bus powered mode).

Operating system software executed by the processor 62 is preferably stored in persistent storage (i.e. ROM 68), or flash memory 66, but may be stored in other types of memory devices. In addition, system software, specific device applications, or parts thereof, may be temporarily loaded into volatile storage 64, such as random access memory (RAM). Communications signals received by the mobile device may also be stored in the RAM.

The processor 62, in addition to its operating system functions, enables execution of software applications on the device 60. A predetermined set of applications that control basic device operations, such as data and voice communications, may be installed during manufacture. Additional applications (or apps) may be downloaded from the Internet and installed in memory for execution on the processor. Alternatively, software may be downloaded via any other suitable protocol, such as SDIO, USB, network server, etc.

Other components of the mobile device include an accelerometer 114 for detecting motion and orientation of the device, gyroscope 115 for measuring or maintaining orientation, magnetometer 116 for detecting the earth's magnetic field, FM radio 118 and antenna 120, Bluetooth radio 98 and antenna 100, Wi-Fi radio 94 including antenna 96 and GPS 90 and antenna 92.

In accordance with the technology, the mobile device 60 is adapted to implement the distance measurement and image processing mechanism as hardware, software or as a combination of hardware and software. In one example, implemented as a software task, the program code operative to implement the distance measurement and image processing mechanism is executed as one or more tasks running on processor 62 and either (1) stored in one or more memories 64, 66, 68 or (2) stored in local memory within the processor 62 itself.

Figure 3:
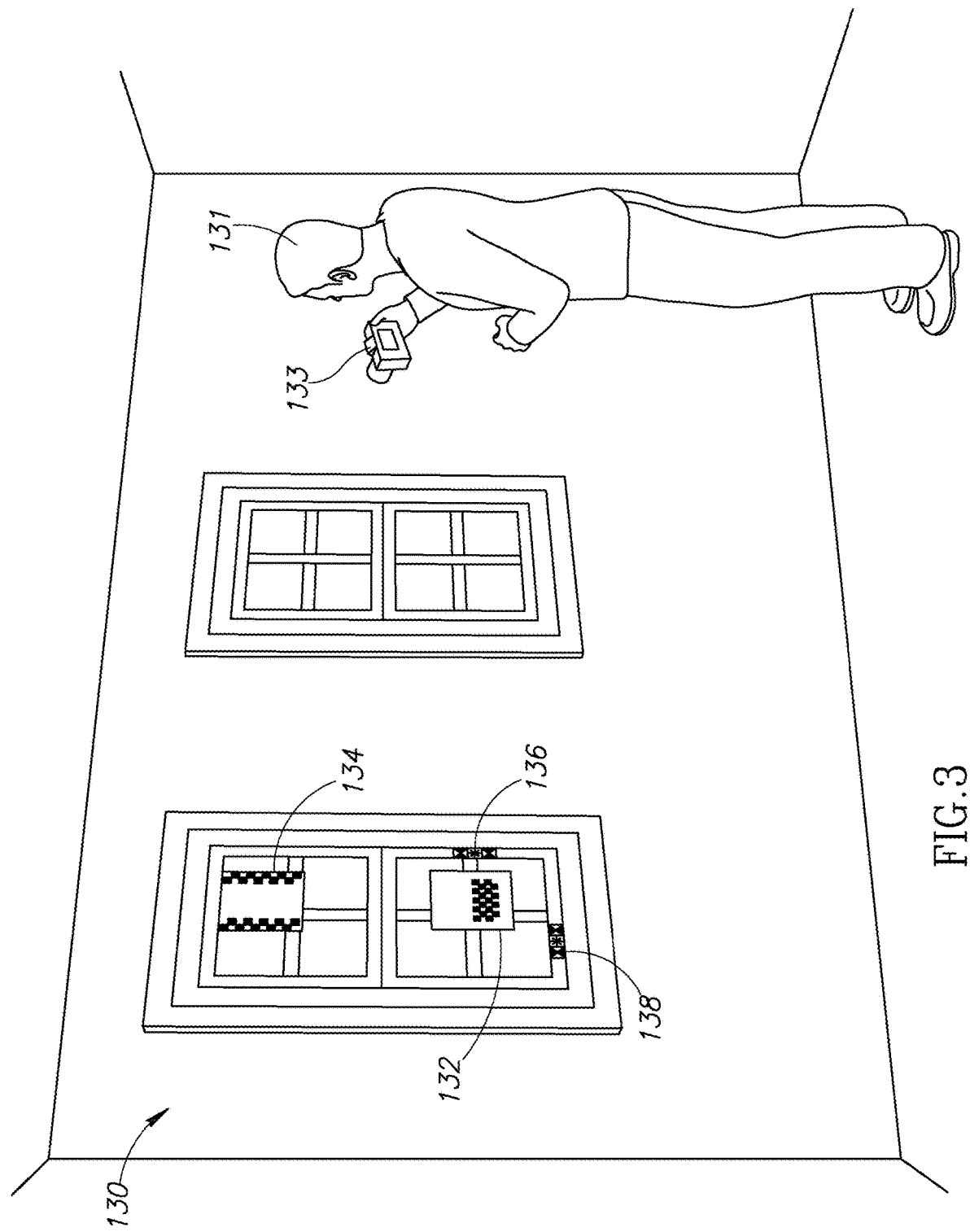
FIG. 3 is a block diagram illustrating an example room in which an end user obtains a digital image of sample window.

Measurement of Distances Related to a Target Object and Related Image Processing System A block diagram illustrating an example room in which an end user obtains a digital image of sample window is shown in FIG. 3. The distance measurement mechanism enables the automatic measurement of dimensions for a window part from a digital image of the window that includes a reference object in substantially the same plane as the constraint dimension associated with the window. The end user 131 takes a photograph, using a digital image acquisition device such as digital camera 133, which includes a window 130 and the reference object 132. Knowledge of the reference object dimensions is used to calculate any dimensions needed for fabrication of one or more parts for fenestration. The image processing calculations may be performed on the digital image acquisition device such as a smartphone or tablet with built-in camera, on an end user's PC, an external website or any other computing device after the image is uploaded to it.

Also shown in FIG. 3 are one or more ancillary objects placed on the window. Ancillary objects 136 and 138 are typically placed on the window sash or frame and function to aid in demarcating points for measurement. Another ancillary object 134 is placed at the top of the window and function to aid in determining the location of the top edges of the window when a window treatment (e.g., blind) is installed on the window.

Figure 4:
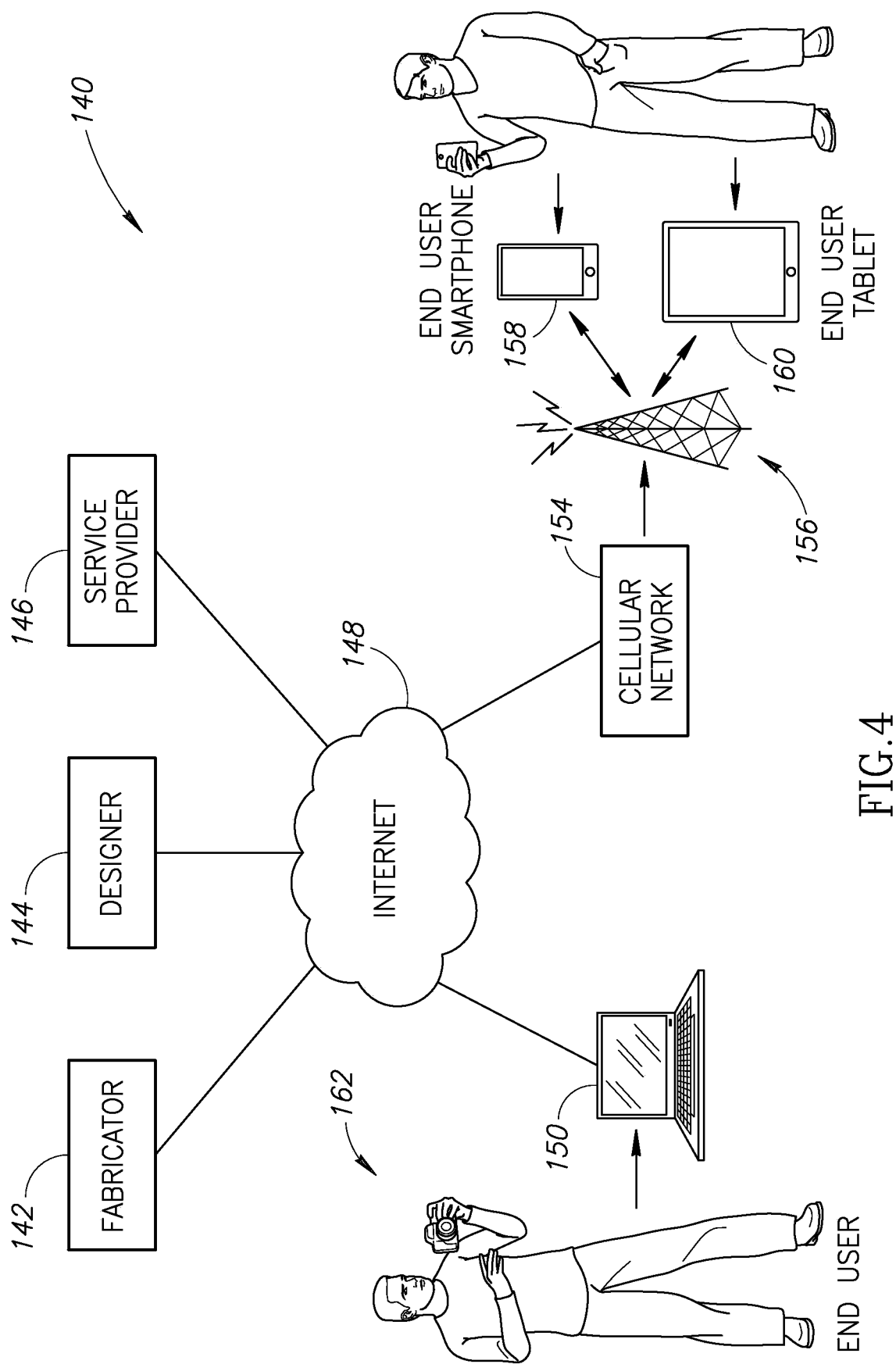
FIG. 4 is a block diagram illustrating an example network showing the data flow between fabricator, designer, service provider and end user.

A block diagram illustrating an example network showing the data flow between fabricator, designer, service provider and end user is shown in FIG. 4. The network, generally referenced 140, comprises an end user 162, PC or other computing device 150 connected to the Internet or other wide area network 148, fabricator 142, designer 144 and service provider 146. End users may also be connected, for example, via smartphone 158 running an appropriate application (i.e. app) or a tablet device 160 running an appropriate app. Both the smartphone and tablet are connected to the internet via cellular base stations 156 and the cellular network 154. Note that the tablet and smartphone may be connected to the Internet through Wi-Fi to an access point that is connected to the Internet.

End users communicate with the fabricator, designer and service provider via the Internet and connect via any number of devices such as a tablet (e.g., iPad device, Android device, Surface, Nexus, etc.) connected via Wi-Fi or through a cellular connection, desktop/laptop (via wired or wireless connection) computer, mobile device such as a smartphone or cellular enabled wireless tablet both in communication with the fabricator, designer and service provider via cellular network (e.g., 3G, 4G, etc.) including base stations.

The fenestration measurement and image processing mechanism provides the capability of accurately measuring and determining the dimensions of one or more parts from a digital image. The system is intended for use on any computer system such as desktop computers, laptop computers, notebook computers, netbook computers, ultrabook computers, wireless mobile devices, mobile phones, tablets, iOS devices, Android devices, Firefox OS devices, etc. It is however, especially applicable for use on tablets and mobile devices such as the Apple iPad, Android based tablets such as Google Nexus, Microsoft Windows tablets such as the Surface and other tablet formats or smartphones such as the Apple iPhone, Android based smartphones or Windows based smartphones.

Throughout this document the term "website" is used to refer to a user-accessible network site that implements the basic World Wide Web standards for the coding and transmission of hypertext documents. These standards currently include HTML (the hypertext markup language) and HTTP (the hypertext transfer protocol). Note that the term "site" is not intended to imply a single geographic location as a website or other network site can, for example, include multiple geographically distributed computer systems that are appropriately linked together.

It is to be understood that elements not specifically shown or described herein may take various forms well known to those skilled in the art. Figures provided herein are given to show overall function, operation, and relationships and are not drawn with the intention of showing components or elements to scale. It is also to be understood that while the figures and descriptions provided relate to windows and modifications to windows, the method of the present technology may be used in the design, fabrication or specification of any objects meant to work with, within or to replace a target object having one dimension that is substantially smaller than the other two dimensions or having a substantially planar face.

Various terms are used in the art to describe aspects of fenestration and windows in particular. In describing the present technology, the term "window" may refer to a single frame, one or more frames within a complex or an entire complex frame. A "complex" frame refers to multiple windowpanes within the same frame. In describing the present technology, the terms "interior" and "exterior" are used to describe the indoor side and outdoor side, respectively, relative to a perimeter wall in which the fenestration resides. "Inward" and "outward" facing refers to frame surfaces perpendicular to the perimeter wall plane facing toward or away from, respectively, the center of the fenestration.

The term "overlay" is defined as designed to cover an interior or exterior side of a windowpane using as support surfaces such as sash, interior facing trim casing or wall surfaces and includes surfaces that may reside between a screen and windowpane of, for example, casement or awning windows. The term "in-frame" is defined as designed to cover an interior or exterior side of a windowpane using for support surfaces of, for example, jambs or jamb liners, sash channels, stops or inward facing surfaces of trim casing.

The terms "supplemental part" or "supplemental element" are defined as an article that is designed for use with a target object. Non-limiting examples of supplemental parts may include window treatments, films, overlays or inserts that enhance the aesthetics, light control, or heat transfer of windows, or may also include paint, wallpaper, cabinets, shelving, frames or furniture.

The term "sealing interface" is used to describe a visible portion of a window, that may be reversibly opened and closed, at which reversible substantial sealing occurs, when viewed from either the interior or exterior.

The terms "automated", "semi-automated" and "manual" are used to describe different degrees of human intervention in a process by an end-user, professional or service provider. "Manual" refers to a process performed entirely by a human; "automated" refers to a process performed entirely by computational or other electronic devices; and "semi-automated" refers to a process involving computational or other electronic devices with human intervention at a point in the process.

Note that various people or entities may perform different aspects of the present technology. An "end-user" refers to a person or entity or their designee, that specifies, orders, installs or uses the supplemental parts of the present technology and may perform digital image capture, supply metadata and/or confirmation of design steps of the process of the present technology. A "service provider" refers to a person or entity performing a service that is part of the method of the present technology such as reviewing and accepting or confirming orders from an end-user, providing image processing capability, designing (as a "designer"), fabricating (as a "fabricator") or installing (as an "installer") parts, or providing support for installation of such parts. In the present technology, a "service provider" may provide to an "end user" instructions or directions, including, but not limited to, for objects to be used, for printing on and/or placement of objects in a scene, for capturing of the scene in a digital image, and for identifying locations of objects in a digital image of a captured scene, such that the instructions or directions may be carried out by the "end user" at or near the location where the digital image is captured.

Other aspects of the present technology relate to dimensions of objects to be measured or imaged. A "target object" of the present technology refers to an object having a constraint dimension that is measured by one or more methods of the present technology. A "reference object" is an object that is used to estimate a pixel scale factor (or calibration factor) for the captured image. In describing the present technology, "constraint dimension" refers to a measured portion or a multiple of a measured portion of a target object to which a designed part is to conform and a "constraint pixel dimension" refers to the length of a constraint dimension measured in pixels. Similarly, "reference dimension" refers to a reference object dimension whose bounds are detectable in a captured digital image and a "reference pixel dimension" refers to a reference dimension measured in pixels. A target object may contain a "symmetry element" which in the present technology refers to an aspect of the target object that in standard practice resides at a position within the target object such that the symmetry element divides a constraint dimension in an integer number of equal parts.

An "ancillary object" of the present technology refers to an object that is used to aid in finding the location of an item to be measured in the captured image, including for example, the target object to be measured or an edge or corner thereof. The technology provides for three types of ancillary objects. The first is a pane ancillary object to aid in determining the location of corners or edges of a portion of the window such as a sash or muntin. Pane ancillary objects may be placed, for example, in diagonal corners of the window to aid in determining the window dimensions. The second is a sealing interface ancillary object for aiding in determining the location of a sealing interface portion of the window. The third is a non-transparent target object ancillary object used for identifying locations on a target object other than a window, for example. Non-transparent target object ancillary objects may comprise (a) frame ancillary objects for aiding in identifying window frame edges for measurements, such as inward facing frame or jamb edges or outward facing frame casing edges; or (b) wall ancillary objects for aiding in identifying wall edges or portions of a wall for measurement.

A "contrast object" functions to provide contrast between existing elements in a captured image. For example, contrast objects are used so that the edges of the reference object can be found in the event there would otherwise be little contrast between the reference object and its background.

An "adhering object" functions to keep the reference object applied to a portion of the scene in the captured image, e.g., a wall, window frame, window, etc.

Examples of the present technology contemplate improved method and apparatus for decreasing heat transport through fenestration in which the method of obtaining measurements for custom manufacturing of the insulation and its support is done through photogrammetry using digital images and digital image processing. Other examples of the present technology contemplate improved methods and apparatus for supporting, storing and re-using the insulating materials. While the description primarily discusses examples related to windows as target objects, other examples may include other planar target objects such as a wall, ceiling, floor, furniture or portions thereof, artistic painting, poster, photograph, appliance, or any other object where it is desired to estimate a constraint distance or dimension.

Target Object Measurement Digital Image Processing

One aspect of supplemental window elements that is critical is the attainment of accurate measurement fenestration attributes for proper matching of the supplemental window element to the fenestration. Necessary measurements may include physical dimensions such as width, height and depth as well as color. Such measurements, however, can be time consuming and difficult to achieve for those users not accustomed to such work or if the installation site is difficult to access. Depending on the approach, a significant amount of material may be wasted, either from mismatch of delivered product and the area to be covered or from errors made by end users having insufficient fabrication and installation experience. Further, the presence of objects such as furniture or existing window treatments may complicate attainment of requisite measurements. In addition, depending on the type of window, frame and window treatment, supplemental windows may be difficult or impossible to properly install for optimal thermal and radiative insulation.

While prime windows (e.g., single and multiple pane windows generally usable on a stand-alone basis in fixed buildings, mobile homes, travel trailers and other habitations) are sufficient for structural integrity and habitation security, they are often found to be an insufficient thermal and radiation barrier. To conserve the energy necessary for heating and/or cooling a building supplemental windows are employed in addition to the prime windows. Such supplemental windows have included exterior and interior "storm" windows mounted over the prime windows with a "dead air" space therebetween.

Supplemental windows are structurally and functionally distinct from prime windows. Supplemental windows are primarily intended to protect the prime window and reduce thermal losses therethrough. In many instances, supplemental windows are intended to be installed by the building owner and/or relatively inexperienced workers. As a result, supplemental windows are preferably lightweight, uncomplicated and inexpensive. To avoid detracting from the appearance of either the building in general or the prime window itself and to fit within often tight pre-existing spatial constraints, supplemental windows have tended to have minimal framework, the visible bulk of the window assembly being the window panes. Also, "weep holes" or passageways from the environment to the dead air space are usually provided to avoid condensation build up between the exterior storm window and the prime window. Thus, an optimal thermal barrier between the windows is not achieved.

Interior storm windows can be installed regardless of building height and legal restrictions on exterior building appearance, but suffer other disadvantages. Such windows are generally mounted within the window opening or on the interior building wall outside of the window opening. In such cases these windows are preferably constructed with frames from plastic material, such as vinyl, to reduce thermal conductivity, weight, and expense. These materials, however, have been found to sag and warp in response to the weight and thermal stresses particularly in large windows subject to extended periods of direct sunlight. This sagging is destructive of the structural and air seal integrity of the window unit and can increase the difficulty of raising or lowering the window panes. Further, in tall windows vinyl material has been found to lack sufficient rigidity to maintain close air seals between the sides of the window pane and the receiving channels. Moreover, in those instances where such windows are installed within the window opening, custom sizing and installation are typically needed for each window opening, especially when retrofitting such storm windows to older buildings.

In one example, a customer who wishes to have custom windows or supplemental materials must provide the vendor with window dimensions. Alternatively, an estimator/installer obtains the dimensions. These dimensions are manually input by a skilled operator into a computer aided design device (commonly referred to as a CAD) that creates an electronic image which in turn is input to a plotter/cutter. The plotter/cutter generates the sheet of film cut to the custom specifications. The film is then applied to the window by the customer or installer. Alternatively, the customer or estimator/installer may input the dimensions into an input device and directly receive the cut film without utilizing the services of a skilled operator through a service such as www.computercut.com. Such a service provides the cut film order created at a location remote from the source of the film and then sent (by mail, courier, etc.) to the requestor at the remote location.

Note that using other methods other window related custom products such as window treatments or coverings are efficiently delivered. Window coverings are sold in standard sizes by department stores, discount stores and home centers. They are also sold by custom fabricators who come to the home or office, measure the windows and make blinds to fit. Some retailers sell custom blinds based upon measurements provided by the customer. These retailers keep a limited inventory of stock blinds in standard sizes and popular colors. If the customer does not want a blind from the retailer's current inventory, the retailer may custom order the blind from the manufacturer using the customer's measurements.

Stock blinds have a standard width and length and come in a limited number of colors and materials. In a stock blind, lift cords and tilt controls, if any, are in the same location on every blind. In a custom blind, the blind is made to have a length and width that corresponds to the size of the window opening. The customer specifies whether the lift cords and tilt control are to be on the left side or right side of the blind to avoid nearby secondary objects. The customer can often obtain a custom blind in colors not available in stock blinds. Other options may be available to the buyer of a custom blind that are not available in a standard or stock blind.

The alternative window coverings ("AWC") industry provides soft and hard window treatments to customers desiring window coverings other than conventional draperies. Hard window treatments include faux wood and wood horizontal blinds, vinyl and metal horizontal blinds, vertical blinds and interior shutters. Soft window treatments include cellular shades, pleated shades, roller shades, soft shades, vertical blinds and soft window shadings. AWC products are offered to customers through a variety of retail channels, including home product centers, independent retailers, discount department stores, retail fabricators, department stores, catalogs, internet, home builders and interior designers and decorators. Typically, custom-made products are manufactured by a wholesale fabricator or a retail fabricator and then are sold either directly to customers or to a retail source that, in turn, sells the completed product to the customer.

A customer desiring a custom-made window covering typically places an order with a retail source, specifying the features of the finished product desired. Such features can include information about the size of the window, the style, the desired color and various additional options including the type of hardware to be included for mounting and controlling the window covering after installation. The retail source passes the order along to the fabricator. Upon receiving the order, the fabricator cuts the pre-colored bulk material into the size specified by the customer and adds the desired hardware to produce the custom window covering. The completed product is then sold directly to the customer and/or shipped to the retail source.

This fabrication technique has disadvantages for the fabricator. Notable drawbacks include wasted inventory due to the generation of scrap material in the manufacturing process and obsolescence of inventory due to changes in manufacturer color lines. The cost of this wasted inventory is typically absorbed by the fabricator and is typically passed along to the end user or customer.

Figure 5:
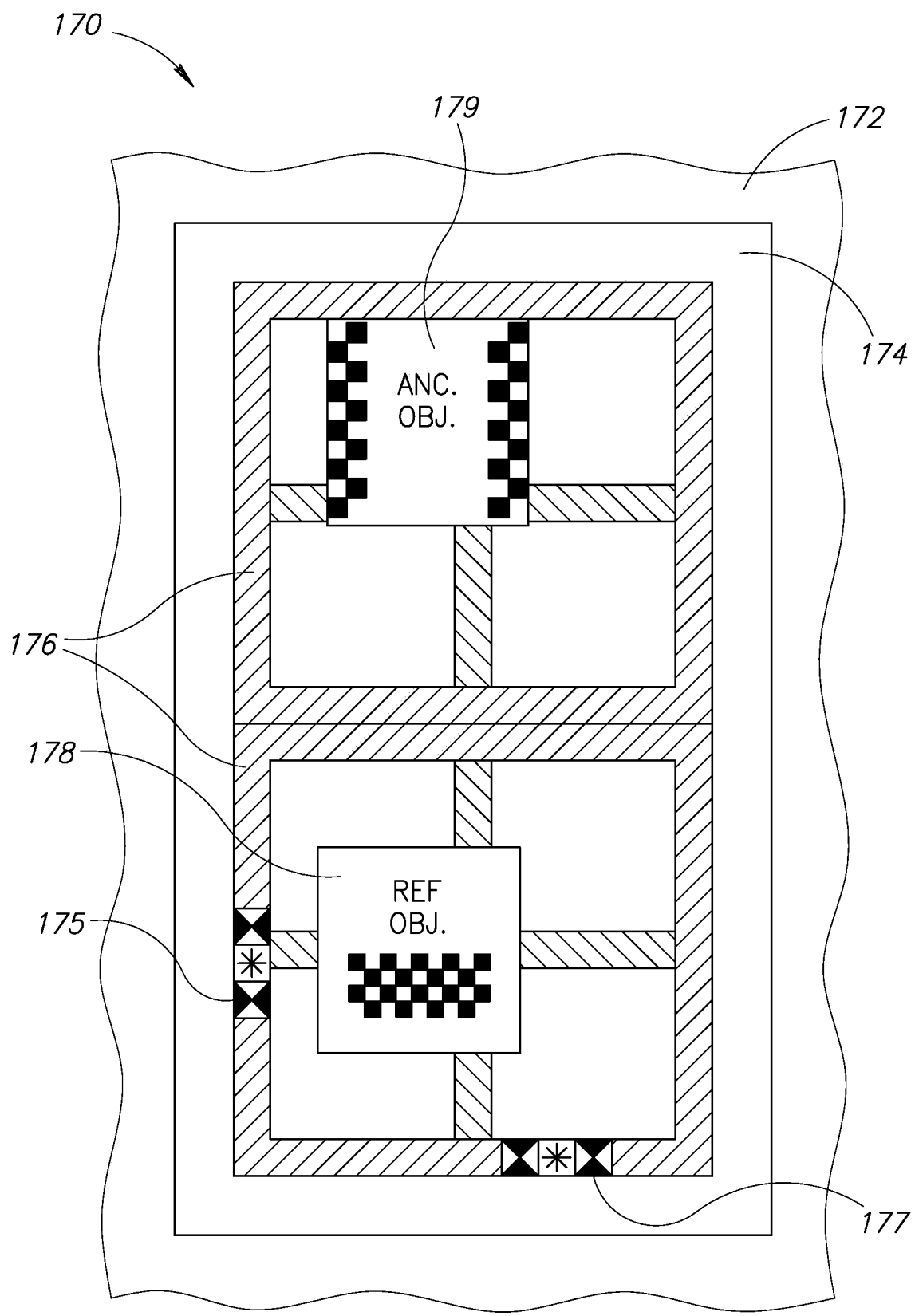
FIG. 5 is a diagram illustrating an example window with reference object and one or more ancillary objects.

A diagram illustrating a sample window and reference dimensions are shown in FIG. 5. The window, generally referenced 170, comprises the wall 172, frame casing 174, top and bottom sash window 176 with muntins, is shown with a reference object 178 on the lower sash and three ancillary objects, one ancillary object 179 is on the upper sash while two other ancillary objects 175, 177 are placed at sealing interfaces at the left side and bottom, respectively, of the lower sash.

Figure 6:
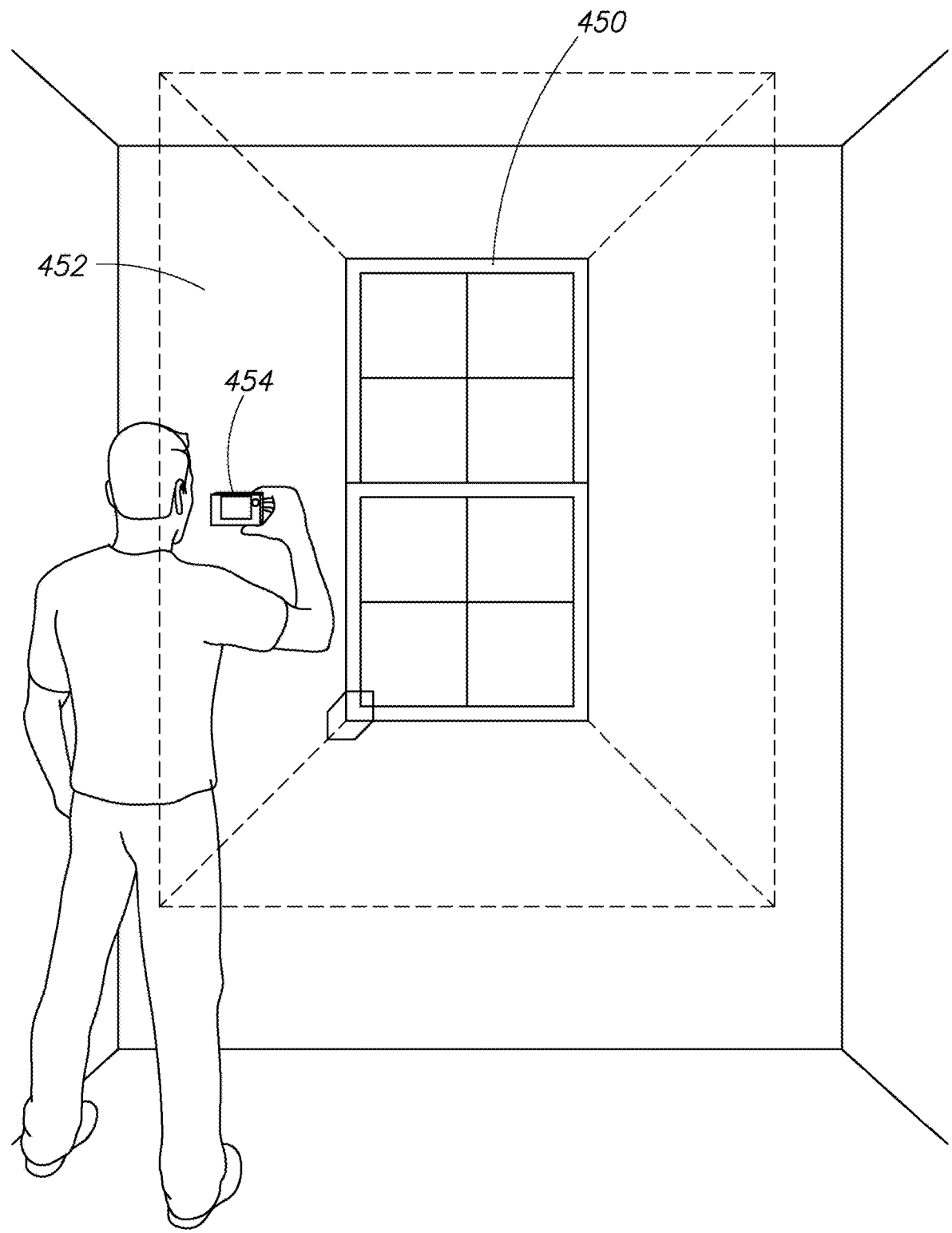
FIG. 6 is a diagram illustrating the volume of space an end user must be in when acquiring the digital image of the window.

A diagram illustrating the volume of space an image acquisition device must be in when acquiring the digital image of the window is shown in FIG. 6. Since the proficiency of end-users capturing the digital images may be highly variable, there are a number of aspects of the image capture that are preferred in order to keep measurement error to a minimum. It is preferable for the camera (image acquisition device) 454 to be substantially within the orthogonal projection 452 of the target object 450 (e.g., window) toward the image acquisition device, in this case substantially within the cuboid volume extending from the window opening into the room in which the window exists, so that the imaging plane is nearly parallel to the plane in which the target object window/fenestration resides. It is also most preferred that the image acquisition device be positioned at or very near the center of the orthogonal projection of the target object toward the image acquisition device.

It has been found that images captured outward from the constraint projection, in this case the window trim casing, can lead to distortions that are difficult to correct without leaving distortion in the reference and/or constraint dimensions or may render a constraint edge hidden in the captured image. To aid with this positioning for image capture, it can be helpful to capture the image with minimal or no back-lighting so as to make reflection of the person capturing the image readily visible to this person when within the projection of the window opening. Further, it is more preferred that the camera reside close to the projection of the window/fenestration center. The capture of images with the camera near the fenestration center also aids in examples of the present technology where vanishing point methods are employed to calculate supplemental part dimensions. When employing vanishing point methods, lines perpendicular to the plane of the fenestration such as those associated with the sill, stool, check rail top edges of the lower sash of a vertically operable sash, and inward facing stop edges can be used. Additionally, for reasons discussed below, it is preferred to use an image capture device that allows for minimization of camera motion during exposure. The image capture device may comprise a still camera, video camera, sequence of still images taken in rapid fire fashion, smartphone camera, etc.

Since windows are generally transparent and rectangular in shape they offer the opportunity for further automation of distance measurement. By capturing the digital image under conditions of either predominantly front lighting or predominantly back lighting of the window, high contrast portions of the image are easily obtained and identified. Front-lit images with minimal or low levels of back lighting (for example, taken at night) can be advantageous for choosing custom supplemental part color with respect to the wall, frame and or existing window treatment, easier identification of details in frame molding that may affect mounting, and minimizing shadows that could adversely impact choice of measurement points if minimal image processing is used. In addition, having a dark background eliminates the potential for irrelevant rectangular shapes to be present in captured digital images thus simplifying the process of identifying relevant features, such as a reference object, a frame or sash element or muntin. Thus, capturing the image at nighttime with room lighting or with flash illumination, the transparent portion of the window will appear very dark with respect to a light colored window sash. Such lighting conditions also allow the person capturing the image to adjust the camera position within the frame projection by observing the location of the camera reflection. Alternatively, a capture device with capability of capturing both visible and infrared images may be used. In such a case, capturing the images at a time when there is a significant temperature differential between the exterior and interior sides of the window may allow regions of interest, such as pane edge locations or sealing interfaces to be found in the infrared image. Using the spatial relationship of the visible and infrared images, the regions of interest may be found and used in the image processing of the visible image.

An alternative method of the present technology provides reference dimension measurement using a reference object, optionally having another use when not used in the present technology, or may be a standard size reference object. Prior to capturing the digital image, the end user may place a standard sized object on the window frame, sill, stool, sash, windowpane, next to the window or within the window frame being photographed, as shown in FIG. 3. Standard sized objects should have an easily identified linear dimension that is viewable in the image. More than one standard sized object may be used in an image. Non-limiting examples of such standard sized objects include an open tape measure, a ruler or meter stick, a piece of printing paper or lined paper having known standard dimensions, e.g., letter, legal, A4, A5, etc., a CD jewel case, currency, credit or debit card or government issued documents such as a driver's license or passport. When using an object similar in color or that does not provide sufficient contrast with its surrounding elements it is preferred to have a high contrast border at the peripheral edges or high contrast lines that terminate at the its edge. The reference object may also be a thin electronic display device such as a tablet or laptop computer display or a cell phone display for which the make and model is known and conveyed to the service provider as metadata. Such a display may be altered to provide high contrast and/or color distinction from the surrounding primary and secondary objects to aid in finding and dimensioning such a reference object. Alternatively, a standard object or figure provided by the service provider may be used, printed or displayed electronically whereby the service provider predetermines the dimensions of the standard object or printed figure. When a standard object is provided by the service provider, such standard object is preferably planar and rigid or semi-rigid and may optionally have printed on it a standard figure.

When using reference objects and ancillary objects for use under back lighting conditions, in some examples, the object has sufficient optical transmittance characteristics to substantially block background objects viewable through the transparent portion of a window. At the same time, the object should allow enough light transmission such that a highly saturated colored fiducial pattern or ancillary object can be detected automatically. When the optical transmittance of the reference object or ancillary object is too high, for example more than about 80%, objects viewable through the reference object inhibit detection of ancillary objects, fiducial patterns, or features on the reference object. When the optical transmittance is too low, for example less than about 2%, the detection of fiducial patterns or features is inhibited when there is insufficient front lighting and too much backlighting. Objects and fiducials used in accordance with the technology should have reflectance in the range of about 15% to about 85%, diffuse transmittance in the range of about 5% to about 65%, direct transmittance less than about 10%, and diffuse transmittance greater than direct transmittance. In the case of low optical transmittance objects and fiducials, activation of the image capture device flash can be useful for providing sufficient front illumination of the fiducial pattern. It is also beneficial for reference objects of the present technology to have diffuse reflecting properties, for example, such as found in printer paper, self-adhesive notes, and translucent plastic materials such as high density polyethylene, low density polyethylene, polypropylene, polycarbonate, polyethylene terephthalate, nylon, and acrylic, each of which may be unfilled or filled, to provide the above described optical properties. In addition, reference objects and ancillary objects with these optical properties may be provided with reusable, washable and/or removable adhesive, as are known in the art, placed on the side of the reference object or ancillary object opposite that of fiducial patterns or features. Such adhesives may include, for example, gel pad, glue dot, nano grip, nanosuction adhesive such as described in U.S. Pat. Nos. 8,206,631; 8,398,909; and U.S. Patent Application Publication Nos. 2012/0319320; 2012/0328822; and 2013/0251937, the disclosures of which are incorporated by reference herein in their entirety.

In one example, a standard object or figure may have an uncommon color defining the standard length so that the end user may capture a digital image of the standard object or figure that will subsequently be used as the reference object in the present technology. Using the same capture device and colored standard object and providing their identity to the service provider in the present technology can then aid in automated locating of the reference object in one or more digital images used in the present technology. Additionally, the end user may create a reference object by measuring a non-standard sized object's dimensions and supplying the reference dimensions to the service provider as metadata. Similarly, color information may be calibrated by providing the end user with a standard color sample that can be used to calibrate colors in the image. Examples of objects pre-determined by the service provider include pre-printed paper, plastic sheet, picture frame, clip board, cork board or bulletin board sent to or otherwise obtained or purchased by the user and digital files that may be printed by the user near the point of use. When the user prints digital files provided by the service provider, the digital file may be printed on a standard size sheet of paper such that the sheet of paper acts as the reference object and the printed file provides means for identifying the sheet of paper. In such cases, digital files preferably comprise at least one fiducial pattern, such as a checkerboard, dot, or hourglass pattern, or a bar code or QR code.

Fiducial patterns may perform one or more functions in the present technology, such as enabling automated object or feature finding, automated orientation of objects and the image, containing user and/or order information, or enabling relative sizing of different parallel planes. For encoding user and/or order information the fiducial may comprise a code such as a bar code or QR code, the information of which may optionally be encrypted by the service provider, printed large enough for resolving in an image sent from the end user to the service provider. For the relative sizing function, it is particularly helpful to print fiducial patterns having the same pixel dimensions and orientation in the digital file with the same printer settings on the same printer. Such printed digital file preferably contains orientation information such that, when mounted properly by the user, leads to orientation information in the captured image. In addition, the fiducial pattern is printed large enough for the pattern to be found and interpreted by computer vision software.

In one example, checkerboard and hourglass patterns (shown in FIG. 5) of at least about one inch squares have been found to be useful. In the case of QR codes, so that reading of the code at or above about 10 pixels per inch in the image, the pattern should be at least about two inches by two inches in size for a 13×13 pattern, and preferably about six inches by six inches for a 29×29 pattern. Preferably, reference objects should be rigid or can be made rigid during the image capture. For example, if a piece of printing paper is used, at least two, preferably three, adjacent corners should be taped to a flat surface with the entire edge between the adjacent corners in contact with the flat surface. Alternatively, standard sized printing paper may be attached to the window pane, muntins or sash using small amounts of liquid, gel, paste, créme or grease applied to the non-printed side of the printing paper, preferably near the edges of the paper so as to keep the paper as flat as possible. Liquids useful for this purpose do not permanently adhere and are easily cleaned off of the window pane, muntin or sash to which they contact and may otherwise be easily found by the user in their home or workplace. Such liquids include water, although preferred liquids have higher viscosity than water such as dishwashing liquid, liquid soap, hair shampoo or conditioner, hand lotions, oils (for example, vegetable based oils). Preferred gels, pastes, crémes and greases include petroleum jelly, lip balm or gloss, toothpaste or ointment.

When attaching printing paper to muntins that protrude toward the room interior from the window pane, it is preferred to have at least four attachment points. To minimize curling of the printing paper, such as typical 8.5×11 inch multipurpose 24 lb. white paper, after the fiducial pattern has been printed, printing methods that minimize or eliminate water contact with the printing paper, such as toner based printing, are preferred. Use of standard size heavier weight paper or card stock is also beneficial for minimizing curling. When printing with methods that can lead to curling of the paper, such as inkjet printing, it can be beneficial to decrease the amount of printed material used to print the fiducial pattern, while maintaining detectability by the image processing algorithm. This may be accomplished by employing, for example, halftoning to adjust the amount of material deposited on the paper to achieve the desired balance between sheet flatness and detectability of the printed pattern. While bi-tonal black-and-white patterns have been successfully used in the present technology, halftoned patterns may be used in the present technology. Gray levels in the 50% to 75% range have been found to provide improved sheet flatness of reference and ancillary objects while providing sufficient density for algorithmic detection of fiducial patterns under many lighting conditions. Higher gray levels, such as about 80% to 100% (black) improve detectability by the methods of the present technology, particularly for the ancillary objects that may be partially hidden or covered by a shadow.

When using a reference object, it is preferred to place the plane of the reference dimensions of the reference object as close as possible and parallel to the plane of the measured constraint. Therefore, reference objects that are thin in the dimension parallel to the constraint plane are preferred. If the reference object is placed outside the fenestration, for example on the wall immediately next to the fenestration, as described below, the fiducial pattern on the reference object may be used to aid in locating regions of interest and the reference object edges, particularly if there is low contrast between the reference object and the wall. In addition, entropy methods may beneficially be used to aid in differentiating the reference object, ancillary objects, adhering objects or contrast objects from the adjacent features such as the wall, or when there is low contrast with the window features or windowpane background, adjacent to the reference object, ancillary object, adhering object or contrast object in the image in the region of interest, so that reference object edges may be found more easily.

If the reference dimensions are not placed in the same plane as the constraint dimensions, size correction may be performed to account for the perspective error induced by such placement. One method of performing such correction is to print the fiducial patterns using the same printer with the same print settings and having fiducials that are digitally the same size as the pattern printed on the standard size printing paper. The fiducial on the standard size printing paper may be calibrated to the known dimensions of the paper. Placing a second (ancillary) fiducial in a second plane parallel to the window allows dimensions in the second plane to be correctly measured. Preferably, such reference objects are placed near window dimensions of similar length to be determined.

The captured and processed images should have a resolution of greater than one megapixel, preferably greater than two megapixels, more preferably greater than three megapixels and most preferably greater than four megapixels. At the same time, to facilitate edge and corner identification and decreased camera motion errors, reference pixel dimensions must be of sufficient length relative to the image pixel dimensions. Through extensive experimentation capturing digital images using imaging devices of different resolution, reference objects of different dimensions, and different image plane to fenestration plane distances, it has been found that the reference object and its dimensions must be carefully chosen and placed so that symmetrical elements and constraint elements may be readily observed.

If a target object window already has an associated window treatment that will be used with the custom supplemental parts, the image is preferably captured with the treatment opened allowing constraint surfaces and lines to be visible. If the open treatment still covers a portion of the window or frame, additional images of the covered portions may be captured to obtain constraint surfaces or lines hidden in other image views. Any additional image should also contain a reference object so that accurate calculations may be obtained.

In some cases it may be desirable to capture only a single image but the image may have omitted a portion of a relevant constraint, such as a corner or edge. In other cases, a window treatment may be in a fixed position covering at least one of the constraint surfaces or lines. In such cases, symmetry within the window and/or framing or digital extension of the observable constraints may be used to calculate a dimension for which a portion of one constraint is not visible in the image. Symmetry elements such as check rails or muntins may be used to estimate the location of completely hidden constraints. Alternatively, one or more ancillary objects may be created to provide a means for determining the location of a hidden constraint. For example, a fiducial pattern provided by the service provider may be printed on a piece of standard sized printing paper, in which the ancillary object comprises a fiducial pattern and at least one of the intact standard dimensions of the printing paper. For example, one edge of the 11 inch dimension of an 8.5×11 inch piece of printing paper upon which a fiducial is printed may be aligned with the edge of a window pane that is partially obstructed by, for example, a window treatment. When so aligned, the edge opposite the aligned edge may be visible while the aligned edge is obstructed. The fiducial pattern may be used to locate this ancillary object whose standard length is known. The intact dimension from the visible edge to the aligned edge is a standard dimension which, along with knowledge of the pixels per inch for the plane in which this ancillary object resides, allows the hidden constraint location to be determined.

In cases where a window treatment is moveable and covers different portions of constraint surfaces or lines when in different positions, it can be beneficial to capture more than one image of the same window such that different treatment positions are captured. The end user may select and adjust treatment positions to be captured such that the images provide complementary views of constraints. Software programs may be employed to merge two or more images creating a single image offering a clear view of the all desired constraint surfaces or lines in a single image. For example, vertical or horizontal blinds may allow image capture with partial view of a constraint rectangle when raised or pulled to the sides of a window. One constraint surface, however, may be partially or entirely hidden with the blind in such a position. To complement this image, the blind may be in its fully closed position with the blinds rotated to allow imaging of a constraint surface that is hidden in the first image. This single image, having the non-stationary treatment portions removed, may then be used as the basis for further image processing described below.

A preferred example is now described. In this description, several terms are used with the following definitions. A triage resolution image is an image with a resolution suitable for scene content analysis; for example, an image with a width of 960 pixels and height of 640 pixels will provide a resolution of 8 pixels per inch for an image filling object that is 120 inches wide and 80 inches tall in a plane parallel to the image plane and will provide higher resolution for closer objects. A measurement resolution image is an image with a resolution suitable for target object measurement; for example, an image with resolution of 12 pixels per inch at the target object distance.

A measureable image is an image in which rectangular objects in the world appear rectangular in an image; for example, an image of a rectangular object directly in front of a camera where the axis of the lens is perpendicular to the rectangular object. A projective transformation is a mapping from points in one coordinate system to points in another coordinate system which preserves collinearity; for example, a pinhole camera photograph of a planar object on the image plane of the camera. A projectivity matrix is a matrix which is used to encapsulate the calculations needed to perform a projective transformation; for example a 3×3 matrix that is used to convert locations (u, v) in one plane to locations (x, y) in another plane by adding a third coordinate of 1 to a source point (u,v,1) and computing three coordinates (hx, hy, h) by matrix-vector multiplication from which the coordinates of the destination point (x, y) are computed by division.

Image coordinates are the location of a point of interest in a digital image, typically given in pixel offset units from a defined origin point such as the upper left corner of the image; for example, if an image has 960 columns and 720 rows of pixels, the offset of the image center from the upper left corner of the image is 479.5 columns and 359.5 rows. Camera coordinates are an extension of image coordinates to three dimensions by adding distance from the image plane as a third coordinate. Plane coordinates are the location of a point of interest on a planar object in physical units from a defined origin point. For example, a planar object being photographed may have its coordinates defined as offsets from the point of intersection of the camera axis with the plane with distances measured in centimeters or inches.

World coordinates are an extension of plane coordinates to the location of a three dimensional point of interest relative to a plane wherein the first two coordinates are the coordinates of the point on the plane closest to the point of interest and distance to the plane is the third coordinate.

For example, if a plane coordinate system has its axes defined using two adjacent sides of a rectangular object such as a window pane, a pane-relative world coordinate system could be defined in a way that positive third coordinates refer to points outside the window and negative refer to points inside. Translation changes in coordinates due to shifting a coordinate system origin point without changing the orientation or units of the coordinate axes. Scaling changes in coordinates due to a change in units on one or more coordinate axes without shifting or reorienting the coordinate axes; equal scaling of all dimensions is called an isotropic scaling; an isotropic scaling preserves the aspect ratio of rectangular objects. Rotation changes in coordinates due to changing the orientation of a set of coordinate axes without shifting or changing units of the coordinate axes.

A capture mapping is a projective transform that maps points in a plane or world coordinate system onto points in an image. An inverse mapping is a projective transform which maps points in an image plane or camera coordinate system onto points in a plane or world coordinate system.

Figure 7A:
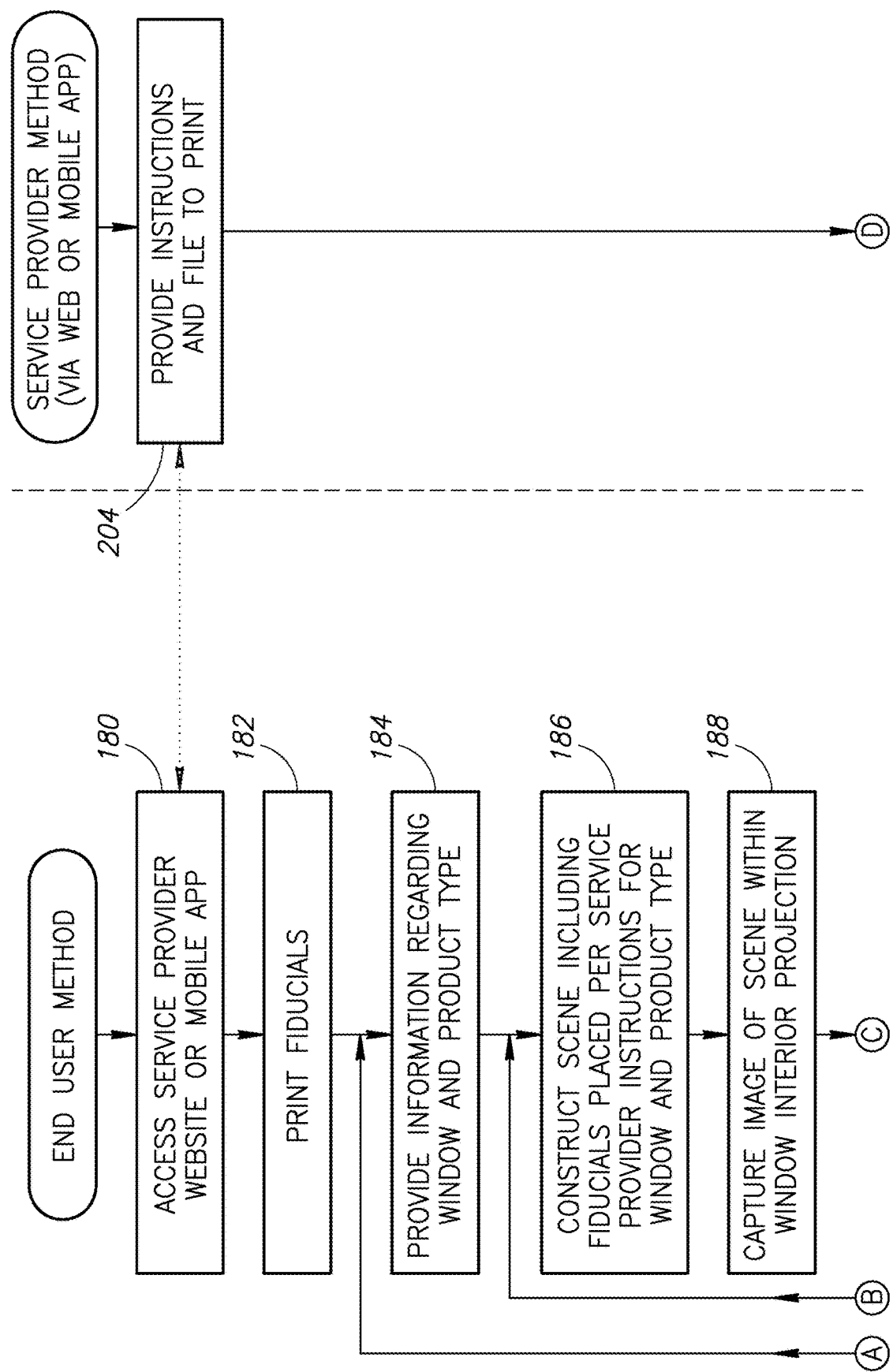
FIGS. 7A and 7B are flow diagrams illustrating an example overall workflow between the end user and service provider.
Figure 7B:
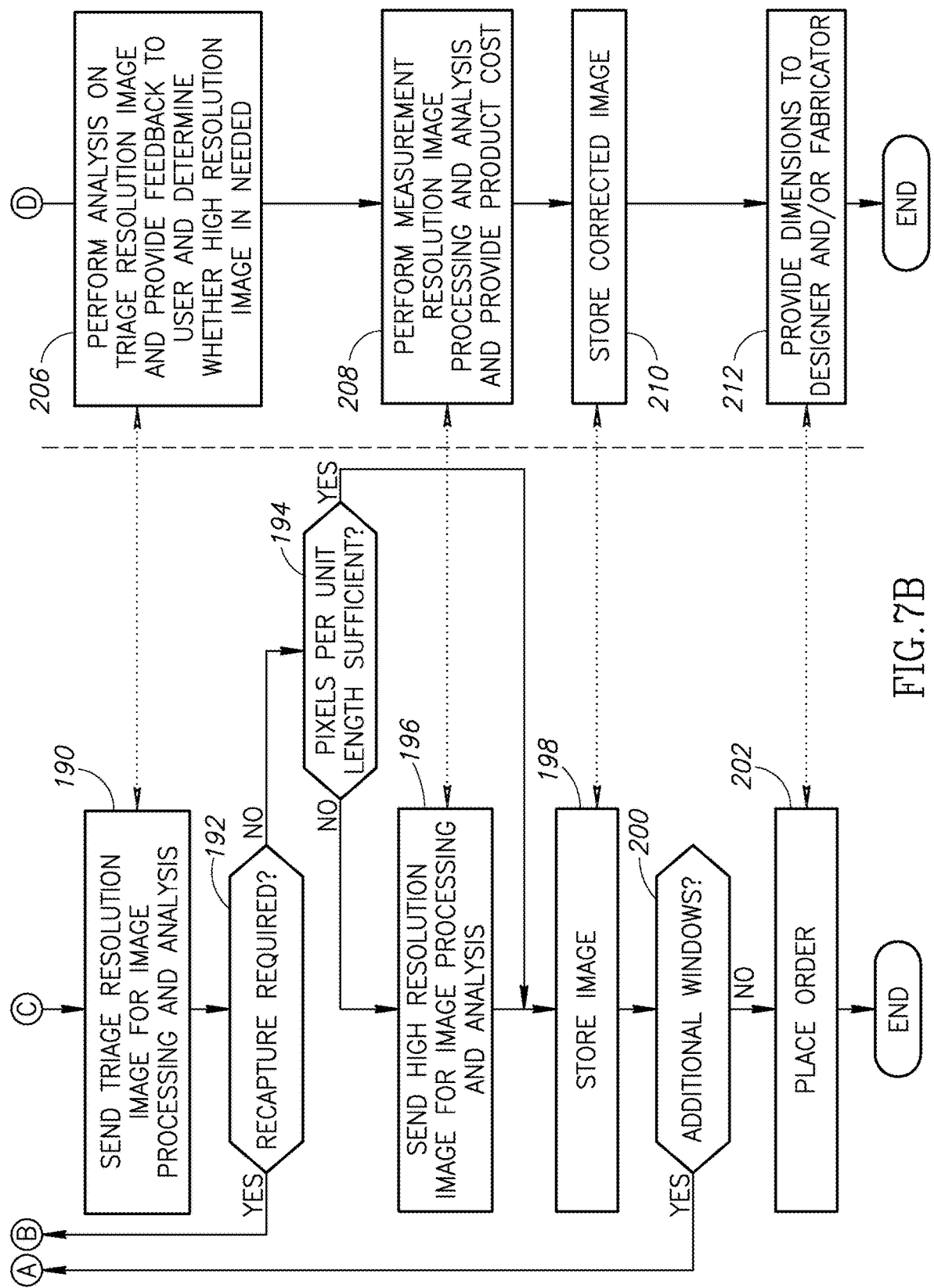

Flow diagrams illustrating an example overall workflow between the end user and service provider are shown in FIGS. 7A and 7B. Following instructions provided by the service provider after accessing the service provide website or mobile app (step 180), the end user prints digital files of fiducial patterns (provided by the service provider (step 204)) on standard printing paper (step 182). The end user supplies metadata such as the particular type of window and the product desired (step 184). For example, the end user may answer questions to supply metadata or the metadata may be the result of using a trial and error digital application such as "The Window Shopper", available from www.blinds.com, that aids the end user in choosing a window related product with the desired mounting location. Such mounting location may then be input to the instructions provided and used in the present technology.

The user places on the window pane or protruding muntins a reference object of standard printing paper, such as 8.5×11 inch, on which a fiducial pattern is printed (step 186). In addition, the end user optionally places ancillary objects, of standard or non-standard size on which fiducial patterns are printed, on window components as instructed by the service provider, consistent with metadata provided by the end user. The ancillary object fiducial patterns are distinct from the reference object fiducial pattern. Preferably, multiple ancillary fiducial objects may be printed on a single standard size sheet of printing paper and separated by cutting or tearing along lines pre-determined by the service provider.

After constructing the scene of the window by moving obstructing objects and placing reference and ancillary objects in the scene, the end user captures the digital image from a point within the projection of the window as described above in connection with FIG. 6 (step 188).

The captured image is resized to a triage resolution, for example so that the smaller dimension of the image has 720 pixels or 720P, and either sent to a remote server for automated image processing or automated image processing may take place on the capture device (step 190). While the downsized image is being processed, transmission of a high resolution version of the image, which may be the full resolution of the imager, to the service provider server may commence (step 196) and, if transmission is completed the high resolution image may be stored (step 198). The service provider analyses the triage resolution image and provides feedback to the user and determines whether a high resolution image is needed (step 206). If recapture is required (step 192), the method returns to step 186 and user adjusts the scene construction, for example by moving objects in the scene or changing the capture device position, and recaptures the adjusted scene. If recapture is not required (step 192) but the pixels per unit length is not sufficient (step 194), based on the analysis performed by the service provider (step 206), the high resolution image is sent to the service provider for analysis (step 196). The service provider performs measurement resolution image processing and analysis and determines an estimate of the product cost (step 208). The measurement image is stored (step 210).

Once the pixels per inch obtained from the image is sufficient (step 194), the image is stored (step 198) and the user is asked whether the process is to be repeated for additional windows (step 200). If there is an additional window is to be processed, the method returns to step 184. Otherwise, the user places the order (step 202) and the service provider provides dimensions for the product and forwards the order with the dimensions to the designer and/or fabricator (step 212).

A determination of whether the entire high resolution image is sent and/or analyzed may be made based on analysis of reference object pixels per inch of the triage resolution image as described below.

Figure 8A:
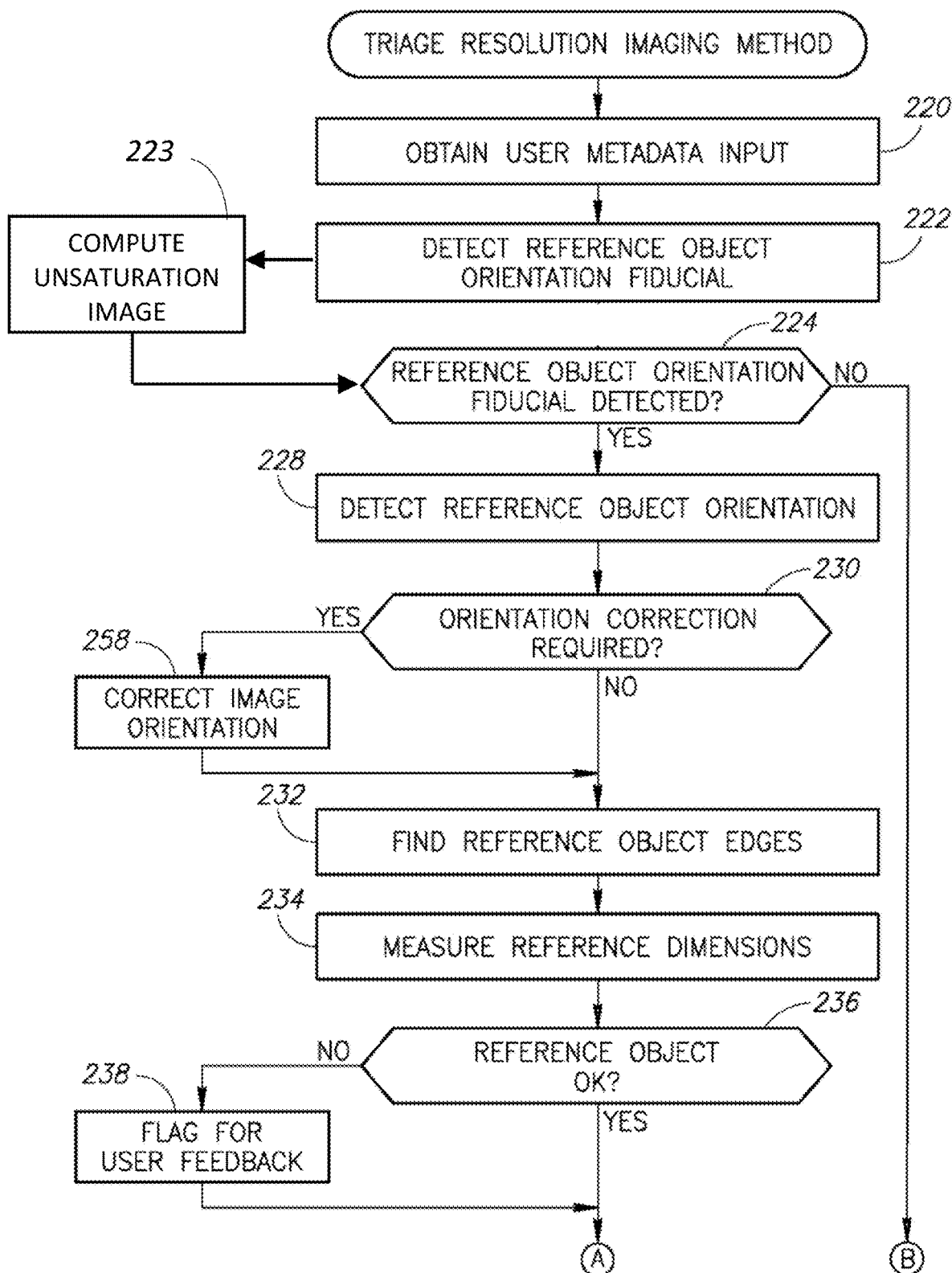
FIGS. 8A and 8B are flow diagrams illustrating an example triage resolution imaging method.
Figure 8B:
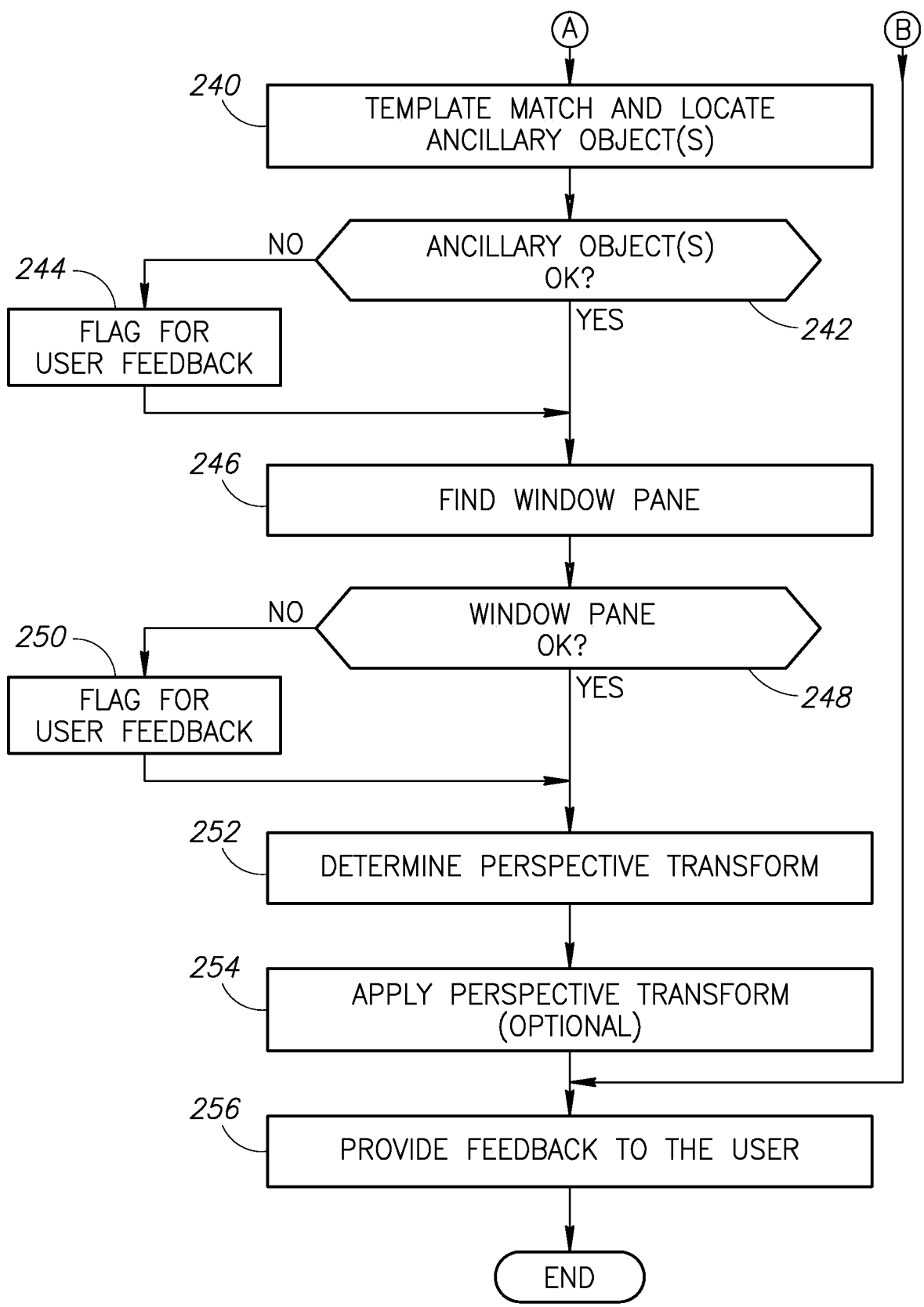

Flow diagrams illustrating an example triage resolution imaging method are shown in FIGS. 8A and 8B. The image processing of the downsized image may result in different feedback to the user. If image processing of the downsized image finds that all necessary criteria are met, the user may be automatically notified that (1) product ordering may be performed, optionally along with a cost estimate, (2) that the image may be stored for future use, or (3) that another window may be imaged. If the image processing of the downsized image finds that at least one criterion is not met by the image, the user is notified that the scene must be imaged again. Further, depending upon the criterion or criteria that were not met, the user may be automatically notified of suggested changes to the scene or its capture that would rectify the problem. Such suggestions are described in more detail infra.

The automatic triage resolution image processing flow shown in FIGS. 8A and 8B is for images containing objects upon which fiducial patterns have been printed by the end user following instructions provided by the service provider. Prior to this automated image processing, the end user may have provided metadata (step 220) regarding, for example the window type and the product that the end user is interested in potentially purchasing, and the end user will be provided instructions on the choice and placement of reference and ancillary printed objects.

After capturing the image with an image capture device having communication capability, the image is downsized, preferably keeping all color information, and along with the metadata input to the image processing software. Since the service provider knows the fiducial pattern provided on the reference object, a complex pattern finding algorithm, for example template matching using a matching metric such as normalized cross correlation or normalized cosine coefficient, or similar method suited to the pattern may be used to find the reference object (step 222). This may be accomplished using template matching software. An example suitable for use with the present technology is the matchTemplate function available from Open Source Computer Vision (OpenCV, www.opencv.org), which is an open source computer vision repository.

Alternatively, the user may obtain a close-up image of the reference object with fiducial and use software that may utilize resizing, rotating, projecting, use of Gaussian or Laplacian multiscale cascade two-dimensional Haar wavelet responses, integral images or other manipulations, such as those used in the art, as in scale-invariant feature transform or speeded up robust features object detection software.

When using a reference object having a highly saturated color fiducial, computation of the unsaturated image plane=255−HSV(−,−,2) is performed (step 223). This step provides a black on white chessboard for subsequent image processing.

If the reference object orientation fiducial is not detected (step 224) then feedback is provided to the user (step 256) to correct the scene and recapture the image. If the reference object orientation fiducial is detected (step 224), the reference object orientation is detected (step 228) and if correction is required (step 230), the image orientation is corrected using a reference object fiducial (step 258) that has, for example, an n×m chessboard pattern of light and dark squares, where n>m and one of n and m is odd and the other is even. The n x m pattern orientation may be determined by examining the coordinates of the (n−1)×(m−1) inner corners using the OpenCV function findChessboardCorners. Note that in this example, n is assumed to be odd and m is assumed to be even (alternatively, m may be odd and n even).

This orientation is ambiguous, but the ambiguity may be resolved by examining the upper left 2×2 orientation, which may be determined using the OpenCV function matchTemplate to distinguish between two possible vertical or horizontal cases. Alternatively, orientation may be determined using a (1) training classifier, (2) user supplied metadata, (3) accelerometer metadata or (4) through end user confirmation of orientation. The software then compares the fiducial orientation within the image to the proper orientation according to object placement instructions based on window type metadata.

If there is an orientation mismatch (step 230), the mismatch is used to obtain a "gravity down" image by flipping vertical and horizontal to correct an upside down mismatch (step 258), by transposing and flipping vertical if 90 degrees clockwise from correct, or transposing and flipping horizontal if 90 degrees counterclockwise from correct. In each case of orientation detection and correction, optionally the image size may be reduced prior to detection or correction. If the reference object fiducial is not found in the image (step 224), automatic feedback to the user may be provided suggesting that correct placement of the reference object on the window and properly focused imagery be confirmed (step 256).

Once the image orientation is corrected (step 258) or if correction is not required, the edges of the reference object are then found (step 232). Once found, the reference object dimensions are measured (step 234) and if the reference object is acceptable (step 236), the one or more ancillary objects are found using a template match function (step 240). If the reference object is found not to be acceptable (step 236), this is flagged for use feedback (step 238) and the method continues with step 240. If the ancillary objects are found to be acceptable (step 242), the software then attempts to locate the window pane (step 246). If the ancillary objects are found not to be acceptable (step 242), this is flagged for use feedback (step 244) and the method continues with step 246. If the window pane was successfully found (step 248), a perspective transform to be applied to the image is then determined (step 252). If the window pane was not successfully found (step 248), this is flagged for use feedback (step 250) and the method continues with step 252. The perspective transform is then applied to the image (step 254) and any feedback previously flagged is provided to the user (step 256).

Figure 9:
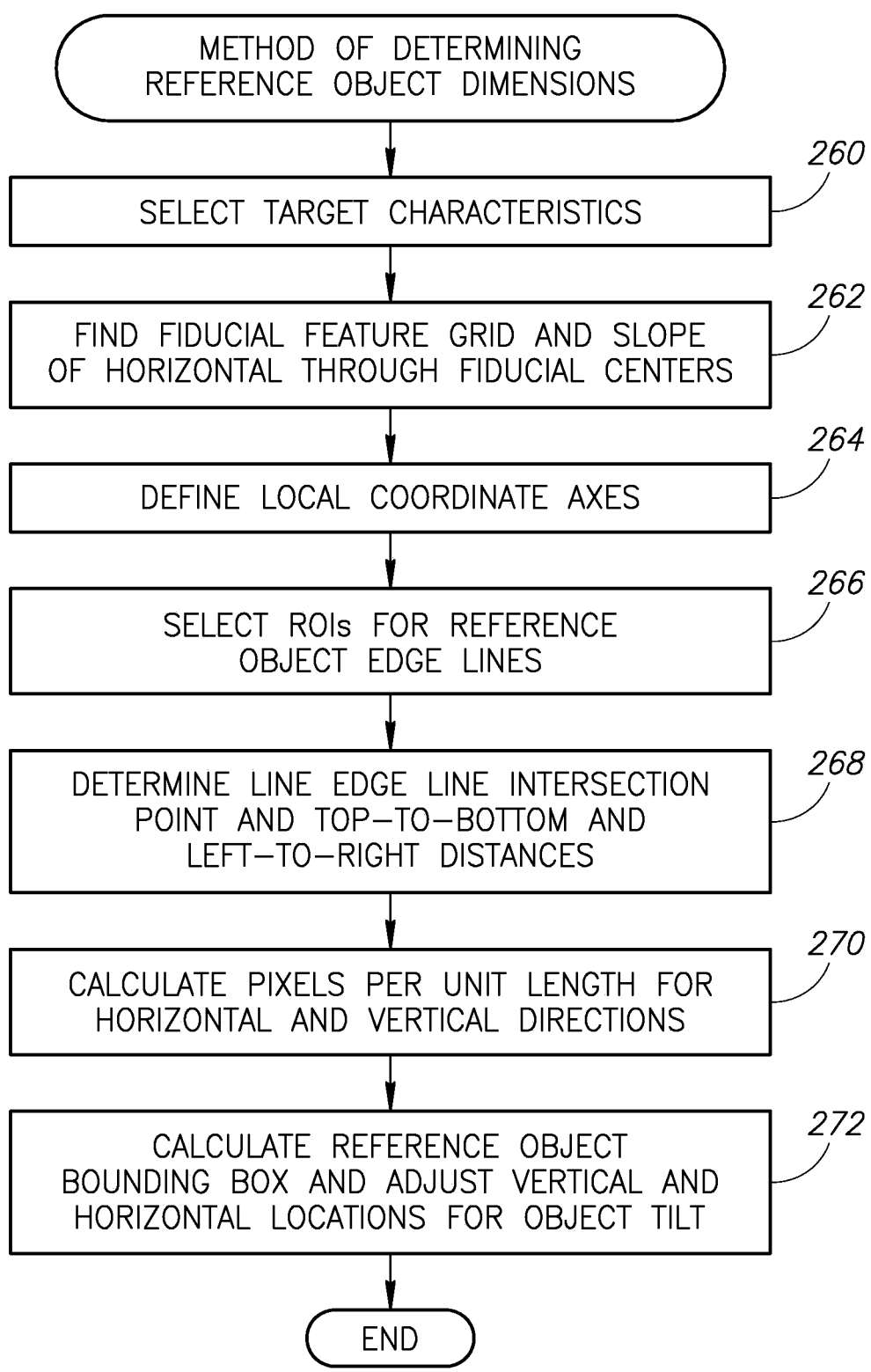
FIG. 9 is a flow diagram illustrating an example method for determining reference object dimensions.

A flow diagram illustrating an example method for determining reference object dimensions is shown in FIG. 9. This method is used to determine the reference object pixel dimensions and calibration factors (pixel scale factor, or pixels per unit length). The reference object is found by determining the fiducial pattern characteristics, such as printed pattern type (e.g., chessboard or dots, hourglasses), features, size and nominal location relative to paper edges based on the digital file that was sent to the user (step 260). For example, using a 7×4 chessboard fiducial pattern, the feature grid is found using a method such as the OpenCV function findChessboardCorners (step 262). The local coordinate axes are then defined (step 264) and regions of interest (ROIs) are selected for reference object edge lines (step 266).

Once the object is located, the edges are located using the relationship between locations of points of the fiducial pattern in the image and the nominal locations of those points on the page in the digital file. First, the slope and length of the horizontal line along the top row of the 6×3 set of internal corners is found. This is done by taking the list of 18 approximate corner locations, identifying the top row, defining regions of interest containing the upper left and upper right 2×2 chessboard patterns, locating their centers more accurately by using template matching, template correlation or other complex pattern finding algorithm with one color record (e.g., green) and subpixel offset of the best match relative to each center to determine the top left and top right center locations (step 268). The slope of the line connecting these points is calculated from the vertical and horizontal offsets between the points and a preliminary pixels per inch value (i.e. pixel scale factor) is calculated using the ratio of the measured distance in pixels and the nominal distance between the points in inches (step 270). The calculated slope is used to determine a local rotation of the reference object and local coordinate axes.

The edges of the reference object are found by finding the center of a 't' using the midpoint between the top row corners, placing the crossbar at the desired vertical position and adjusting the center for small tilt. The centers of the four edge regions of interest (ROIs) along the lines of the 't' are located using the approximate pixels per inch and slope value from the T cross point. An edge map is created by matching or correlating corresponding edge finding templates within the regions of interest. The extreme points along the edge map are used to determine the edge line which should be nearly perpendicular to the intersecting T line for acceptable edge finding and measurement. Points of intersection of the lines of the 't' and the edges are determined. The distance (in pixels) between the left and right (Href) and the top and bottom (Vref) of the reference object are based on the line intersection points. These are used to calculate the pixels per inch in each of the horizontal (Ch) and vertical (Cv) directions using Equations 1 and 2, respectively, where Hrefphys and Vrefphys are the reference object physical dimensions in the horizontal and vertical directions, respectively.

$$Ch = Href/Hrefphys \qquad (1)$$

$$Cv = Vref/Vrefphys \qquad (2)$$

An approximate reference object bounding box is calculated which is adjusted for tilt using the calculated pixels per inch and the adjusted box is wrapped around the reference object (step 272). Once the reference object is found, a contour surrounding or adjacent to the reference object may be confirmed to be a pane or contain part of a pane. The reference object location may also be used to mask the reference object, for example between finding a threshold and applying the threshold to the image.

Figure 28:
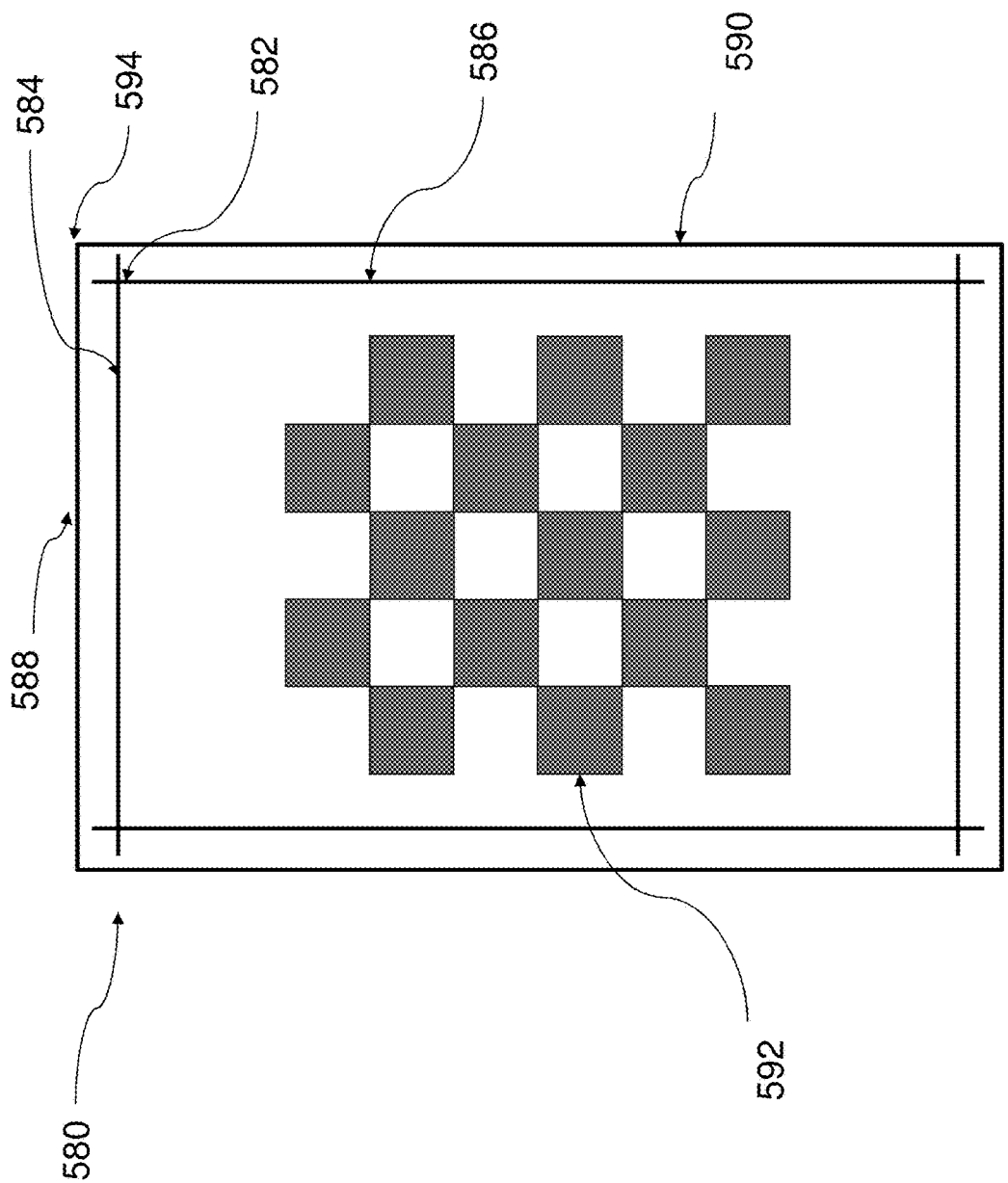
FIG. 28 is a diagram illustrating an example reference object.

An alternative method for finding reference object edges (step 232) or reference object corner utilizes a feature that is at a known predetermined location on the reference object relative to the edge or corner of the reference object. As described above, a fiducial may be found, and its location and pixel scale factor used to determine regions of interest. In this method, regions of interest are used for finding the feature on the reference object. FIG. 28 illustrates an example of such a reference object. As an example, reference object 580 has feature 582 shown as an intersection of two line segments 584 and 586 with each line segment being a known predetermined small distance from each of two adjacent edges, 588 and 590, of reference object 580. The predetermined small distances may be the same or may be different. Each line segment 584, 586 is preferably parallel to and about one inch or less from a reference object edge, preferably about one quarter inch from a reference object edge. A fiducial 592 pixel scale factor and reference object geometry are used to define regions of interest containing the line segments 584, 586. The feature is then found by locating the intersection of the line segments. Since the feature is at a predetermined physical location relative to the physical reference object corner 594, the location of the reference object corner is determined from the feature location. With a physical reference object corner located at a physical pane corner, a pane corner location in the digital image is determined using the pixel scale factors and reference object geometry. The above described line segments may also be used to determine the location of an adjacent corner or corner region of interest in the digital image. For example, a line segment, parallel to the bottom horizontal sash rail on a reference object placed at the lower right corner of the windowpane, may be digitally extended to the left until it reaches an L-shaped feature having a large luminance or entropy change when crossed or otherwise found using machine learning or artificial intelligence algorithms, to determine the lower left corner location or corner region of interest. It is appreciated by those skilled in the art that other patterns may be used for fiducial 592.

Figure 10:
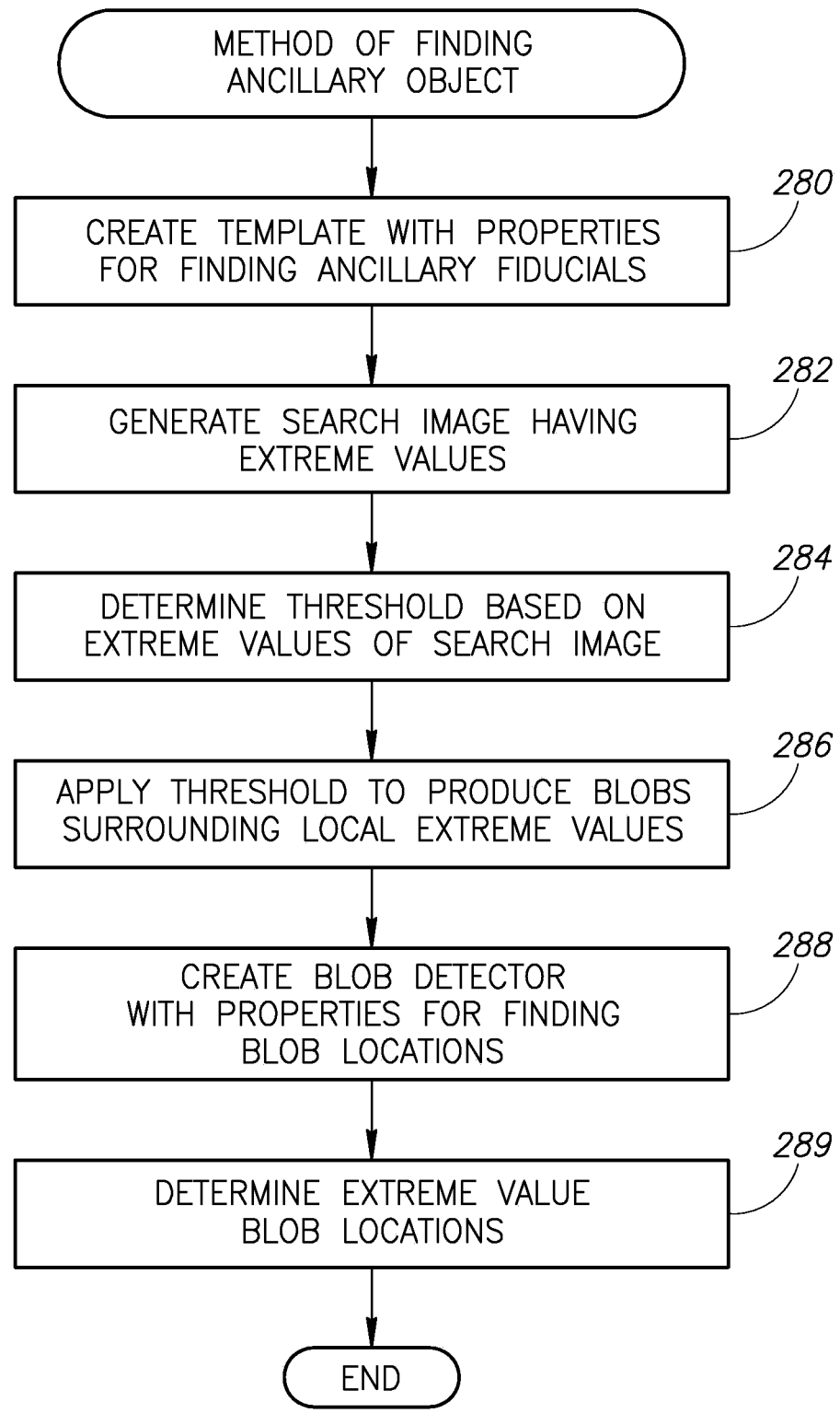
FIG. 10 is a flow diagram illustrating a method for finding an ancillary object.

After finding the reference object, ancillary objects are found. A flow diagram illustrating a method for finding an ancillary object is shown in FIG. 10. One or more ancillary objects on which fiducials, distinguishable from that on the reference object, are printed are also found using template matching, template correlation or other complex pattern finding or object detection algorithms. To find the ancillary object(s) with fiducial pattern(s) having a pattern such as hourglass, chessboard, or hexagonal or octagonal design of alternating light and dark triangles using template matching, a corresponding template is created (step 280) and used to generate a search image wherein extreme value(s) of the cosine coefficient normed metric correspond to fiducial locations (step 282). The extreme values are then used to determine a threshold (step 284) that can be applied to the search image to mask out weak signals arising from scene content and produce an image wherein blobs of points surrounding the local extremal values remain, where blobs, as is known in the art, are connected collections of pixels sharing a common characteristic, such as in this case, having a metric value above a threshold (step 286). At least one blob detector is created (step 288) with the desired properties of minimum blob area and separation for finding these locations (step 289).

Figure 11:
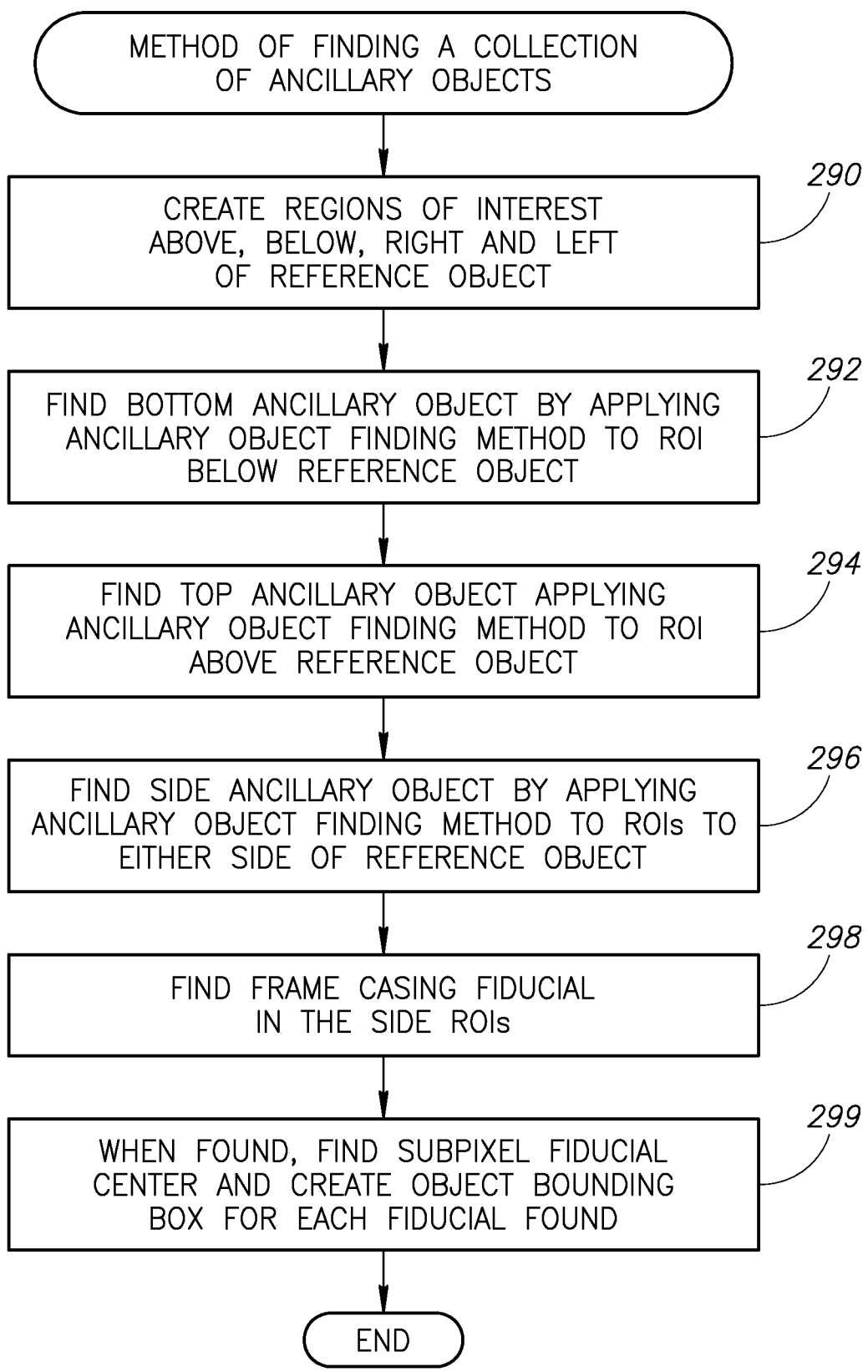
FIG. 11 is a flow diagram illustrating a method for finding a collection of ancillary objects.

A flow diagram illustrating a method for finding a collection of ancillary objects is shown in FIG. 11. This method is used to find a collection of ancillary objects. The number and location of ancillary objects may vary such that various steps of this illustrative method are optional and may be included depending on the particular implementation of the technology. To find the ancillary objects, regions of interest (ROIs) are first created above, below, to the right and to the left of the reference object (step 290). A bottom ancillary object is then found by applying the ancillary object finding method (FIG. 10) to the ROI below the reference object (step 292). A top ancillary object is then found by applying the ancillary object finding method (FIG. 10) to the ROI above the reference object (step 294). Any side ancillary object is then found by applying the ancillary object finding method (FIG. 10) to ROIs on either side of the reference object (step 296). A frame casing ancillary object fiducial is then found using the side ROIs (step 298). When the frame casing ancillary object fiducial is found, the subpixel fiducial center is then located and an object bounding box is created for each fiducial found (step 299). Any of these ancillary objects are acceptable if their geometric properties are within specified ranges relative to the location, size, and/or orientation of the reference object.

In addition, the ancillary object and/or the reference object may have printed a pattern that enables detection of poor focus or camera movement at the time of capture using modulation or edge strength measurements, such as a Siemens Star. If camera movement is detected by finding directional blurring, suggestions for inhibiting movement in a re-capture of the scene may be provided. If poor focus is detected by finding general blurring, the software may suggest ways to inhibit movement during capture, making sure the camera finds focus before capturing and if focus problems repeat may suggest using a different capture device.

In one example, the user will have been instructed to place the ancillary objects in regions relative to the reference object and the backlit or dark pane and the ancillary object's fiducial pattern may be, for example, an hourglass or chessboard distinguishable by array size from that on the reference object. The image is searched by template matching or correlating the corresponding template over the region(s) of interest to create a search image. For example, two ancillary objects on which hourglass shaped fiducials are printed may be placed horizontally below and vertically to one side of the reference object. Such ancillary objects may have an edge that is highly contrasting to the sash and frame to allow the contrasting edge to be easily found for subsequent measurement of sealing interface locations or inward facing edge locations.

Other useful ancillary object locations include at the frame casing edge in region of interest to the side of the reference object and/or with one or more edge abutting the top of a pane for cases where a non-movable obstruction, such as a window treatment, may be present. Such ancillary objects will each contain multiple fiducials along its length. Those that are visible below the obstruction are located and may be used to calculate the position of the obstructed edge using the relationships between the most widely separated fiducial patterns on the object in pixels and their known separation on the object to define a scale, finding the visible lower edge using a light/dark template and template matching, and using the scale and known object dimension to estimate the location of the obstructed edge at the top. Alternatively, because such objects have been aligned with the top edge of the pane, the bottom edges or equivalently the bottom fiducials may be used to define a line near and parallel to the top of the pane for subsequent analysis and used to aid the pane finding and perspective transform determination methods described below.

If there is a mismatch between the number and/or location of ancillary objects found by the automated method and the user metadata expected number and location of ancillary objects, a message may be sent to the user with suggestions for re-capturing the scene so that the ancillary objects in the scene match the metadata. When found, the subpixel fiducial centers on each ancillary object are found and an ancillary object bounding box is determined using the relationship between these centers in the image and the nominal dimensions of the object. One use of an ancillary object is to aid in the location of an obstructed pane edge, such as the top edge of a pane covered by a window treatment as described below.

Figure 12:
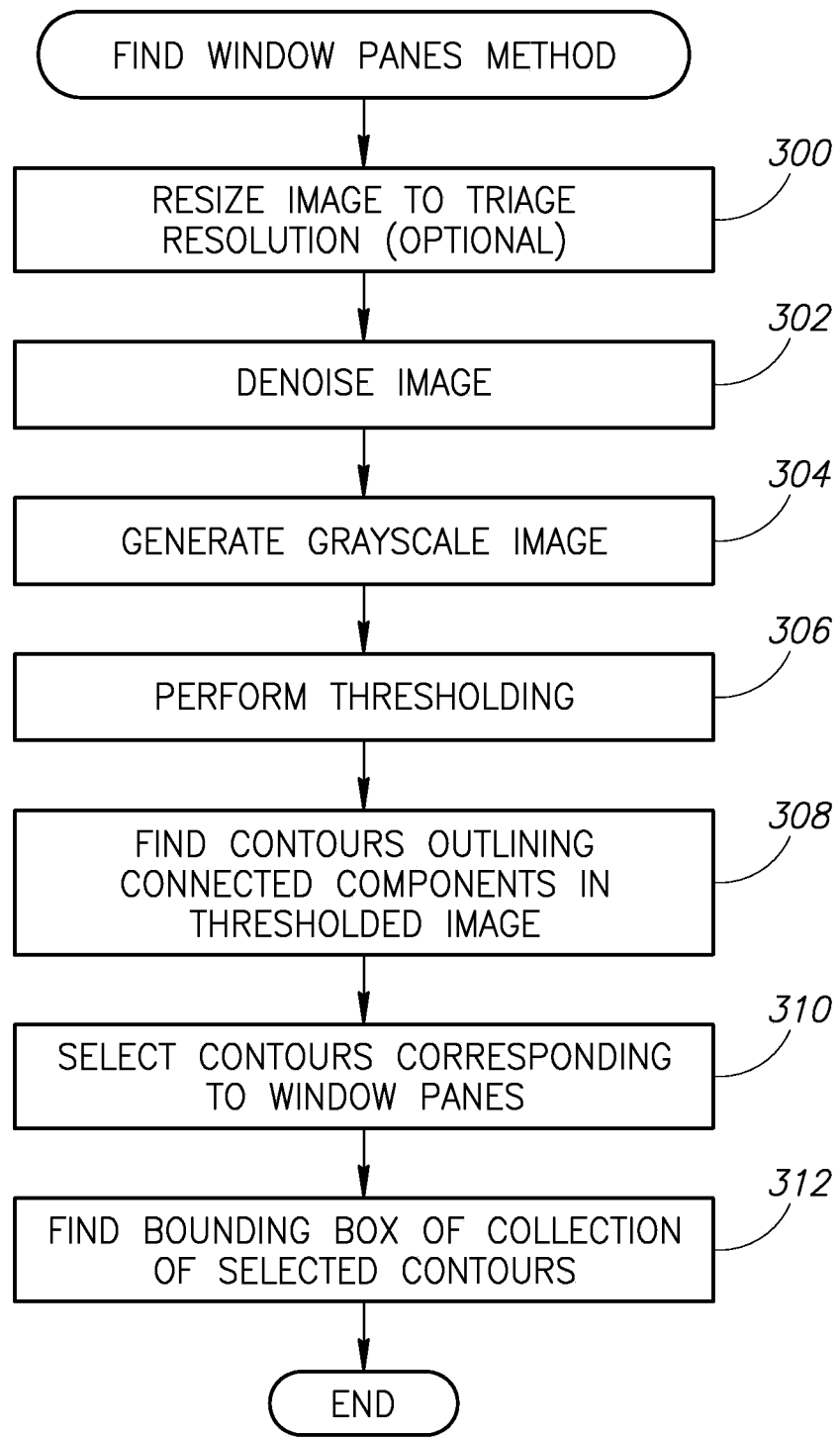
FIG. 12 is a flow diagram illustrating a method for finding window panes.

A flow diagram illustrating a method for finding windowpanes is shown in FIG. 12. As described above, the captured image may optionally be resized to triage resolution (step 300). A bilateral filter may be used to denoise the image (step 302) and the image is made grayscale (step 304). The dark parts of the image are found by performing binary thresholding (step 306). Such thresholding may be performed by applying one or more of Huang, minimum, intermodes, fixed threshold, adaptive local threshold such as OpenCV adaptiveThreshold, or using variable or dynamic thresholding by first calculating the gradient and searching in the subsection of image pixels. The binarized image resulting from thresholding will contain one or more connected components corresponding to dark portions of the scene.

The edge of each component may be traced to provide a closed contour that contains the component using, for example, the findContours function of OpenCV (step 308). Dark portions identified in this way are examined to remove those that are too near an image edge, too small or too large relative to the image area, too narrow in its aspect ratio, or too irregular in shape. A dark portion is deemed to be sufficiently regular in shape ("sufficiently rectangular") if the locations of its edges are tightly enough distributed, ignoring small protuberances and invaginations as well as ignoring areas known to contain reference or ancillary objects. For example a histogram of the left, right, top and bottom locations of a contour can be computed and the ratio of the areas of rectangles with vertical and horizontal edges passing through the 25th percentile (outer box) and inner 75th percentile (inner box) can be compared using an upper bound threshold to measure the departure from an ideal value of one attained by a non-rotated rectangle.

In the case where the problem of non-rectangularity is along the top, the portions of the contour that are above the line determined by the top ancillary object may be replaced by points along the line. Those contours are judged to be sufficiently rectangular (step 310). The sufficiently rectangular pieces form a collection around which a bounding box is found for the dark pane area (step 312). If sufficiently rectangular dark portions of the image are not found, an alternate thresholding method may be tried, and if no alternate succeeds, feedback may be provided to the user that the scene should be imaged when the pane background is dark or that objects may be obstructing the pane that should be removed from their obstructing positions.

In some instances, reflections, features of the sash holding the windowpane or features to the exterior of the window pane (e.g., storm windows) may lead to more than one detected image edge near the actual windowpane edge in the image. In such cases, it may be helpful to identify these edges and send to the user, service provider or designer an image defining choices for such edges. After human viewing of the image with defined edge choices, the user, service provider or designer may provide input with the best edge choice for the windowpane. For example, preferably after applying the perspective transform described below, thresholding may be performed as described above.

Template matching, using a black/white template, may be applied in the pane edge region to generate a template matching criterion curve that contains peaks for high value matches to the template. Such peaks correspond to edges that may correspond to the actual pane edge in the image. For each peak of the template matching criterion curve, a line having a unique characteristic to each peak (e.g., color, dash, etc.) may be respectively drawn on the image. Each line may be made visible to the user, service provider or designer properly aligned with a pane edge in the image thus allowing choice of the correct pane edge by the person viewing the image. The person viewing this image may then provide their choice for the correct pane edges as metadata to the service provider and the choice may be used in subsequent steps of the image processing.

Figure 13A:
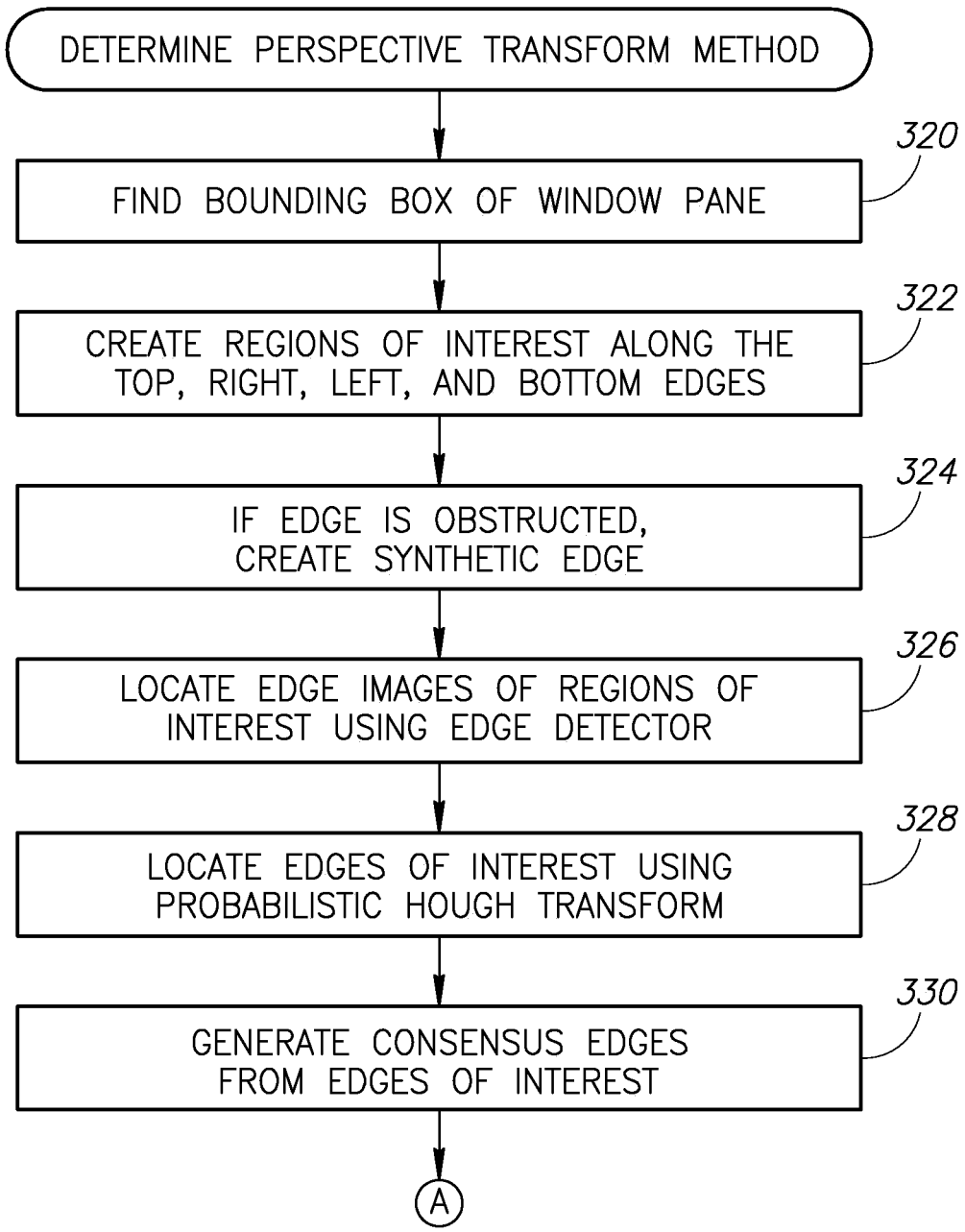
FIGS. 13A and 13B are flow diagrams illustrating a method for determining a perspective transform.
Figure 13B:
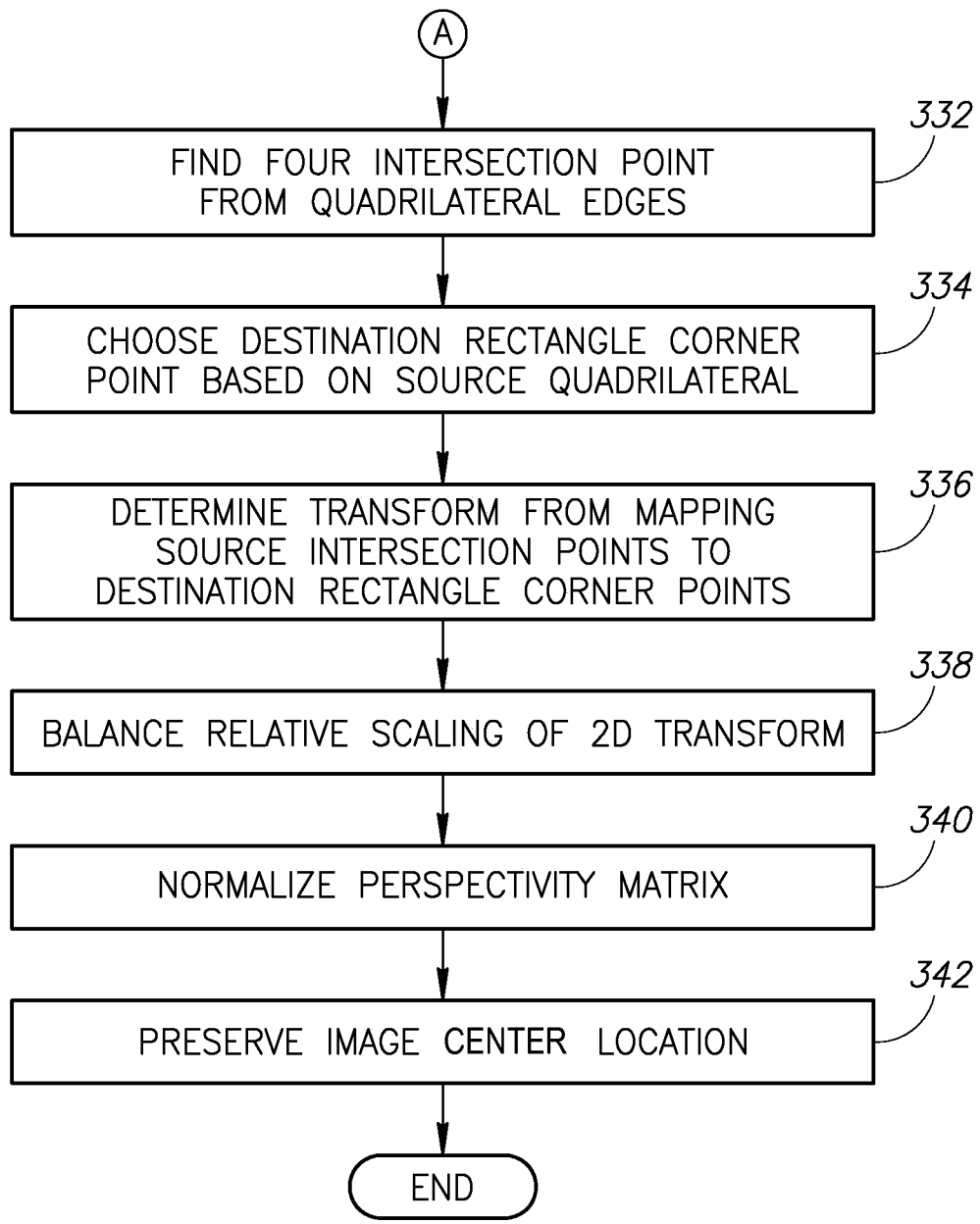

Flow diagrams illustrating a method for determining a perspective transform are shown in FIGS. 13A and 13B. The bounding box of the window pane is first located (step 320). Regions of interest are then defined along the top, right, left and bottom edges of the bounding box around the dark pane area (step 322). For cases in which the true top edge of the pane is obscured and the top edge is defined synthetically (step 324) as described above, processing of the top region of interest is not performed and the synthetic top line is used instead of processing the top region of interest to obtain an edge line as described below. Edge images of the regions of interest are then created using an edge detector, such as a Canny edge detector (step 326). The parameters used for the Canny edge detector may be obtained by serially obtaining edge images with different parameters and examining them for suitability. The reference object fiducial may be used to provide image by image tuning of the Canny parameters and the parameters may be different for the high and low resolution images of the same scene. Edges corresponding to reference or ancillary objects may be removed from the edge image.

Figure 14:
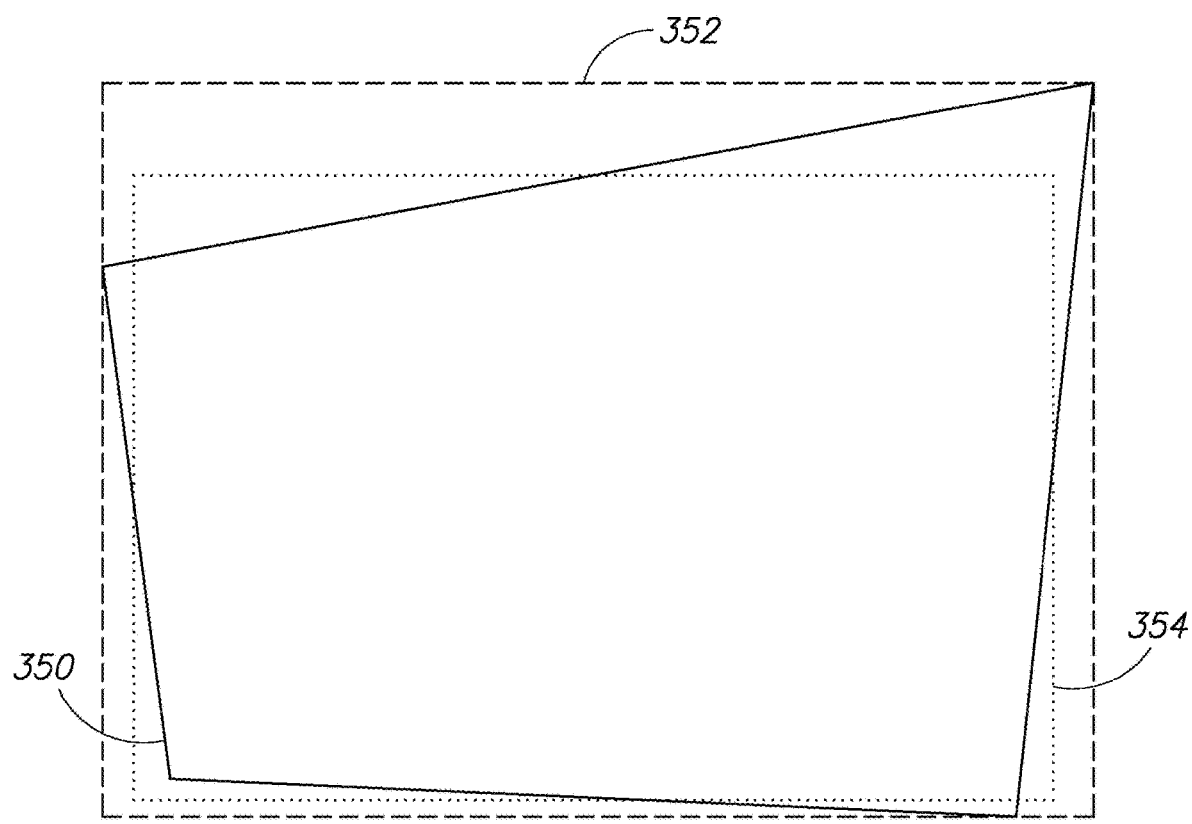
FIG. 14 is an illustration of destination points of a perspective transform.

A probabilistic Hough transform locates edges of interest and a consensus edge is created from the edges of interest along each of the four sides of the bounding box (step 328). The consensus edges are generated from the edges of interest (step 330). The intersection points of the consensus edges are used as the source points for determination of the perspective transform using a method such as that used in OpenCV getPerspectiveTransform (step 332). The destination points for the perspective transform are the corners of the tightest rectangle having vertical and horizontal sides that encompasses all of the source points or preferably a rectangle with vertical and horizontal sides passing though the midpoints of the consensus edges (step 334), as shown in FIG. 14 where dashed box 352 represents the corner constraint box and dotted box 354 represents the midpoint constraint box drawn around the image 350 (solid box). The perspective transform based on either of these sets of destination points may not preserve the aspect ratio of objects in the scene, nor will the overall size of objects or the location of the center of the image be preserved. It is desirable to modify the 3 by 3 perspectivity matrix representation of the transform to accomplish these ends. First the triage image is transformed using a method such as that used in OpenCV warpPerspective to obtain a perspective corrected triage image. It is preferred to map destination pixels to source pixels to avoid artifacts. Interpolation may be performed by resampling using pixel area relation. These properties are available in the OpenCV warpPerspective function.

Figure 29:
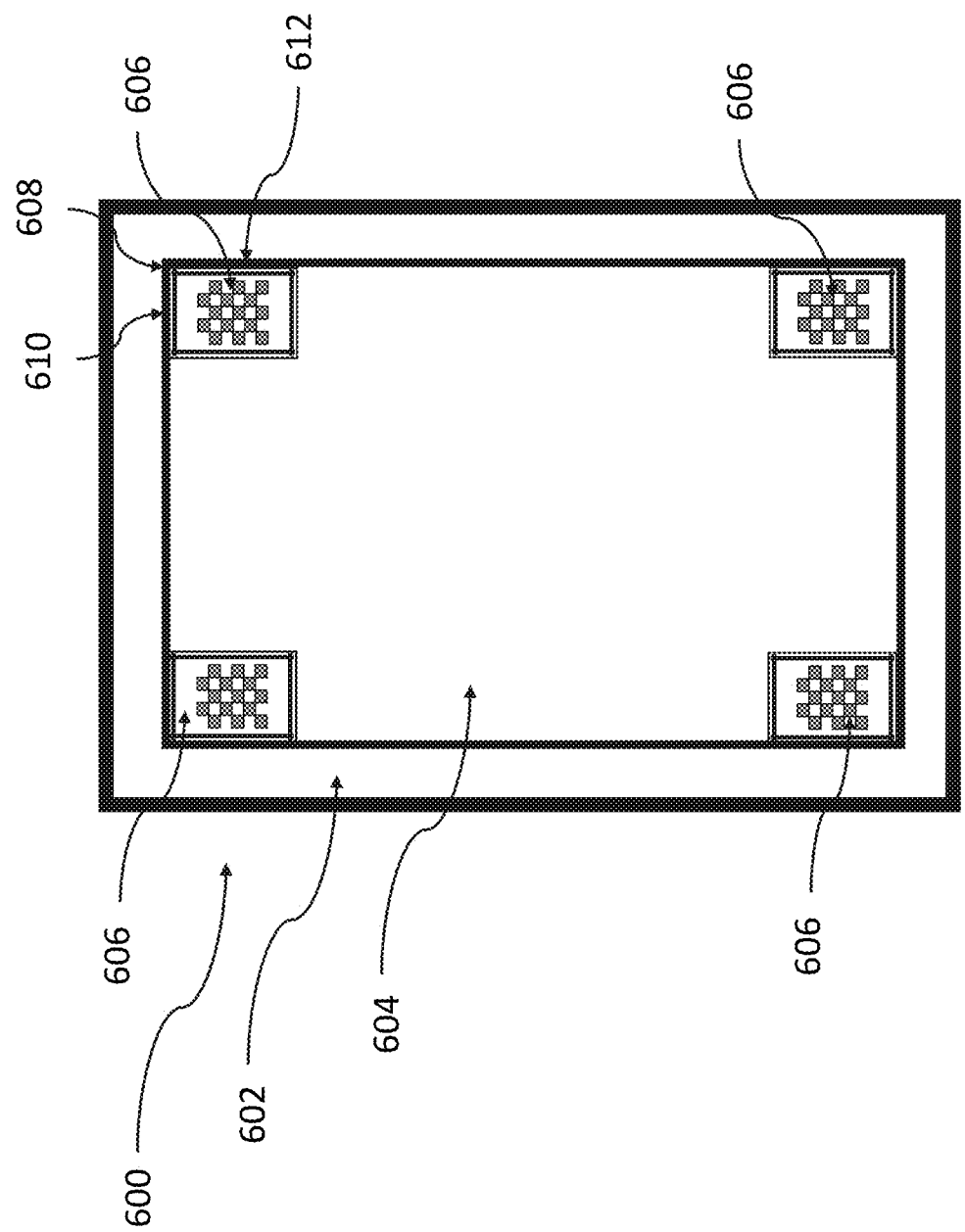
FIG. 29 is a diagram illustrating an exemplary use of two reference objects.

In another example, the four source and destination corner locations are determined from two reference objects and pane corner ancillary objects. Alternatively, four reference objects, each placed at one of the windowpane corners, may be used as illustrated in FIG. 29. Window 600 has frame or sash 602 holding windowpane 604. At each of the four corners of windowpane 604, reference objects 606 are placed such that a corner 608 and two adjacent edges 610 and 612 of each reference object 606 respectively abuts a corner and two adjacent frame or sash edges adjacent to the viewable area of windowpane 604. Though reference objects 606 shown in FIG. 29 have the same fiducial pattern, it will be appreciated that reference objects 606 may have different fiducial patterns. The use of four reference objects may be particularly beneficial for camera calibration and/or measuring dimensions of windowpane or other target object lengths greater than about 60 inches. It is also noted that when more than one object 606 is used, only one of the objects need function as a reference object while one or more of the remaining objects 606 may function as one or more ancillary objects.

The reference object is then relocated in the perspective corrected triage image, and measured to determine the pixels per unit length values as described in the discussion of FIG. 9 above (step 336). In the case these values are not identical, the first row of the perspectivity matrix may be multiplied by the ratio of the pixels per unit length in the vertical and horizontal directions to balance the rows in a way that aspect ratios would be preserved (step 338). Once the rows are balanced, the overall scaling of the transformation may be determined using methods described in detail below wherein relationships between a two-dimensional perspectivity matrix and a related three-dimensional perspectivity matrix are discussed. In that discussion, a method by which an overall scaling parameter s may be determined is described. The homogeneous coordinate hc of the image center is determined by multiplying the third row of the perspectivity transform and the coordinates of the image center. The first two rows of the balanced perspectivity transform are then multiplied by hc and divided by this value of s to normalize the transform so that the overall scaling parameter is 1 (step 340).

Finally, a shift in the location of the image center is determined by applying the balanced and normalized perspectivity matrix to the location of the image center in the triage image to obtain its position in an image that would be obtained using that matrix using a function such as OpenCV perspectiveTransform. This shift is used to adjust the translation vector located in the first two rows of the third column of the perspectivity matrix by subtraction so that the location of the image center is preserved (step 342). This balanced, normalized and center preserving transform becomes the final triage image perspective transform. The determined transform parameters may be used to automatically decide whether the scene should be re-captured and guidance provided to the user to move closer to the projection of the window center for the re-capture of the scene using methods described in detail below. After the transform is determined, repeated correction of the perspective distortion in the triage resolution image is optional. As described below, the triage image perspective transform may be used to transform higher resolution images prior to steps needed for measurements. While the above description utilized the pane bounding box to determine source points for the perspective transform, the reference object bounding box obtained in step 272 may be used for this purpose.

Figure 15:
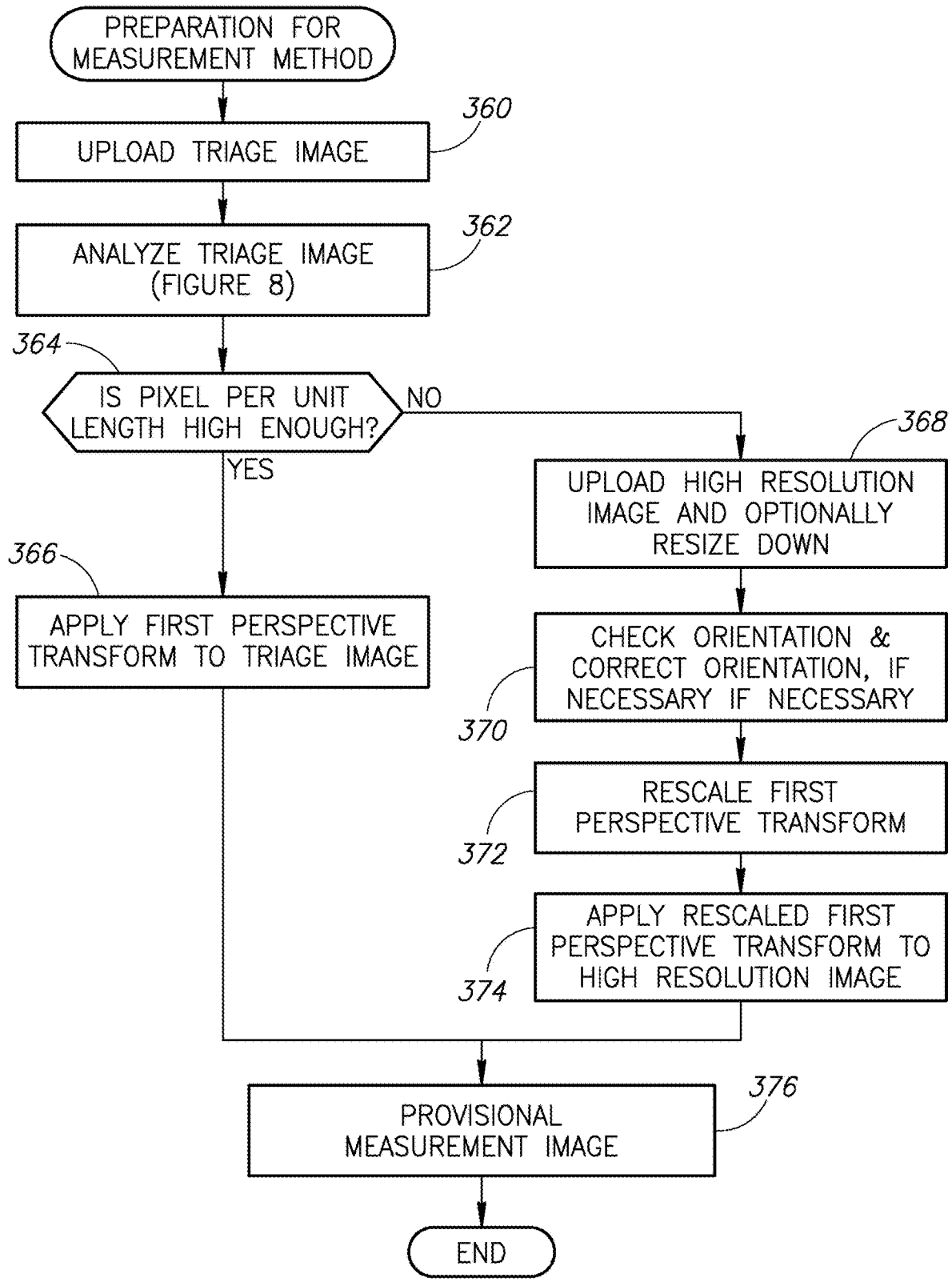
FIG. 15 is a flow diagram illustrating an example preparation for measurement method.
Figure 16:
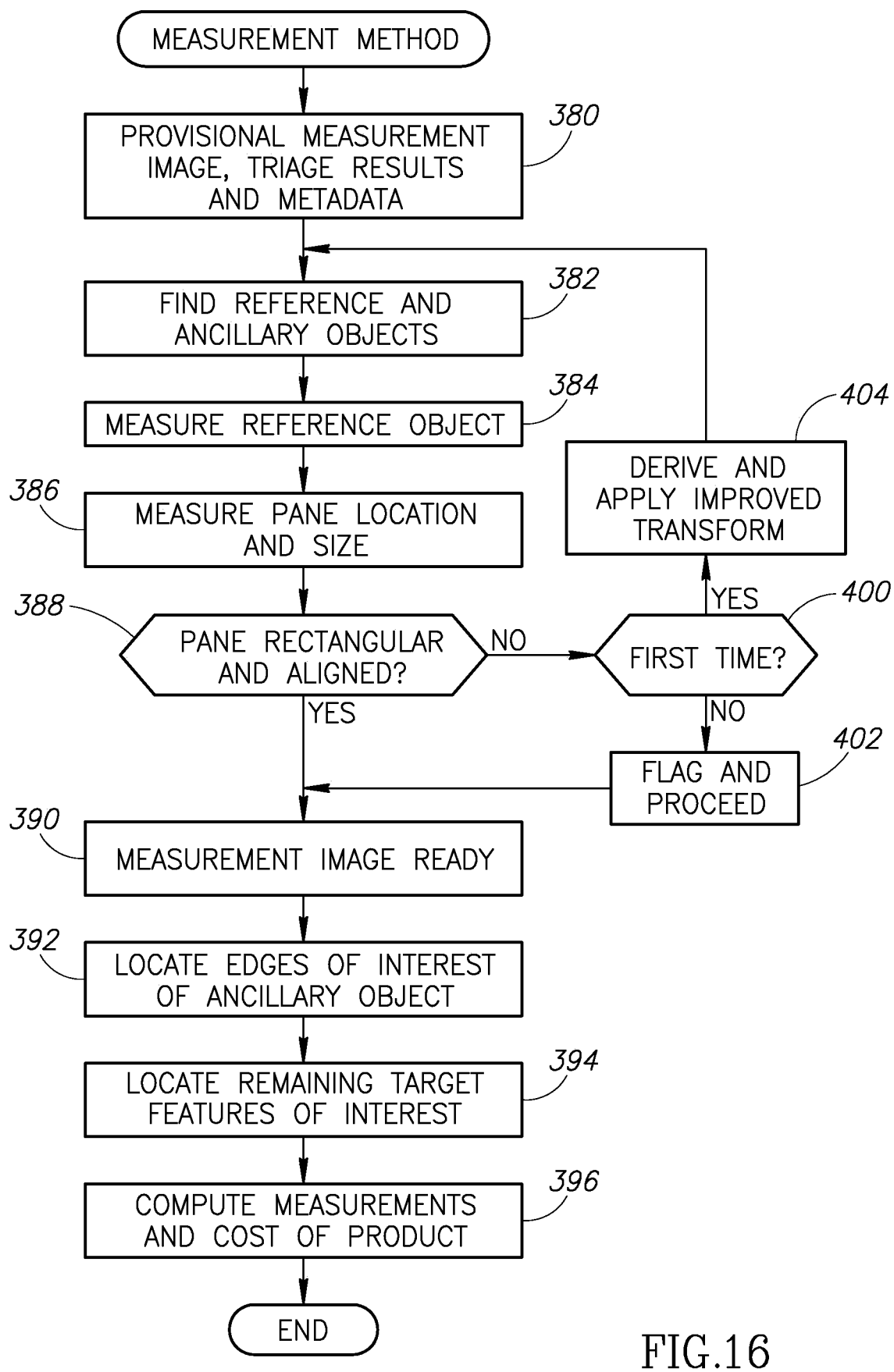
FIG. 16 is a flow diagram illustrating an example measurement method.

A flow diagram illustrating an example preparation for measurement method is shown in FIG. 15. The method of measuring target objects in the scene is shown in FIG. 16. With reference first to the method of FIG. 15, to prepare for the measurement the triage image is uploaded (step 360) and analyzed as described in FIGS. 8A and 8B (step 362). This analysis provides a measured value for the pixels per unit length in the plane of the reference object. This triage value should be chosen to be at least 10 pixels per inch, preferably at least 15 pixels per inch, more preferably at least 30 pixels per inch. If the chosen triage value is exceeded by the measured value (step 364) in the analysis of the triage image, transmission of the high resolution image may be aborted and the triage image may become the Provisional Measurement Image (376) after applying the perspective transform to the triage image (step 366). If the triage value is not exceeded (step 364), the higher resolution image transmission is completed (step 368).

The high resolution image orientation is determined and, if necessary corrected (step 370). The first perspective transform determined, for example as shown in FIGS. 8A and 8B, for the triage image is rescaled (step 372), for example by using a matrix similarity transform to adjust for scale difference, and applied to the high resolution image (step 374) to form the Provisional Measurement Image (step 376). Such Provisional Measurement Image has vertical and horizontal features in the scene that are substantially, although not necessarily exactly, vertical and horizontal in the image. Of particular importance, removal of the bulk of perspective distortion results in more accurate measurements of the reference object.

One example for image processing workflow may be completed as shown in FIG. 16. This workflow employs results from the triage resolution analysis, including, for example, object (reference object, ancillary object and window pane) locations, the perspective transform and metadata (step 380). It is important to note that even after all perspective distortion is removed from the scene, the reference and ancillary objects may still be rotated relative to the window due to manual placement variability and may contain some aspect ratio distortion after the perspective correction is applied. The transform can also be applied to coordinates of the locations of objects in the scene from the triage resolution analysis to aid in determining smaller regions of interest for efficient location of these objects in the provisional measurement resolution image, for example, to find reference and ancillary objects and window panes.

Using location information from the triage resolution image analysis and following the method described for the triage resolution image workflow, the reference object is found and its dimensions measured (step 382). Similarly, the ancillary objects and windowpane are found using location information from the triage resolution image analysis and the methods described for that analysis (step 382). When the pane edge locations are found in the image using the same light/dark template matching method as used to determine the edges lines of the reference object (step 384), the slopes of these edge lines defined in such a way that the vertical lines have zero slope along the sides and horizontal lines have zero slope along the top and bottom are also recorded.

These slopes are then tested to determine if the transformed image of the pane is rectangular and aligned to the image axes (step 386). If the slopes are all the same to within a determined tolerance (step 388), the pane is determined to be rectangular. If the slopes are all zero to within a second determined tolerance, the pane is determined to be aligned. If both of these conditions are met, an improved transform is not needed, resulting in enhanced performance by avoiding the need to compute and apply a second transform and relocate the objects and pane (step 390). This is typically the case in many images.

If either of the above conditions is not met for the first time (step 400), a final transformation may be determined using the edge locations and slopes to directly define source and destination points analogously to the method used to determine the transform in the low resolution workflow (step 404). This transform may then be applied to the first transformed provisional measurement resolution image to obtain a final transformed image, the measurement image, and recomputing the object and pane finding steps. The rectangularity and alignment tests may be reevaluated and, although it is possible to repeat the loop upon failure, typically at most a single final correction is required. Therefore, the potential failure is noted for review and the method continues as if it had succeeded (step 402). When the measurement image is ready, it may be downsized and stored if desired.

For ancillary objects described above, the outward high contrast edge lines associated with them are found and their locations determined to allow locating target objects or features of interest with respect to the nearest parallel pane edge (step 392). These locations may be found using template matching or correlating with a template that is dark in one half and light in the other with template orientations chosen according to the edge direction and darkness/lightness pattern of interest. Locations of these features may be determined using techniques such as dark/light template edge matching or correlating. Windows may include additional features of interest such as muntins or grids, check rails, or mullions that are easily locatable in the scene given pane edge and ancillary object locations (step 394). For example, muntins may be located using a number of techniques including employing end user provided metadata regarding the muntin pattern, or by automatically locating the muntins using standard muntin patterns in conjunction with methods such as scale-invariant feature transform, speeded up robust features object detection software and using machine learning algorithms. While the above method provides for a full automation of measurement, the measurement image may also be provided to the end user and/or designer, optionally with identification of ancillary object edges of interest, so that the target object edge locations can be confirmed or adjusted by the end user or designer.

Using the pixels per unit length calculated when finding the reference object in the measurement image, the pane dimensions for the pane on which the reference object resides may be directly calculated from the pane pixel dimensions in the measurement image (step 396). Such dimensions may be used to directly specify a pane related product or may be combined with other measurements to specify other products that may relate to sealing interfaces, inward facing frame dimensions or frame casing related products including pane related and other such products as described in more detail in co-pending U.S. patent application Ser. No. 14/315,503, to Wexler et al., entitled "Supplemental Window For Fenestration", filed Jun. 26, 2014, incorporated herein by reference in its entirety.

Figure 17:
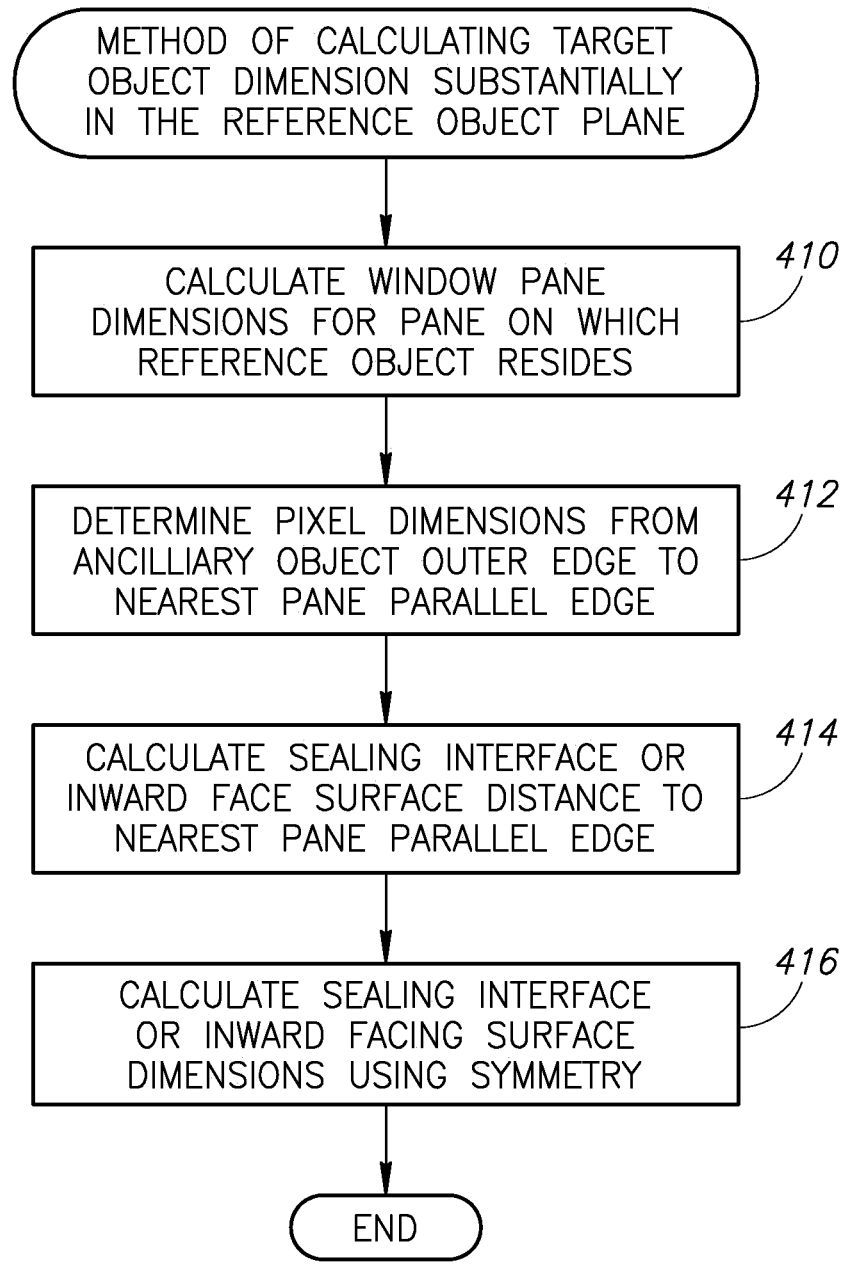
FIG. 17 is a flow diagram illustrating an example method for calculating the target object dimension substantially in the reference object plane.

A flow diagram illustrating an example method for calculating a target object dimension substantially in the same plane as the reference object is shown in FIG. 17. When the user metadata indicates that a product relating to, for example, sealing interfaces or inward facing frame surfaces is desired, the dimensions of the window pane on which the reference object resides is calculated (step 410) as described above. The pixel distance from the side ancillary object outer vertical edge that identifies the sealing interface or inward facing frame surface location to the nearest vertical pane parallel edge is determined (step 412). The pixel distance determined in step 412 may be converted to a physical distance using the horizontal pixels per inch to obtain the horizontal distance from the pane edge to either the sealing interface or inward facing surface (step 414). Such a distance may be useful in specifying auxiliary parts as described in U.S. patent application Ser. No. 14/315,503. The pixel distance determined in step 412 is then multiplied by two (taking advantage of symmetry) and added to the pane horizontal pixel dimension, the sum of which is converted to a horizontal physical dimension using the horizontal pixels per inch calculated when finding the reference object for the measurement image (step 416). Similarly for the vertical dimension, the pixel distance from the bottom ancillary object outer horizontal edge to the bottom pane edge is determined, multiplied by two and added to the pane vertical pixel dimension found for the measurement image. This is converted to a physical dimension using the vertical pixels per inch calculated when finding the reference object for the measurement image.

Figure 18:
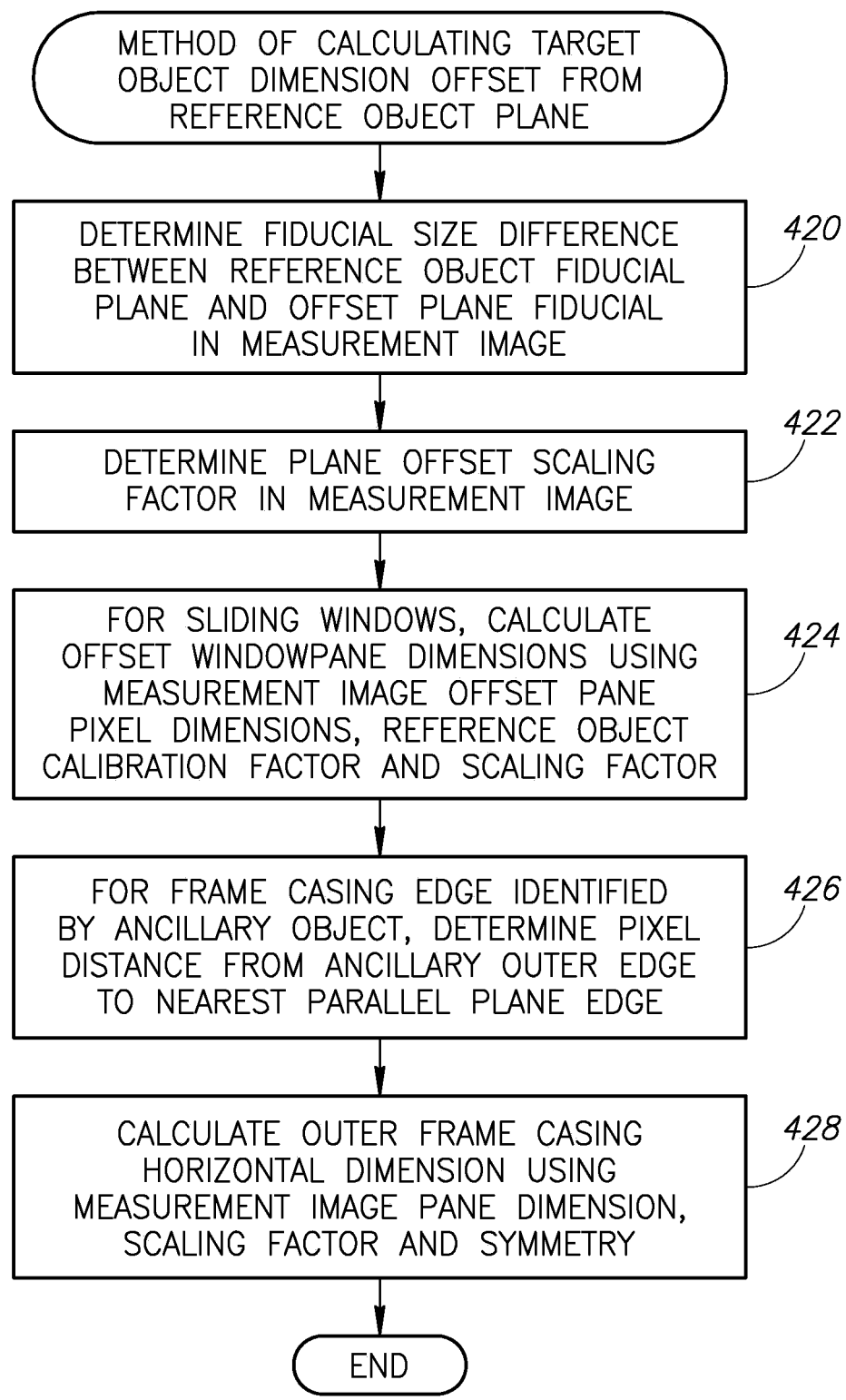
FIG. 18 is a flow diagram illustrating an example method for calculating the target object dimension offset from the reference object plane.
Figure 19:
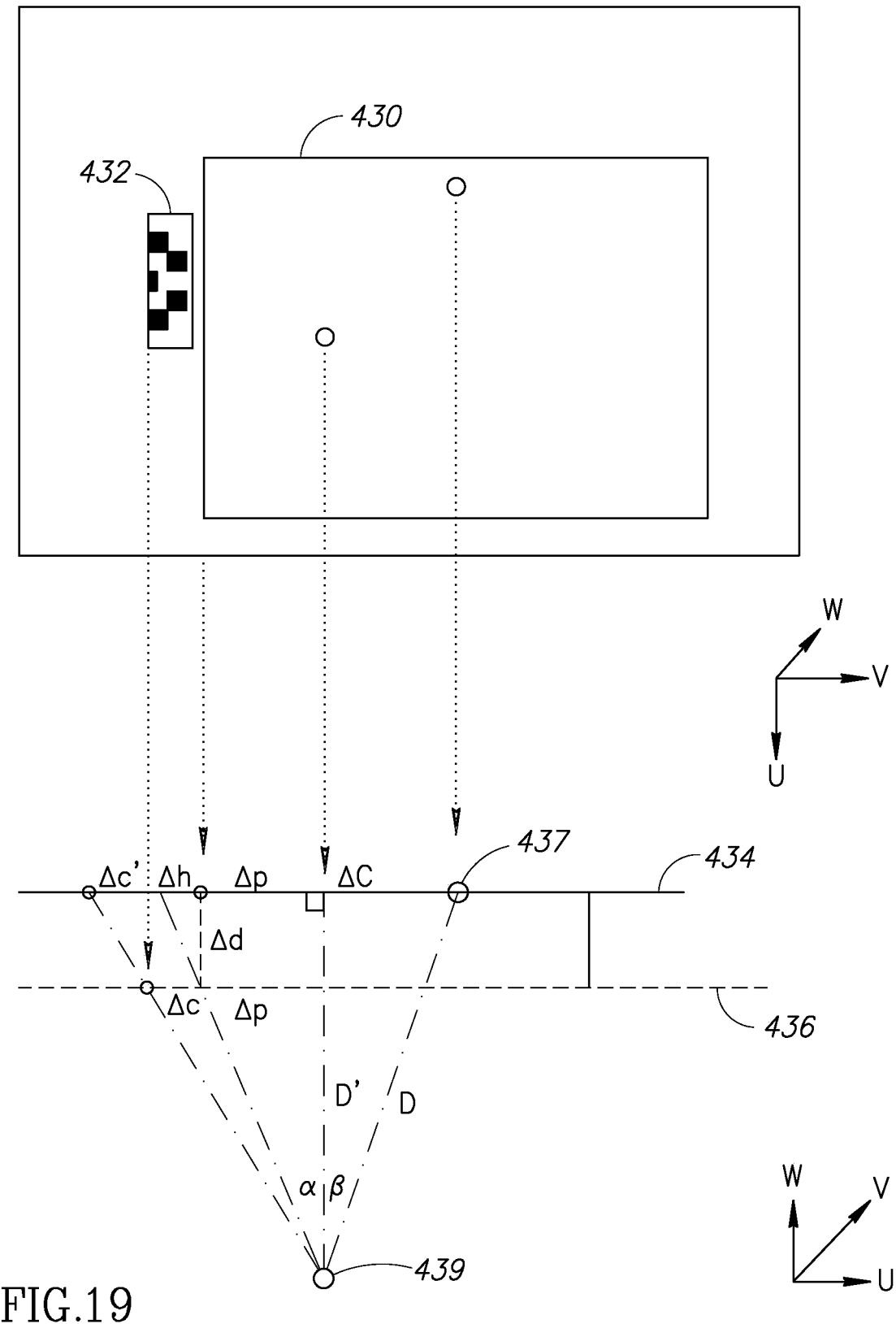
FIG. 19 is a diagram illustrating orthographic and top views of offset plane measurements.

A flow diagram illustrating an example method for calculating the target object dimension offset from the reference object plane is shown in FIG. 18. For dimensions that are not substantially in the same plane as the reference object, fiducial size differences relative to the reference object (step 420) may be used to make adjustments needed to account for out-of-plane scale distortions induced by the use of the pane plane projection transform and may be used to calculate corrected pixels per inch for the plane of interest to allow for more accurate measurement of such dimensions. These out of plane distortions include both magnification, with objects in closer planes appearing larger and further planes appearing smaller, and translation, with objects shifting their position according to their distance from the camera location in their plane as shown in FIG. 19, using methods based on geometric scene reconstruction described below.

The relative pixels per unit length (i.e. plane offset scaling factor) for a fiducial in an arbitrary plane and the reference object on the pane in the transformed measurement image (step 422) together with geometric scene reconstruction also allows estimation of the distance between the planes, for example the distance between the planes containing each pane of a vertical or horizontal sliding window (step 424). These methods may be used, for example, to locate edges of a window's frame casing when a fiducial is used to identify the outward-most frame casing edge (step 426). The symmetric horizontal offset of the outer frame casing on each side of the pane is used to calculate the outer frame casing horizontal dimension using the measurement image pane dimension and scaling factor (step 428). These methods may also be used to locate points on a single or double hung window top sash on which a fiducial containing ancillary object has been placed, to correct the locations of various points in the top sash pane plane. Symmetry and/or machine learning may be used as an alternative to this approach for the vertical sliding window top (exterior) sash when the reference object is placed on the bottom (interior) sash. With product specification calculated, a corresponding product cost may be determined and provided to the end user, for example in a digital shopping cart. In addition, the dimensions of the specified product may be provided to a product designer and/or fabricator.

It should be noted that a camera calibration model that allows correction of other distortions due to lens design and sensor to lens alignment may be obtained by analysis of several images of a sufficiently complex pattern that covers a sufficiently large portion of the image. Such models are typically incorporated into the camera software to obtain distortion free images and are trivially added as a preprocessing step if a camera is discovered to have such distortions. Alternatively, an image containing two or more reference and/or ancillary objects, each having a fiducial pattern, placed at the corners of a rectangular windowpane may be used to both identify corner locations and act as internal camera calibration targets for the image. In this case, the internal calibration targets may be located in an outer third of the image. In the description below, it is assumed that such a camera calibration model has been applied to obtain the original image into which a reference object has been placed. In the above described methods the perspective transform derived using coordinates of pane corners to establish source and destination points does not in general preserve aspect ratios of physical objects in the plane of the pane. These distortions require the use of two separate scaling factors for converting vertical and horizontal displacements in pixels into physical units. A method, in which the transform does preserve aspect ratio and which has other advantages, will now be described. Camera calibration methods employed in the present technology may include any of those known in the art, such as for example Zhang's camera calibration algorithm and those described in Wilhelm Burger: Zhang's Camera Calibration Algorithm: In-Depth Tutorial and Implementation, Technical Report HGB16-05, University of Applied Sciences Upper Austria, School of Informatics, Communications and Media, Dept. of Digital Media, Hagenberg, Austria, May 2016, the disclosure of which is incorporated herein by reference in its entirety.

The substantially planar reference object comprising a pattern having four or more locatable points with nominal positions and recognizable using image analysis methods described above, such as chessboard corner finding, dot grid center finding, QR barcode finding or similar pattern finding is placed in the scene and found as described above. The pattern on the reference object contains information sufficient to determine general image orientation and a combination of transposition, vertical flip or horizontal flip operations may be used to correct the orientation as described above.

The locatable points are measured and the measured locations and nominal locations are used to derive a nominal printed pattern mapping in the form of a 3×3 projectivity matrix, also known as a perspective transform. This derivation may be performed using, for example, the method used in OpenCV getPerspectiveTransform for four points or findHomography for four or more points. Such a mapping defines a relationship between nominal points in the plane of the reference object and points in the image. When image locations are used as source points and nominal locations are used as destination points, the derived nominal inverse mapping would be from image point locations to nominal point locations. Such a transformation is invertible to form a nominal capture mapping and together with the nominal inverse mapping allows mapping points between the nominal reference object plane and the image in either direction. A capture mapping can be found by switching the roles of source and destination in the routine used to derive the transform.

A nominal scaling between image distance units in pixels and nominal distance units is easily obtained by applying the nominal capture mapping to a pair of nominal points that are one unit apart and computing the distance between the points in image pixel units. Such a pixel per distance scale factor can be applied to the nominal capture and inverse mappings by scaling the top two rows of the inverse projectivity matrix by the scaling factor and scaling the top two rows of the capture projectivity matrix by the inverse of the scaling factor to obtain projectivity matrices that may be used to apply to digital images represented by code values at pixel coordinates to obtain resulting digital images using digital imaging software such as OpenCV using its warpPerspective function without dramatic changes in overall resolution.

The reference object edges are then located in the image as follows. A scaled nominal inverse mapping may be applied to an entire image, for example using OpenCV warpPerspective, to obtain a nominal image in which the reference object pattern matches the nominal geometry in pixel scaled units. If the physical pattern locations match the nominal pattern locations exactly on the reference object and the mapping is exact, the edge locations in the nominal image are completely determined. When such a pattern is printed on paper, the printed pattern may be mispositioned on the page relative to its nominal geometry by scaling in one or both directions as well as translation on the page due to printer driver settings and further misplacement plus rotation within the plane due to paper to printer transport biases. Such misplacements are typically small, but lead to an uncertainty in the locations of the actual edges of the reference object in the image relative to the printed pattern.

In addition, the transformation itself is subject to errors due to measurement errors in the locations of the points used to define it. Therefore the edges of the printed pattern need to be located more precisely in order to define a relationship between physical locations of points in the plane of the reference object and points in the image. This may be accomplished by establishing locations in the nominal plane which contain the edges with a high degree of certainty, using the nominal capture mapping transform to determine approximate locations of these edges in the image, surrounding these image locations with sufficient additional height and width to create regions of interest in which an edge detection method may be applied, and then applying the edge detection method to define lines which match the location of the edges in original image coordinates.

In one example, the scaled nominal inverse transform is applied to the image or a portion of the image which contains the aforementioned regions of interest to create an image in which the edges are substantially vertical and horizontal and create regions of interest along each edge which contain the edge with a high degree of certainty and allow for use of an edge detection method to define lines which match the location of the edges in the scaled nominal image coordinate system. Regardless of the coordinate system in which the edges are located, the appropriate inverse or capture transform may be used to locate them in the other as needed.

The physical transforms may now be determined. Once the edge lines are located, a relationship may be developed which characterizes the relationship between nominal and physical locations of printed patterns on a reference object as well as a relationship between original image and physical locations. Four edge line locations may be used to infer locations of the corners of a rectangular reference object in the corresponding original image or nominal image coordinate systems. These may be used along with the physical dimensions of the reference object to define a perspective transform. If the edge lines are defined in the nominal printed pattern coordinate system, a Nominal to Physical model is obtained. This transform may be composed with the Image to Nominal transform to obtain an Image to Physical transform. Alternately, if the edge lines are defined in the original image coordinate system, an Image to Physical model is obtained. This model may be composed with the inverse of the Image to Nominal transform to obtain a Nominal to Physical transform. Again, to avoid drastic changes in resolution when applying a transform to images to produce an image, the Image to Physical transform is preferably scaled to produce results in pixel units.

The Image to Physical transform allows transformation of the original image into an image in which distances within the plane of the reference object that are measured in pixel units are directly proportional to physical distances by a pixel per physical unit ratio. Additionally, the aspect ratio of rectangular objects in this coordinate system is preserved for a rectangular object in any plane parallel to the plane of the reference object. The Nominal to Physical transform can be derived in matching units to allow transformation of other printed patterns into physical coordinates, enabling establishment of their physical size from nominal sizes, a feature useful in establishing sizes of other printed objects when they do not include known physical dimensions, such as printed patterns that are cut out of a page using cutters, scissors, or even fold and tear methods.

The image may now be transformed into physical coordinates. In this step, we apply the resolution preserving scaled image to physical inverse transform to the image. Preferably, this is achieved by inverse interpolation using the transform to determine the location in the original image corresponding to a location in the physical image and interpolating into the original image using these coordinates. This may be accomplished, for example, using the warpPerspective function of OpenCV.

Other objects placed in the scene may be located as described above. In those methods, the nominal dimensions of the patterns in the object design are used to aid in locating and measuring the patterns while analyzing images. These nominal dimensions may be converted to physical dimensions using the Nominal to Physical transform to obtain dimensions appropriate for use with an image in scaled physical units.

When the reference object is placed in the scene in a way that it is substantially parallel to the plane of the windowpane, it may be rotated relative to the natural windowpane coordinate system which we refer to as the world coordinate system. Location of a single edge of the pane in the physical image allows determination of this rotation and the rotational aspect of the physical transform in the upper two rows of the transform could be modified to obtain a final by multiplying by a rotation matrix that results in the pane edge being vertical or horizontal as desired. As all four edges are to be located in any case, the average rotation of the edges may be used along with the spread of the rotations to determine whether the only remaining effect is this rotation or whether there is some residual distortion that requires a further perspective correction. This correction will result in a very modest apparent aspect ratio distortion in the reference object as well as a very modest change in the scale factor derived from a unit physical vector that may be corrected by scaling corresponding rows in the perspectivity matrix.

In the present technology, there may be instances in which measurement of dimensions in parallel offset planes is desirable. For example, sliding or hung windows have panes in parallel planes that require measurement or the frame casing around a window may be in a different plane than the pane on which the reference object is placed. Also, the wall in which a window is mounted may be in a parallel plane offset from the reference object plane. In addition, there may be custom supplemental products for which complete specification requires a dimension estimate perpendicular to the plane of the window, such as described in U.S. Pat. No. 8,923,650, the disclosure of which is incorporated by reference herein in its entirety.

Using the reference object and ancillary objects, for example as described above, in offset planes, 3D projective geometric modeling together with information regarding the relationship between camera lens focal length and sensor size, typically described using a 35 mm equivalent focal length, may be used to analyze the 2D images obtained in the present technology to provide measurement estimates between and within the offset planes. In addition, such modeling may be useful in determining whether the image was captured from within the interior projection of the window. Although it is technically possible to determine a pose and position of the reference object or pane relative to the camera by analysis of the projectivity matrix, this commonly performed geometric scene reconstruction task may be accomplished directly using routines such as solvePnP provided in OpenCV given the same source and destination data together with camera intrinsic parameter data. The routine provides a rotation vector r and a translation vector T that fully describe the relationship between the set of world and camera coordinate systems. The rotation vector may be converted into an orthonormal rotation matrix R or vice-versa using the OpenCV Rodrigues function, which together with the translation vector may be used to form a set of linear equations, as shown in Equation 3 below.

$$\begin{bmatrix} x \\ y \\ z \end{bmatrix} = [sR \ sT] \begin{bmatrix} u \\ v \\ w \\ 1 \end{bmatrix} \qquad (3)$$

The camera information required to obtain the translation vector between the camera origin and the world origin includes both the focal length of the camera and the location of the camera axis, referred to as the camera principal point, in the image. One may use the center of the image in pixel units measured from the upper left corner as the principal point and define the focal length of the camera in pixels as well. The ratio of the length of the diagonal of the image in pixels to the focal length of the lens in pixels equals the ratio of the diagonal of a 24×36 mm rectangle to the 35 mm equivalent focal length of the camera. In addition, if these ratio values were known, the distance of the camera to the origin of the world coordinate system could be determined using this ratio and a known diagonal length. Information regarding these ratio values is publicly available from various sites on the internet and could be used to choose a value given camera identification information. A 35 mm equivalent focal length is often incorporated in image EXIF metadata. In cameras used in smartphones, the range of values of 35 mm equivalent focal length is typically within a 28-35 mm range, with many at or near 30 mm, and we have found that use of an approximately 30 mm assumed 35 mm equivalent focal length is effective at providing a camera focal length. When the solvePnP routine is provided these camera parameters together with the source and destination points in the camera image and world coordinates, the resulting rotation and translation information is in the camera coordinate system.

The translation in the world coordinate system may then be determined by multiplying the inverse of the rotation matrix, namely its transpose, times the translation vector and negating the result to obtain the world coordinates of the camera location both within the plane of the window as well as the camera-to-subject distance from that plane. This location may then be compared to the coordinates of the window boundaries to determine if the image was captured from within the orthographic projection of the window. Further, once a camera to subject distance is known, relative magnification of measureable objects in planes parallel to the plane of the reference object may be used to determine their distance offset along the camera axis which may be resolved into components in the world coordinate system, enabling estimation of plane to plane offset in world coordinates as well as their translation in the plane coordinates of the image after the inverse mapping is applied.

When doing projective geometry, a fourth row is added to account for ambiguity of locations of points in the real world along lines through the camera coordinate system origin, resulting in a model using homogeneous coordinates wherein points [x y z 1], [hx by hz h] and so forth are all regarded as identical. The model equation relating coordinates [u v w] and [x y z] is now nonlinear, but can be expressed using a linear set of equations encapsulated into a 3D projectivity matrix followed by rescaling using the fourth coordinate as shown below in Equation 4:

$$\begin{bmatrix} hx \\ hy \\ hz \\ h \end{bmatrix} = \begin{bmatrix} sR & sT \\ H & 1 \end{bmatrix} \begin{bmatrix} u \\ v \\ w \\ 1 \end{bmatrix} \quad (4)$$

The 2D model for the pane plane is obtained by deleting the third column, as w=0, and the third row since we are concerned only with the image plane. A 2D transform that applies to another plane parallel to the plane of the pane is related to the 2D transform for the plane of the pane by changes in the offset T and the scalings s and h that depend on the distance between the planes, the third entry in H and the third column of R. A general form valid for any w is given by Equation 5 below:

$$\begin{bmatrix} h'x \\ h'y \\ h' \end{bmatrix} = \begin{bmatrix} s'R_{uv} & s'T'_{xy} \\ H'_{uv} & 1 \end{bmatrix} \begin{bmatrix} u \\ v \\ 1 \end{bmatrix} \quad (5)$$

wherein Ruv is the upper left 2×2 block of R and the remaining items are given by Equations 6 through 9 wherein Hw is the third element of H, Huv is a 2-vector comprising the first two elements of H, Txy and T'xy are 2-vectors comprising the first two elements of T and T' respectively, and Rxy,w is a 2-vector comprising the first two elements of the third column of R, as follows:

$$h' = h/(1+wH_w) \quad (6)$$

$$s' = s/(1+wH_w) \quad (7)$$

$$H'_{uv} = H_{uv}/(1+wH_w) \quad (8)$$

$$T'_{xy} = T_{xy} = wR_{xy,w} \quad (9)$$

If a 2D model is provided that applies for w=0, this process may be substantially reversed to create a full 3D model form in which all but two of the elements of the projectivity matrix are determined. The fact that the upper left 2×2 in the 2D model is a scaled copy of the upper left 2×2 of the 3D model allows determination of the third row and column using properties of a full rotation matrix R. The orthonormal matrix R has the property that the sums of the squares of the elements of the rows are all equal to one and that the sums of products of elements in different rows are all zero. Since we have only two of the three elements in each row of the 2D model and they have been scaled by the same number, we have two unknowns to determine the first two rows of the scaled 3D rotation matrix. We can use the orthonormality of R to generate two equations which determine these values to within a sign. Once these values are chosen, a scale value s can be determined as the root sum square of either row. Finally, a third row is obtained by taking the vector cross product of the first two rows, resulting in a vector with length equal to the square of the scale value, so it may be rescaled by dividing by the scale value s.

The sign ambiguity in the first two elements of the third column results in a paired ambiguity in the first two elements of the third row. The sign ambiguity may be resolved by examination of the location in the original image of the corners of a rectangle surrounding the image center using the 3D model, choosing the sign that results in the appropriate sign of z. The distance increment from the camera, z, is positive in areas where the corners are closer to the center of the original image and negative in areas where the corners are further away from the center. This model may be used for the plane where w=0 without determining the third elements of H and T, but if it is to be applied to another plane wherein w is not zero, the model is not well defined. For purposes of determining a rotation vector however, the rotation matrix R is fully defined, enabling estimation of distances as described above.

A method of using geometric scene reconstruction for determining relative location differences for objects in a plane whose w coordinate is not zero is now described as illustrated in FIG. 19. FIG. 19 shows an orthographic view of a measurement image with a pane aligned to the horizontal u-axis and the vertical v-axis, shown as rectangle 430, an out of plane ancillary object 432 containing fiducials to the left of the pane, the location of the original image center as circle 437 near the center of the measurement image, and the location of the camera as a second circle 439 below and to the left of the center.

Note that although the inside of rectangle 430 is shown as white in FIG. 19, if the photo of the window is taken at night, the interior of rectangle 430 (i.e. the window pane) will be dark and the two small circles will be against a dark background.

FIG. 19 also shows a view of the scene from above (in the v direction) with the plane of the pane shown as a solid horizontal line 434 in the u-axis direction, the planes of the ancillary object shown as horizontal dashed lines 436 and central projection lines from the camera location (open circle 439) to various points of interest in the scene such as the image center location 437, with the vertical line in the w-axis direction. The distance between the planes is indicated along a vertical dashed line placed at the pane edge location. The location of the ancillary edge of interest is shown in the ancillary plane and its location in the measurement image is shown in the pane plane.

The apparent distance from the pane edge to the ancillary edge of interest is magnified and shifted due to the projection, and means to compute the horizontal location of the ancillary edge of interest is now described. The distance between the fiducials in pixels is measured in the measurement image and the pixels per unit length is calculated using knowledge of the physical distance between fiducial centers. The pixels per unit length of the ancillary object thus measured applies throughout the plane. The ratio of this value to the corresponding value obtained from the reference object forms a scale factor s. This scale factor is related using properties of similar triangles to the ratio of distances from the two planes to the camera and to the ratio of distances of the ancillary object from the camera position, as follows:

$$s = \frac{\Delta c'}{\Delta c} = \frac{\Delta c' + \Delta h + \Delta p}{\Delta c + \Delta p} = \frac{D'}{D' + \Delta d} \quad (10)$$

In this equation, $\Delta d$ is negative when the ancillary object is closer to the camera. The amount of offset due to the projection of the offsetting distance normal to the planes $\Delta h$ is positive when the camera position is inside its location and is negative when the camera position is outside its position as would be expected for a visible or blocked segment respectively. The distance of interest for the measurement of objects in the plane of the ancillary object is $\Delta c$, and its value can be computed using the scale factor s and values that can be measured in the measurement image, where $\Delta p$ is the horizontal distance between the camera location and the pane edge and the sum $(\Delta c' + \Delta h)$ is the horizontal distance between the pane edge and the projected ancillary object edge of interest:

$$\Delta c = \frac{(\Delta c' + \Delta h)}{s} + \left(\frac{1}{s} - 1\right)\Delta p \quad (11)$$

The distance of interest if a depth measurement is desired is $\Delta d$ and its signed value can be computed using the scale factor and the distance of the camera from the pane plane:

$$\Delta d = \left(\frac{1}{s} - 1\right)D' \quad (12)$$

Note that errors in estimating the location of the camera center due to any differences in the 35 mm equivalent focal length used in geometric scene reconstruction or errors in locating points in the scene which would lead to errors in $\Delta p$ are multiplied by $(1/s-1)$, which according to Equation 12 is the ratio of $\Delta d$ to $D'$, a value that is typically small.

In one example, when using symmetry to aid with calculating measurements, a useful input to the algorithm are the vertical and horizontal positions of the capture device with respect to the window. Such information may be obtained from the image by analysis of the image reflected in the windowpane. For example, the software may pre-set the flash setting to fire at the time of capture creating a bright spot with a roughly circular shape, and characteristic intensity falloff with distance within the dark pane of a frontlit scene. Based on these bright spot characteristics and, optionally, the size of the bright spot, the capture device location may be determined. The bright spot position provides a very close estimate of the camera lens location at the time of capture, particularly when a smartphone is used as the capture device. In this case, the distance $\Delta p$ needed to properly calculate the location of the ancillary object using Equation 11 does not require locating the camera position in space, but estimates of the depth are not enabled without geometric scene reconstruction using camera 35 mm equivalent focal length as described above.

When two locations in a plane whose w coordinate is not zero are known to be symmetrically placed horizontally with respect to the horizontal pane center, Equation 11 may be employed on both left (L) and right (R) sides of the pane. Furthermore, since the total distance across the pane $\Delta pL + \Delta pR = p$ is known and since the objects are symmetrically placed so that their distances $\Delta cL$ and $\Delta cR$ from the pane edges are equal, the following system of four linear equations are obtained relating the various distances:

$$\Delta c_L = \frac{(\Delta c'_L + \Delta h_L)}{s} + \left(\frac{1}{s} - 1\right)\Delta p_L \quad (13)$$

$$\Delta c_R = \frac{(\Delta c'_R + \Delta h_R)}{s} + \left(\frac{1}{s} - 1\right)\Delta p_R \quad (14)$$

$$p = \Delta p_L + \Delta p_R \quad (15)$$

$$\Delta c_L = \Delta c_R \quad (16)$$

This system of equations is easily solved to provide a horizontal camera location relative to the pane edge(s) as well as the distance from the pane edges of the symmetrically placed objects. If a rotation vector is obtained using the capture transform as described above, this horizontal location in the w=0 plane is sufficient to determine the vertical location of the camera in the w=0 plane as well as a camera distance from the w=0 plane without employing knowledge of a 35 mm equivalent focal length. Alternately, if an object in a scene lies in a plane not parallel to the w=0 plane, measured distances in that object may be utilized to determine the w locations of features on that object.

Figure 20:
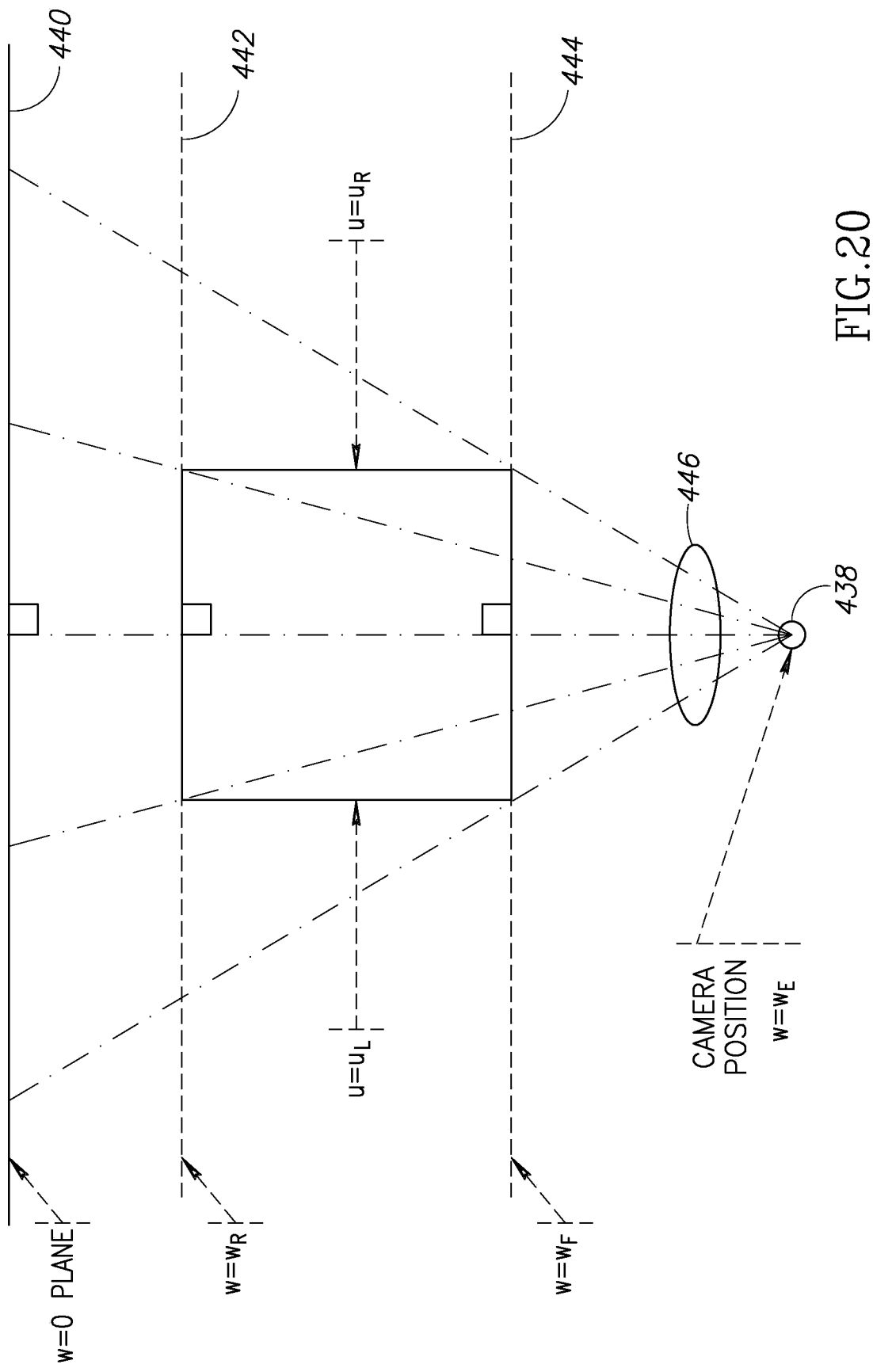
FIG. 20 is a diagram illustrating parameters for camera location determination.

For example, a rectangular object of known dimensions may be placed in a plane in which the vertical location v in world coordinates is constant and is oriented so that two of its sides have constant w coordinates wR (442) and wF (444) and the other two have constant u coordinates uL and uR as shown in FIG. 20. Triangle similarity relations among the lengths of the projections of the front and rear edges indicated by dash-dotted lines 446 and the distances of these edges from the camera location 438 at w=wE given the known dimensions uR−uL and wR−wF permit determination of the camera distance from the w=0 plane (440), again without employing knowledge of a 35 mm focal length. In either of these cases, the distance from the original image center location in the w=0 plane to the camera location in the w=0 plane together with the camera distance from the w=0 plane allow determination of the camera-to-subject distance. This together with the distance across the image along the pivot axis in pixels and the conversion factor between pixel distances and physical distances allow determination of a 35 mm equivalent focal length for the camera which may be used in other scenes not containing symmetry objects or objects with known dimensions placed in planes not parallel to the w=0 plane.

For methods that utilize fiducial patterns or additional objects placed in the scene to aid in finding target objects or locations within an image, it will be appreciated by those skilled in the art that the fiducial patterns may be printed to appear black or any other coloring and the additional objects may be of any coloring that provides sufficient contrast and differentiation relative to the scene of interest. Colored fiducials or objects, especially those having bold, vibrant color, may be helpful to aid with finding objects placed in the scene that are to be used for measurement. Also, use of such colors may be useful when capturing window images when a significant portion of the windowpane has light entering from the outdoors.

The use of colored fiducials or colored ancillary objects may beneficially be used with an image capture device equipped with a depth camera or range finding apparatus and methods, for example such as light detection methods as light detection and ranging (LIDAR), point cloud mapping, time-of-flight, structured light, or simultaneous localization and mapping. Since light ranging methods are often compromised when encountering transparent objects such as windows, the use of objects placed on a windowpane abutting edges or corners where the pane meets the sash or frame can be especially useful. When range finding light, such as infrared light, is detected from such ancillary objects, an accurate distance from image capture device to the windowpane features needed to determine the windowpane dimensions can be obtained, as described above. When using range finding light methods, inertial odometry may optionally be used. When using range finding light methods, use of a reference object is optional.

A fully automated metadata gathering method may be used in which image analysis automatically generates metadata, for example, window orientation based on the location of a windowsill or window treatment attribute, used in subsequent constraint calculation. Metadata that may be useful in the present technology includes the window orientation, window type (e.g., single or double hung, sliding, casement, fixed, etc.), and location and type of object in the image such as a reference object or window treatment and associated control mechanism. In addition to image related metadata, the end user may provide order information, such as payment and delivery information and preferences, at any time during the process prior to submitting an order. End user preferences may include the type of sheet including material composition, optical properties, the number and location of sheets and whether window or window shade operability is desired. Additionally, metadata or constraint calculation accuracy may be confirmed with the end user as part of the process, optionally using the digital image or annotated version of the digital image.

In another example, software incorporated in the capture device, such as CameraSharp, corrects for camera movement at the time of capture or measures the amount of movement and alerts the end user to capture a new image if the movement is found to be above a predetermined threshold. The predetermined threshold may be varied depending upon the size of the reference object used or the ratio of its size to the size of the image captured. Also, it is preferable to keep the exposure time as small as possible while still capturing sufficient light to identify the reference object and constraints in the image. In one example, the exposure time should be less than 0.125 second. Additionally, to inhibit the impact of end user movement during image capture, it is preferred to minimize or remove delay between the end user shutter actuating movement and the actual shutter actuation or to use voice actuation of the shutter. Such exposures may be enabled using software that overrides any device manufacturer incorporated shutter actuation delay.

The digital image undergoes image processing that provides dimensional information for the fenestration, frame and treatments so that appropriately dimensioned custom supplemental parts may be designed and manufactured for installation at the fenestration site. More specifically, an end user, such as the owner or renter of an indoor space having a window or someone hired by such owner or renter, selects a window in that space for modification to decrease optical transparency or heat flow by conduction and/or emission through the fenestration. The end user obtains a digital image of the selected window. The digital image may be obtained using any type of image capture device such as a mobile device containing an image sensor or in communication with an external image sensor (e.g., a webcam), for example a digital still, including rapid multi-exposure digital still, or video camera, a camera phone or smartphone, a laptop computer, a tablet computer or other mobile device.

After obtaining the digital image, the digital image and associated metadata undergo digital image processing. Note that in the case where the digital image processing occurs on a server remote from a hand held mobile device such as a smartphone that captured the image, the digital image is obtained by the mobile device transmitting the image to the server over a network such as the Internet. In the case where the digital image processing occurs on the mobile device that captured the image, the digital image is obtained by well known internal processor communications within the mobile device itself. In the case where the image is sourced from a service provider, the digital image is forwarded over a network to the server performing the digital image processing. Such forwarding may be implemented using any well known technique such as email attachment, ftp transfer, http transfer, etc.

The digital image processing performed on the image and associated metadata may occur in one or more locations depending upon computing power and software availability as well as the extent to which automation is used. In one example, the end user sends the digital image and associated metadata to a service provider. As part of the metadata provided by the end user, the end user may click or tap on lines or objects or use a crop tool to identify locations in the image to be used for calculating constraint dimensions. The end user metadata input may be provided using a software application that prompts the end user for specific information that will aid in calculating the constraint dimensions.

When custom supplemental parts for more than one window is desired by the end user, the end user may indicate aspects of all the windows that are to be the same so that the metadata input by the end user may be less cumbersome and redundant images may be omitted. The software application may also include image comparison capability so that similar windows may be automatically suggested or identified. Such image comparison capability may include identifying windows having the nearly identical dimensions, framing, sash in-frame and tilt lock locations, muntin type and location, and sash handle type and location.

In one example, the service provider uses digital image processing algorithms to determine the dimensions of, for example, the window, window frame or window treatments.

The dimensions are used to design, either automatically or semi-automatically, custom supplemental parts that will fit to the window and/or frame, taking into consideration operability of the window, any window treatment present and end user preference. The design is then used to custom fabricate at least custom supplemental part and means for supporting such custom supplemental part so that at least a portion of the window may be covered. Alternatively, software may be used by the end user so that image processing and calculations may be performed with the capture device. Image processing and/or calculational software may also be used by the end user, service provider and/or fabricator in conjunction with a computing device, store based kiosk or other computing devices or services such as cloud computing services, or any combination thereof.

In one example, metadata regarding the conditions of the image capture at the time of digital image capture are obtained. If the device used to obtain or capture the digital image provides metadata with the digital image, such metadata is used to minimize end user input of metadata. For example, the present technology can beneficially use standard metadata formats such as those governed by Exif, IPTC, XMP, DCMI or PLUS. Such formats provide information that may be useful for applying image corrections including the capture device make and model, orientation/rotation, compression, resolution, flash use, focal length, aperture value, ISO speed and pixel dimension, shutter speed and lighting.

Additional metadata provided by the end user may be provided at the time of image capture or at another time using another digital device such as a computer, kiosk or website. End user metadata may include specific window information if custom supplemental parts are to be provided for more than one window. For example, a window identifier such as "Joe's Bedroom South Wall" might be used to distinguish from "Joe's Bedroom West Wall". Such an identifier may remain with the image through manufacturing of the parts associated with a given window so that the identifier may be printed or embossed on each part associated with that window. Also, the end user may wish to specify what type of custom supplemental part is desired. For example, different types of plastic sheets may be used to cover a window, such as transparent, semi-transparent, opaque, tinted or low-e with variations of solar gain. The plastic sheet may have additional functionality such as a flexible solar cell array as is known in the art, for example as described in U.S. Pat. No. 7,675,057 and U.S. Publication No. 2012/0125419, both of which are incorporated herein by reference in their entirety.

In addition, the end user may provide a manual measurement to aid in the calculation of other dimensions. Depending upon what type of supplemental part is desired by the end user, different sets of mounting surfaces may be used so the user may specify, on the capture device or other device, which surfaces are to be used for mounting as part of the metadata. Manual measurement may be done using devices such as rulers, tape measures and digital measuring devices such as laser distance measuring tools. When providing manual measurements, the end user may specify the length measured along with pixels in the digital image corresponding to the end points of the length measured. In one example, the user may use an ancillary object feature that demarcates a target object measurement point for an end point of a manual measurement. The manual measurement may be confirmed by image processing and analysis methods described above. If the manual measurement significantly differs from the measurement estimated by image processing and analysis, feedback may be provided to the user to manually re-measure the target object dimension. Alternatively, the measurement estimated by image processing and analysis may be provided to the user prior to manual measurement or its input as metadata by the user.

Further, the end user may provide metadata about reference and/or ancillary object dimensions in each image such as location and numerical value dimensions. Methods for facilitating location metadata input may include zoom capability as is known in the art, which may be exemplified by software such as random access JPEG described in U.S. Pat. Nos. 7,038,701, 7,652,595 and 7,847,711 to allow for location identification using the capture device, all of which are incorporated herein by reference in their entirety. Alternatively, the image may be transported to a computer, uploaded to a website or transferred to a kiosk to allow the user to point and click on the reference and/or ancillary objects and enter information about the objects, including physical dimensions or the location of measurement point demarcating features.

The methods described for correcting images of fenestration are particularly useful when used to design custom supplemental parts having means of adjustment or conformable deformation when compressed within the constraint surface dimensions calculated. Deformation means may be incorporated into the custom supplemental parts through the use of continuously deformable means, for example, cantilevers, compressible foam, for example a polymer foam, or tube, or piles. Such conformable compression means may also be used in conjunction with continuous or non-continuous adjustment means such as a snap fit means. The compressible and adjustment means may be used to provide compression fit to more than one depth location of the window frame since there are relatively small differences in the window frame dimensions at different depths within the window frame. Thus, a single set of custom supplemental parts may be used with different constraint surfaces.

In another example of the present technology, measurements from end user provided images may be corrected using lookup tables and camera metadata. The lookup tables may contain camera specific information about distortions (e.g., optical distortions such as lens related distortions) that could lead to measurement errors, including barrel, pincushion or complex distortions. The lookup tables may be based on previous calibration studies for each particular camera.

With image and associated metadata information, relevant constraint surface dimensions are calculated. The calculation of lengths may be done automatically for all possible products and surfaces or may be limited to those selected by the end user/designee provided metadata. Lengths may be automatically calculated based on image information showing consistent continuous surfaces for mounting. Alternatively, a semi-automated method may be used in which such surfaces may be identified from metadata provided by end user/designee or by the service provider with human intervention.

With calculated lengths available from measurement algorithms described supra, custom supplemental parts are then fabricated. Using metadata provided by the end user or designee, appropriate materials are used, cut to size, imprinted with relevant information and packaged. For example, the end user or designee may specify among several options such as overlay or in-frame, adhesive or pressure mounting, location of adhesive mount if chosen, whether window or window blind operability is desired, if multiple sheets are to be used how many and where they are to be mounted. Such metadata may have been provided prior to submission of an order.

Alternatively, the end user or designee may wish to obtain a cost estimate prior to submitting an order. In this case, very rough measurements made prior to any image distortion correction may be used to estimate the materials needed for various supplemental parts so that various options and their associated costs may be provided prior to order submission. With this information, an order may be generated to a centralized fabrication site or multiple distributed fabrication sites. Centralized fabrication entails fabrication of all custom supplemental parts at a single site where the parts may also be assembled for packaging and delivery to the end user. When distributed fabrication is used, each fabricator may fabricate a subset of the parts necessary for full functionality of the delivered product. The subset parts may be sent to an order collation site for packaging and/or assembly of final product parts prior to shipping to the end user. To minimize material waste during fabrication, it may be desirable to compile multiple orders for each subset part to allow for an optimized fabrication run.

It will be appreciated that measurements made by the methods described herein may also be useful for applications that do not lead to fabrication of parts. For example, if the target object in each of a plurality of images is a different wall of the same room, it is possible to obtain the dimensions of a room for real estate, architectural, engineering, or any other purpose. Alternatively, by measuring a dimension of a piece of furniture located remote to a room in which it is desired to place the piece of furniture, it is possible to determine whether the piece of furniture will fit properly within a desired space in the room using the present technology to measure room dimensions. It will also be appreciated that using multiple reference objects residing in different planes and substantially coplanar with target objects that are parallel to the imaging plane may be used to measure multiple target objects that are captured in the same digital image.

Note that measurement of the fenestration or portions thereof may be performed manually or specified and delivered using the methods described herein. These measurement methods may also be used to confirm the accuracy of manual measurements that may be provided to the service provider or fabricator. They also serve to provide feedback to the manual measurement provider regarding accuracy and optionally requesting re-measurement.

The automated measurement methods described herein may be performed using colored objects consisting of a thin, flat piece of paper, plastic or other suitable material, preferably highly colored (e.g., bright yellow, orange, red or other colors) such that the thin, flat material contrasts with the fenestration surroundings and/or the window pane background. The thin, flat material may or may not have a re-adherable strip of low-tack or medium-tack pressure sensitive adhesive. Colored pieces of paper without a re-adherable strip of adhesive, may be applied to the scene to be captured using adhesive tape. Colored pieces of paper with a re-adherable strip of adhesive may also be used. Such papers are commonly known as "repositionable notes", e.g., Post-it® Notes manufactured by 3M Corporation, St. Paul, Minnesota, USA, sticky notes, self-stick notes, etc.). Note that preferably, the colored pieces of paper are either square or rectangular shaped but are not limited thereto.

Such colored papers are used, for example, as (1) any type of ancillary object including (a) pane ancillary objects to identify target object locations (e.g., edges or corners of the pane or sash); (b) sealing interface ancillary objects for identifying the sealing interfaces such as between the sash and the frame; (c) non-transparent target object ancillary objects, such as (i) frame ancillary objects for aiding in identifying window frame edges for measurements, such as inward facing frame or jamb edges or outward facing frame casing edges or (ii) wall ancillary objects for aiding in identifying wall edges or portions of a wall for measurement; (2) adhering objects for adhering the reference object to the window or non-transparent target object to be measured; and (3) contrast providing objects (or simply contrast objects) for providing high contrast between at least one reference object edge and at least one of a non-transparent target object to be measured and a secondary object in the captured digital image. In addition or alternatively to color and shape, ancillary objects, adhering objects and/or contrast objects may have a pattern, for example a fiducial pattern, or entropy as a characteristic.

Note that all ancillary objects used in a scene are preferably the same color. Similarly, it is preferable that all adhering objects used in a scene be the same color. The contrast objects in a scene, however, may be the same or different color. Placement location instructions for adhering objects or contrast objects on the reference object may be provided by a service provider to the end user. By following such instructions, the locations of adhering or contrast objects may be more easily found in the automated measurement methods described.

When using a pane ancillary object to identify an edge or a corner, it is preferable to position the re-adherable strip of the pane ancillary object such that it is adjacent to an edge or corner to be identified by the pane ancillary object with less than about one eighth inch, preferably less than about one sixteenth inch, between the edges of the re-adherable strip and the edge or corner to be identified. When positioned at corners or sash edges of the window pane, the pane ancillary object functions to aid in distinguishing the pane edge from other edges that may appear in the pane area of the image, such as reflections, storm windows or other sash edges that may exist to the exterior of the interior pane surface.

Figure 21:
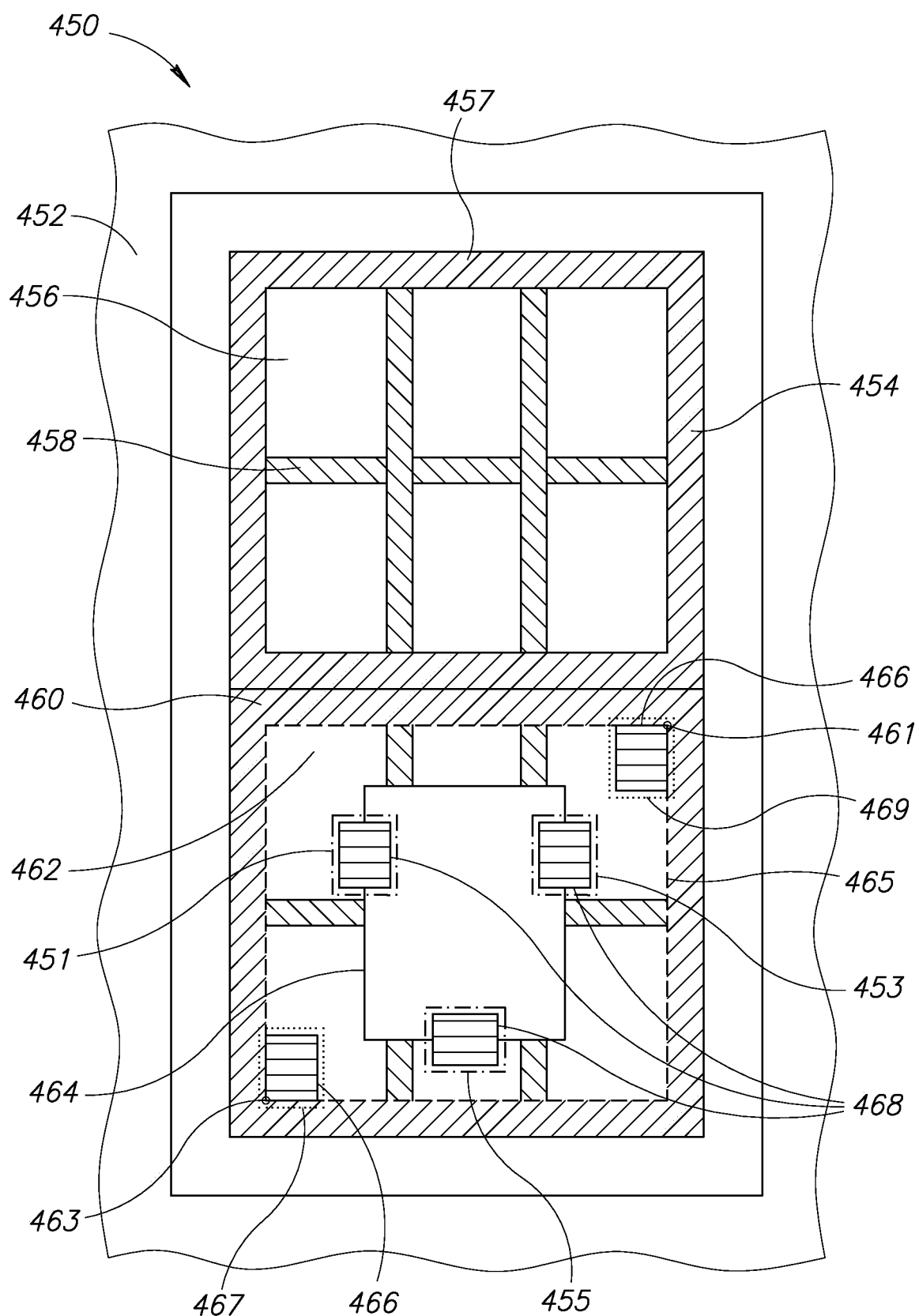
FIG. 21 is a diagram illustrating an example window with reference object, adhering objects and pane ancillary objects.

A diagram illustrating an example window with reference object, adhering objects and pane ancillary objects is shown in FIG. 21. The window, generally referenced 450, comprises a frame casing 454 embedded in a wall 452, top sash 457, top sash window pane 456, muntins 458, bottom sash 460 and bottom sash window pane 462. A reference object 464 is attached to the window via one or more adhering objects 468. One or more pane ancillary objects 466 are attached to the window pane in diagonally opposite corners. Note that the location of adhering objects 468 shown are appropriate for non-protruding muntins. When protruding muntins are present, it is preferable to affix each adhering object to a muntin.

For example, when positioned by a user in diagonal pane corners, as shown in FIG. 21, the corner and edges of the pane ancillary object nearest each pane corner may be used to aid in the determination of the perspective transform applied to the captured image. When using objects, such as pieces of paper, having the same size and color for (1) the adhering object to adhere the reference object to the window (such as the pane or muntins) or other non-transparent target objects to be measured; and for (2) the pane ancillary object, the pixel scale factor obtained from the reference object may be used to determine a dimension of the colored pieces of paper, preferably the dimension along the side having the pressure sensitive adhesive. The preferred dimension along the side having the pressure sensitive adhesive, which is generally a strip about 0.625 inches wide, is in the range of approximately 1 to 4 inches, more preferably about 1.5 to 3 inches.

Figure 22:
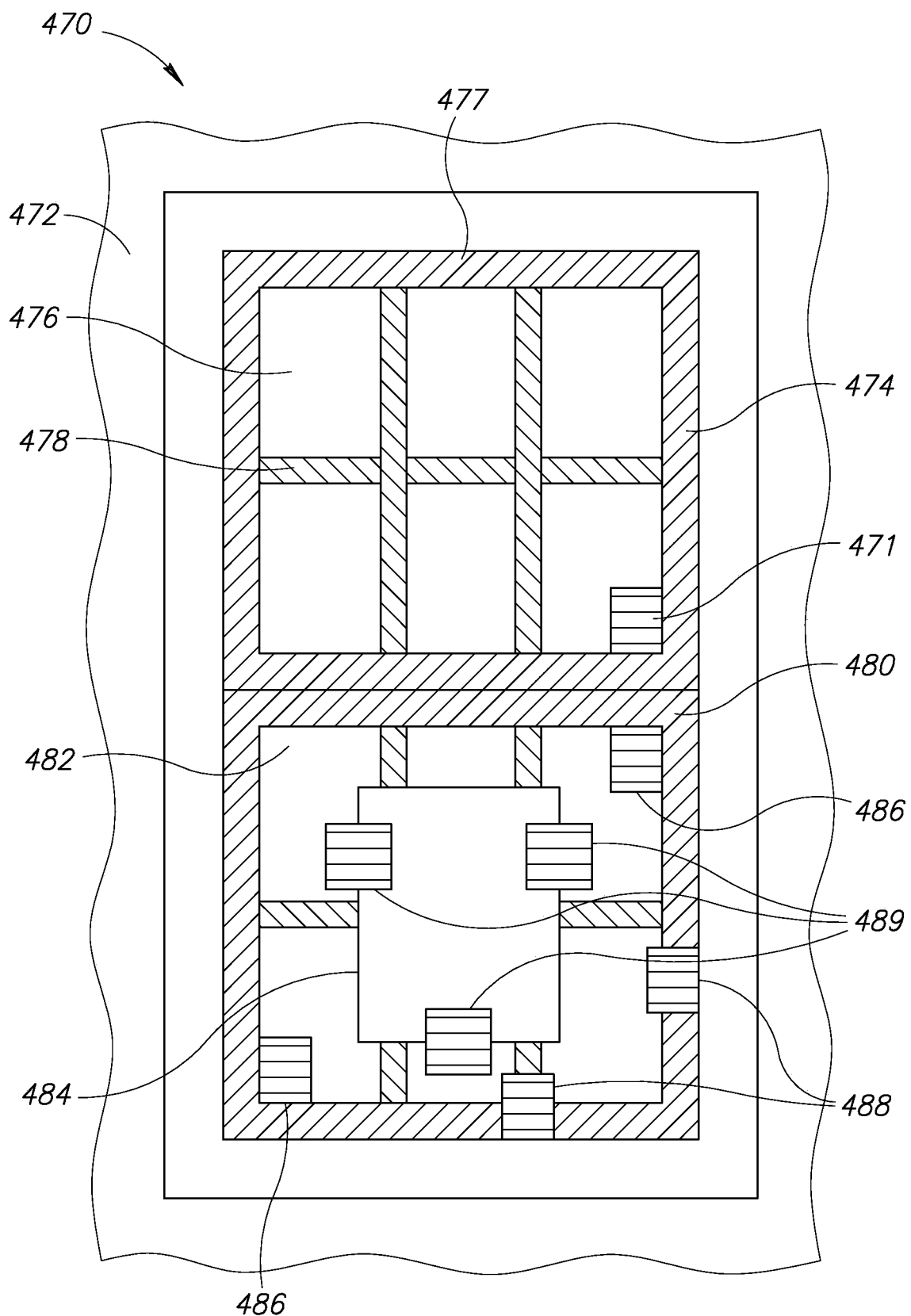
FIG. 22 is a diagram illustrating an example window with reference object, adhering objects, pane ancillary objects and sealing interface ancillary objects.

A diagram illustrating an example window with reference object, adhering objects, pane ancillary objects and sealing interface or inward facing frame and sill ancillary objects is shown in FIG. 22. The window, generally referenced 470, comprises a frame casing 474 embedded in a wall 472, top sash 477, top sash window pane 476, muntins 478, bottom sash 480 and bottom sash window pane 482. A reference object 484 is attached to the window via one or more adhering objects 489. Two or more pane ancillary objects 486 are attached to the window pane in diagonally opposite corners. One or more sealing interface ancillary objects are attached to the sash to aid in determining the location of the sealing interface between the sash and the frame.

When inward facing frame ancillary objects are used, such objects are placed with the adhesive strip along the interface of the sash or interior facing frame and the inward facing frame. While the non-pane ancillary objects are shown at sealing interface or inward facing frame locations, such ancillary objects may also be used to identify the outward frame edges by adhering such ancillary objects to the interior surface of frame 477 with the adhesive strip along the outward edge of the frame or sill.

To find the sealing interface locations identified by sealing interface ancillary objects in FIG. 22, the sealing interface ancillary objects 488 are located in the image. In one example, the sealing interface ancillary objects are found using the methods described herein for locating ancillary objects (i.e. the method of FIG. 25 described infra). In this example, the sealing interface ancillary objects 488 may be distinguished from the pane ancillary object 486 and optional pane ancillary object 471 by their location with respect to the pane and/or the use of user provided metadata (e.g., touch or click locations) to identify the different types of ancillary objects. Optional pane ancillary object 471 on the upper pane may aid in determining the height of the checkrail between the lower and upper panes and/or may aid in determining the location of the upper sash stile to pane edge location to provide more accurate upper pane width measurement. When used solely for determining the checkrail height, pane ancillary object 471 may be placed at any location along the checkrail to upper pane edge. When used to locate the upper pane stile to pane edge, pane ancillary object 471 is placed at the corner of the upper pane as shown in FIG. 22.

In the transformed image, the pixel distance from pane edge parallel to and nearest the sealing interface ancillary object bounding box outwardmost edge is determined and converted to the physical dimension of the sash width. Symmetry may be used to determine additional sealing interface locations. In addition, the placement of similar colored paper ancillary objects can be used to determine inside mounting dimensions for window treatments.

Figure 23:
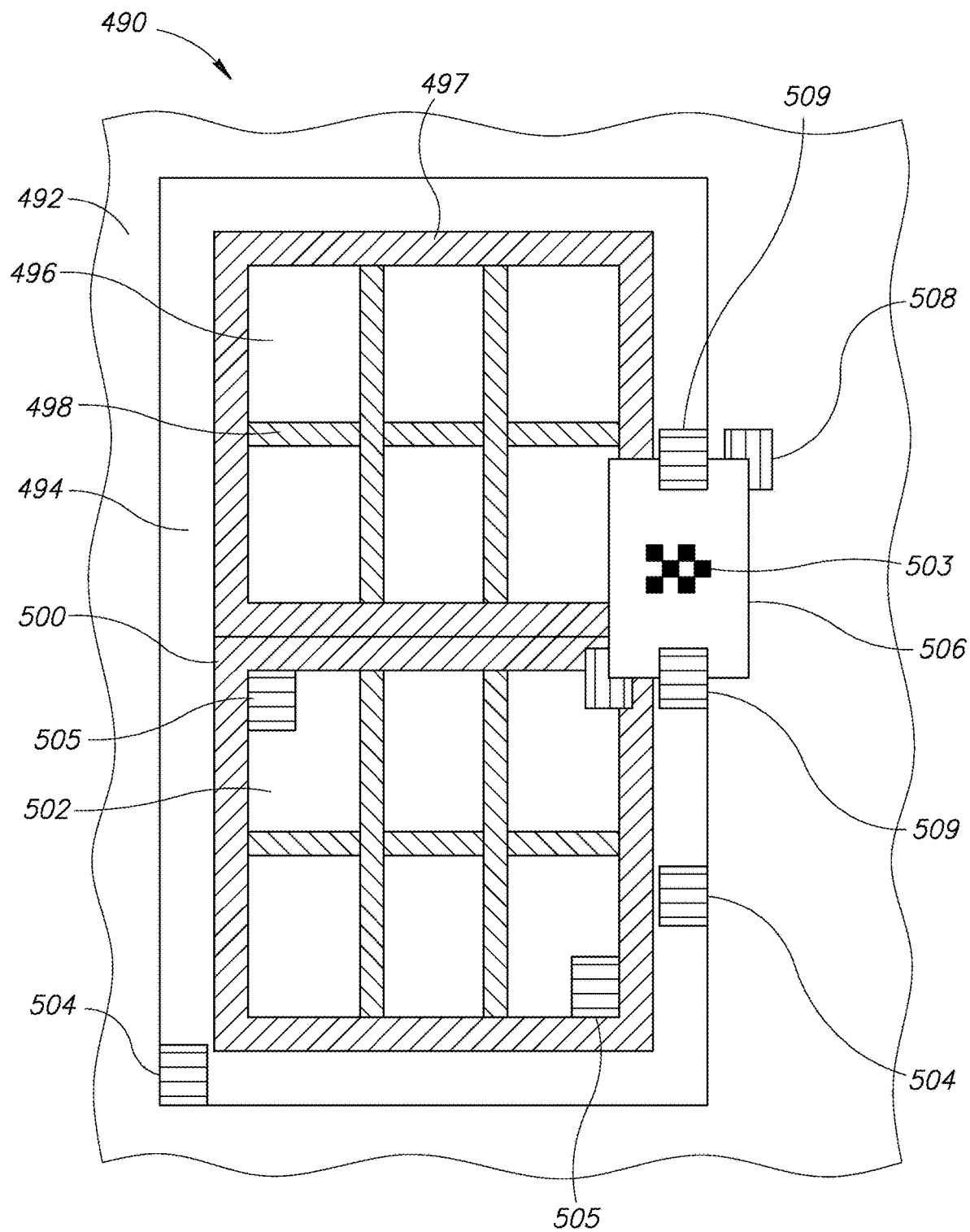
FIG. 23 is a diagram illustrating an example window with reference object on the frame portion of the window, adhering objects, contrast providing objects, ancillary objects and sealing interface ancillary objects.

A diagram illustrating an example window with reference object on the frame portion of the window, adhering objects, contrast providing objects, ancillary objects and sealing interface ancillary objects is shown in FIG. 23. The window, generally referenced 490, comprises a frame casing 494 embedded in a wall 492, top sash 497, top sash window pane 496, muntins 498, bottom sash 500 and bottom sash window pane 502. A reference object 506 is attached to the frame casing 494 via one or more adhering objects 509. One or more contrast providing objects 508 are attached to the back of the reference object (preferably straddling the corners or straddling an edge) and function to provide background contrast between the reference object and the target object and/or secondary object such as the surrounding wall. One or more pane ancillary objects 505 are optionally attached to the window pane in diagonally opposite corners. One or more frame ancillary objects 504 are attached to the window frame to aid in determining the location of and/or measuring the frame.

Figure 24:
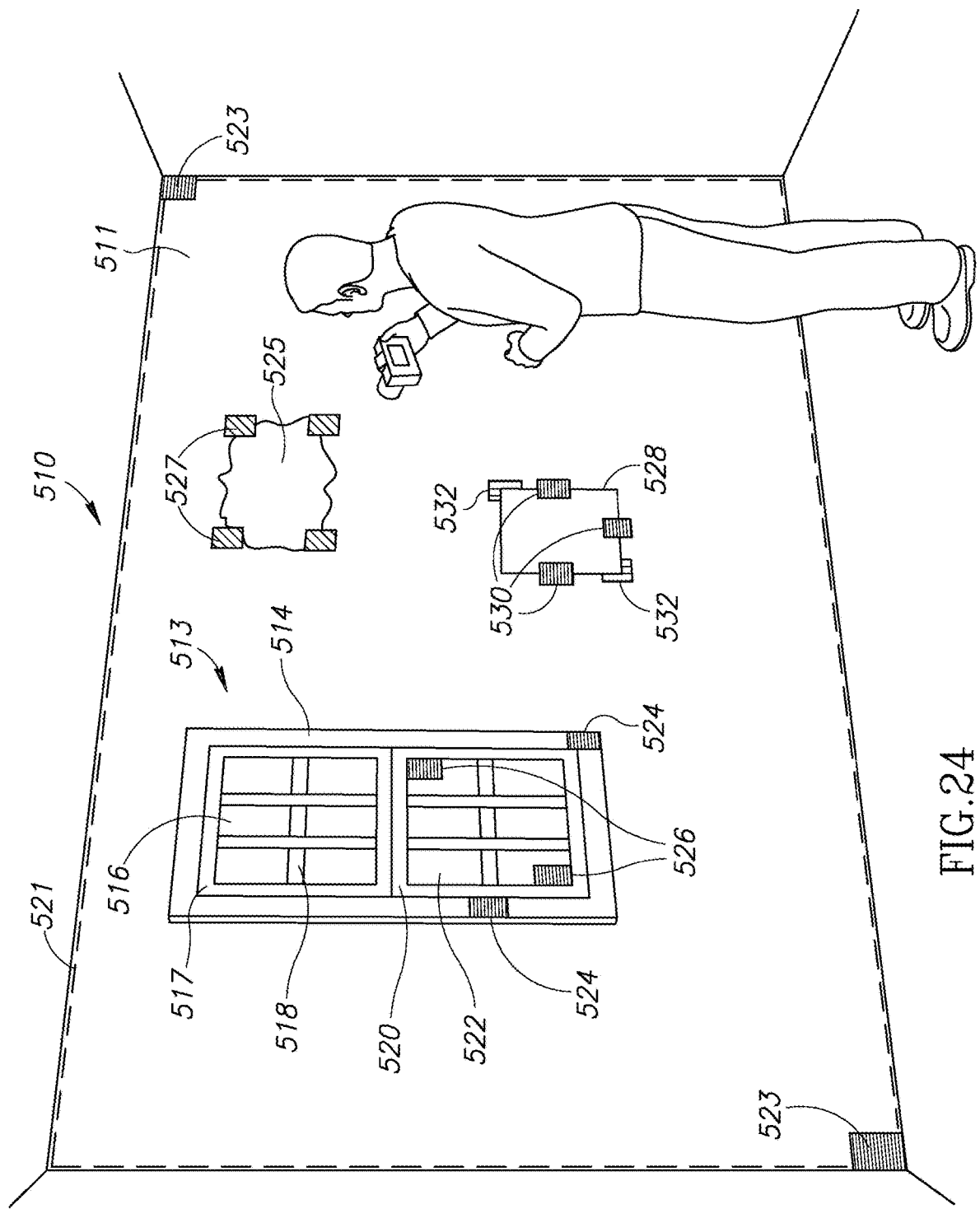
FIG. 24 is a diagram illustrating an example window with reference object on a non-transparent target object, adhering objects, contrast providing objects, ancillary objects and sealing interface ancillary objects.

A diagram illustrating an example window with reference object on a non-transparent target object, adhering objects, contrast providing objects, ancillary objects and sealing interface ancillary objects is shown in FIG. 24. The window, generally referenced 510, comprises a frame casing 514 embedded in a wall 512, top sash 517, top sash window pane 516, muntins 518, bottom sash 520 and bottom sash window pane 522. A reference object 528 is attached to the non-transparent target object 511 (e.g., the wall in this example) via one or more adhering objects 530. One or more contrast providing objects 532 are attached to the back of the reference object (preferably in the corners or straddling an edge) and function to provide background contrast between the reference object and the target object. One or more pane ancillary objects 526 are optionally attached to the window pane in diagonally opposite corners for estimation of window pane dimensions as described supra. One or more frame ancillary objects 524 are optionally attached to the window frame to aid in determining the location of and/or measuring the frame as described supra. Non-transparent target objects may include any regular (i.e. rectangular or circular) or irregular (i.e. arbitrary) shaped objects such as walls, objects hanging on walls, furniture, pictures, holes or openings in walls, etc.

Note that in one example, one or more edges of wall 511 or a portion thereof may be defined with one or more ancillary objects 523. Such a scene may be used for estimating the dimensions and/or area of wall 511 or a portion thereof. Such scenes may be useful, for example, for estimating the amount of paint or wallpaper needed to cover the wall or, if the wall requires repair, the area and/or dimensions to be repaired. As an example, a repair may be required to patch a hole 525 in the wall. In this example, multiple ancillary objects 527 (two upper and two lower) may be placed around the perimeter, such as at the corners or edges, of the hole to aid in estimating the dimensions and/or area of the hole.

FIGS. 23 and 24 illustrate additional uses of colored pieces of paper such as self-adhering notes in the present technology. To aid in determining the reference object pixel scale factor and measuring reference object pixel dimensions, such colored pieces of paper may be used to provide background contrast for the reference object in the event it has low contrast against the non-transparent target object to be measured, (e.g., a sheet of white copier paper against a white or cream colored wall). The colored pieces of paper referred to as contrast providing objects (e.g., self-adhering notes) are placed on the back of the reference object along edges or corners with a portion of the colored piece of paper visible immediately adjacent the edge or corner of the reference object. When used in this manner, mounting of the reference object may be made on non-transparent portions of the fenestration (FIG. 23), next to the fenestration or on any non-transparent target object or surface such as a wall (FIG. 24).

For example, adhering the reference object 506 to the window frame 494 as shown in FIG. 23 is useful when measuring the dimensions of the window frame. Adhering the reference object as shown in FIG. 24 is useful when measuring the dimensions 521 of the wall 511. In either case, pane ancillary objects adhered at diagonal window pane corners may be used to aid with the perspective transform, while frame casing ancillary objects adhered to the window frame aid in identifying window frame edges for measurements. Alternatively, reference object 528, or features on the reference object such as a printed pattern of known aspect ratio, may be used for determining the perspective transform, particularly in cases where no window is present on the wall to be measured. For either of these reference object locations, depth offset correction may be used as described supra for measuring target object dimensions that are slightly offset from the plane to which the reference object is adhered. Such depth offset corrections may be obtained using the methods described supra, incorporating the difference in pixel dimensions found for pane ancillary objects and adhering objects which are the same physical size and that reside in the two substantially parallel planes. Thus, adhering the reference object as shown in FIG. 24 may also be useful for measuring window elements on the same wall as the reference object.

As shown in FIG. 23, the adhering objects 509 may also perform the function of frame ancillary objects for identifying outward frame edge locations. In this case the additional frame ancillary object identifying the same outward frame edge is not needed. Preferably, the contrast providing object 508 has sufficiently high contrast and/or color difference with respect to the target object (e.g., window frame and sashes) and secondary objects (e.g., the wall surrounding the target object and any window treatments that may be present). The contrast providing objects may be the same or different in color and/or size with respect to the adhering objects used to adhere the reference object to an object in the scene. An alternative use of such contrasting pieces of colored paper to provide reference object background contrast is in the measurement of non-transparent target objects having a substantially planar surface such as, for example, walls or portions thereof, cabinetry, furniture or appliances.

When using contrast providing objects to aid in the identification of reference object edge locations, the methods described herein for finding and measuring the reference object pixel scale factor and related dimensions may be used, where the edges defined by the contrast providing objects are used.

Note that the locations of the colored pieces of paper (e.g., repositionable notes) may be found using (1) an image processing algorithm as described in more detail infra; or (2) a combination of (a) an image processing algorithm and (b) user supplied metadata such as pixel locations corresponding to the approximate or exact location of an object of interest (e.g., reference object, pane ancillary object, target object feature, etc.) that is identified by touching, tapping or clicking on the digital image when displayed on a device capable of capturing touched, tapped or clicked pixel locations.

Well-known image processing algorithms or tools generally known as image segmentation algorithms may be used to find objects having similar contiguous characteristics such as color, e.g., k-means clustering or other color based image segmentation methods. In one example, a suitable tool for use with the technology is the magic wand tool supplied in Photoshop or Photoshop Elements commercial software applications available from Adobe Systems Incorporated, San Jose, California, USA.

In an automated or semi-automated example, functions such as those available in OpenCV: cvInrangeS or cvThreshold may be used to threshold an image for color attributes such as hue, saturation or brightness. When using functions for finding specific colors in an image, the image is generally first converted as needed to a suitable color space, for example, RGB, CMYK, Y'CrCb or any other suitable color space, preferably an HSV or a Lab type color space. Thresholding or filtering may then be performed using upper and lower bound for values such as hue, luminance and/or chroma that include the color of the colored object. When using colored repositionable notes of the same color to both adhere the reference object to the fenestration (i.e. adhering objects) and as pane ancillary objects, estimation of the bounds for thresholding or filtering may be aided by first determining the color space values of the objects used to adhere the reference object to the fenestration. Portions of the image not immediately adjacent to the reference object may then be thresholded or filtered for color with similar color space values as those on the adhering objects to identify the location of colored pane ancillary objects. This may be followed by applying a blob finder, for example, using the detect function of the cv::SimpleBlobDetector class to provide colored ancillary object locations. Other OpenCV functions that may be useful include cv2.watershed, cv.findContours and cv.morphologyEx. In one example, the method described at http://stackoverflow.com/questions/11294859/how-to-define-the-markers-for-watershed-in-opencv, incorporated herein by reference in its entirety, may be used in which a grayscale image defined using the distance from a known color using, for example, the distance metric in an HSV or Lab type color space.

When using an automated or semi-automated example using functions for finding specific color in an image, highly saturated colors used for fiducial patterns and ancillary objects are particularly useful when image scenes contain background objects visible through the transparent portion of a window. Such highly saturated colors allow for removal of these background objects in a digital image by setting a saturation threshold of at least about 0.5 (such as 0.5 times 255 for an 8-bit deep image), or a saturation threshold of at least about 0.75, or a saturation threshold of at least about 0.9. Highly saturated colors that may include colors that are not frequently found in nature, such as highly saturated versions of magenta, red, orange or blue.

For example, the watershed function may be used to separate similar objects rather than grouping them into a single component. Markers are used for each object and the background. The input image may be binarized, for example using well-known Otsu's method for performing clustering-based image thresholding or reducing a gray level image to a binary one, and performing morphological opening. A distance transform may be applied to the binary image followed by application of a threshold to provide regions most distant from the background. A marker for each object is obtained by labeling different regions. Each marker is associated with a "colored water" to fill the regions between the objects and the watershed transformation constructs dams to impede merging of the different "colors". The dams composed on the original image then form outlines around the objects.

Methods for measuring colors and determining their similarities and differences may include any such methods known in the art, including Delta CIELAB and Delta CIELCH as well as tolerancing methods in CIELAB, CIELCH, CMC or CIE94, may use spherical or ellipsoidal distances as well as asymmetrical weighting of lightness and hue, as described in, for example, "A Guide to Understanding Color Communication" which can be found on the Internet at http://www.xrite.com/documents/literature/en/L10-001_Understand_Color_en.pdf, incorporated herein by reference in its entirety.

Figure 25:
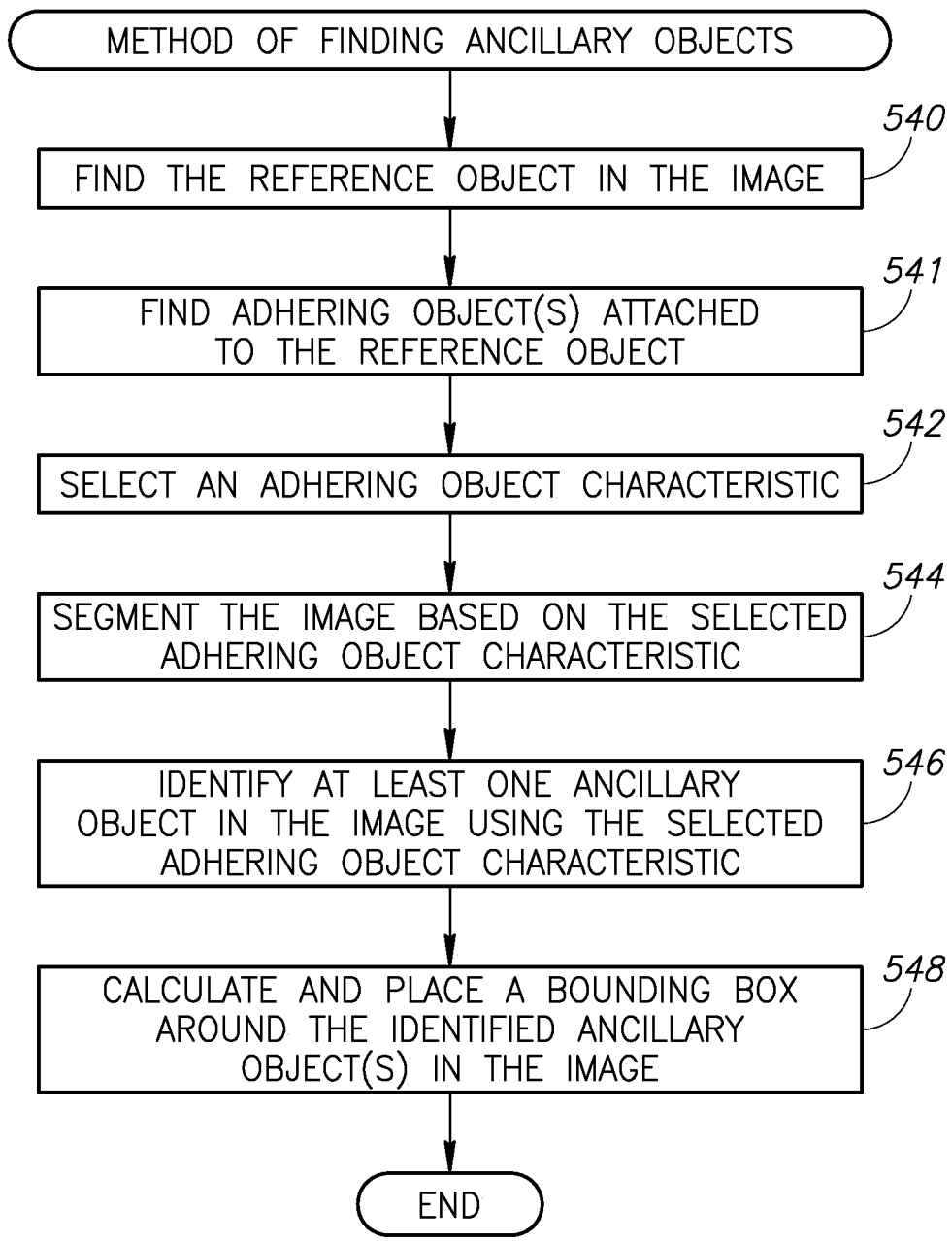
FIG. 25 is a flow diagram illustrating an example method of finding ancillary objects.

A flow diagram illustrating an example method for finding ancillary objects such as self-adhesive notes is shown in FIG. 25. This method may be used to find one or more ancillary objects after placement of the pane ancillary objects on or near the window. The number and location of ancillary objects may vary such that various steps of this method are optional and may be included depending on the particular implementation of the technology.

To find colored paper ancillary objects in an uncorrected or corrected image, the reference object is first found (step 540) using (1) methods described supra (e.g., the method of FIG. 9) using a fiducial 503 (FIG. 23) printed on the reference object; or (2) metadata such as one or more image locations identified by the end user or service provider touching, tapping or clicking on the reference object to provide one or more regions of interest for locating the reference object. When using a reference object having a highly saturated colored fiducial 503, a similar hue for the colored ancillary object may be employed.

Once the reference object is located, the adhering objects are found in the digital image by color and/or shape segmentation of the image (step 541). An adhering object characteristic (e.g., color, shape, etc.) is then selected (step 542). For example, using k-means, the color of the adhering object may be determined. The color is then used to segment the image based on the selected characteristic (e.g., color, shape, etc.) (step 544) to identify one or more ancillary objects (e.g., self-adhesive notes not adhered to the reference object), such as those shown in FIGS. 21 and 22 (step 546). The segmented color not overlapping with the reference object represents the ancillary objects and bounding boxes 467, 469 (FIG. 21) are respectively placed around each found pane ancillary object (step 548). Optionally, end user supplied metadata indicating locations in the digital image may be used with the method illustrated in FIG. 25. Such metadata may be used to provide regions of interest in which to seek the ancillary object selected characteristic (e.g., color). When locating pane ancillary objects, the method illustrated in FIG. 12 may optionally be used to provide a pane bounding box, the edges or corners of which may be used as regions of interest in which to seek the pane ancillary object selected characteristic. Optionally, the reference object width span may be projected horizontally across the image window pane area to find one of the colored ancillary objects and the reference object height span may be projected vertically up or down the image window pane area to find the other colored ancillary object.

When using a second reference object having a second fiducial pattern different from that on the previously described reference object (as described above), the colored ancillary object locations can be used to set a region of interest for finding the second fiducial pattern. For example, an array of highly saturated colored hourglass shapes may be used so that an hourglass template correlation may be used to find the hourglass fiducials directly using an ad-hoc procedure to locate high correlation value points with an appropriate configuration or by using object recognition extraction and/or detection methods as, for example, scale-invariant feature transform, speeded up robust features object detection, fast retina keypoint or binary robust invariant scalable keypoint algorithm.

Figure 26:
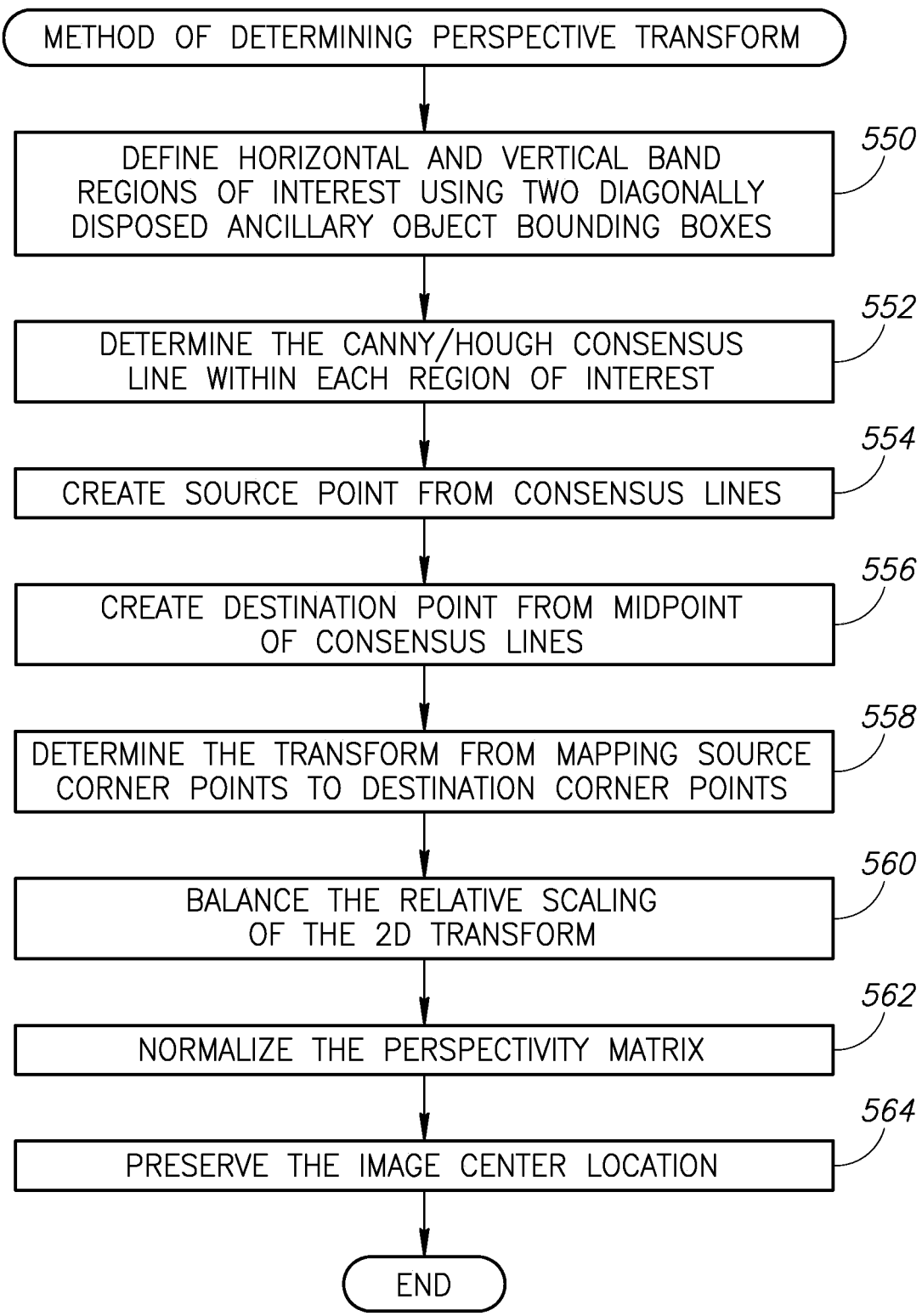
FIG. 26 is a flow diagram illustrating an example method of determining perspective transform.

A flow diagram illustrating an example method for determining perspective transform is shown in FIG. 26. The bounding boxes 467, 469 (FIG. 21) previously found using the method of FIG. 25 are used to define horizontal and vertical band regions of interest near the rectangle 465 defined by the corners of the bounding boxes and the vertical and horizontal bands (step 550). An edge detector, such as the well-known Canny edge detector and probabilistic Hough transform may be used to create a consensus line within each region of interest (step 552). The distorted rectangle formed by the consensus lines provide the source points used to generate a preliminary perspective transform that will result in a rectangle (step 554). Destination points for the preliminary perspective transform are created using the midpoints of each of the edge lines as described supra (step 556). Optionally, the slopes of the consensus lines could be used to generate lines going through the corner points at the pane corners. The resulting transform is designed to map the respective source corners exactly onto the destination corners (step 558). Once the preliminary perspective transform is obtained, it is adjusted so that the center point and center geometric mean scale of the original image is preserved such that the aspect ratio of the reference object is maintained. This is achieved by balancing the relative scaling of the 2D transform (step 560), normalizing the perspectivity matrix (step 562) and preserving the image center location (step 564).

Figure 27:
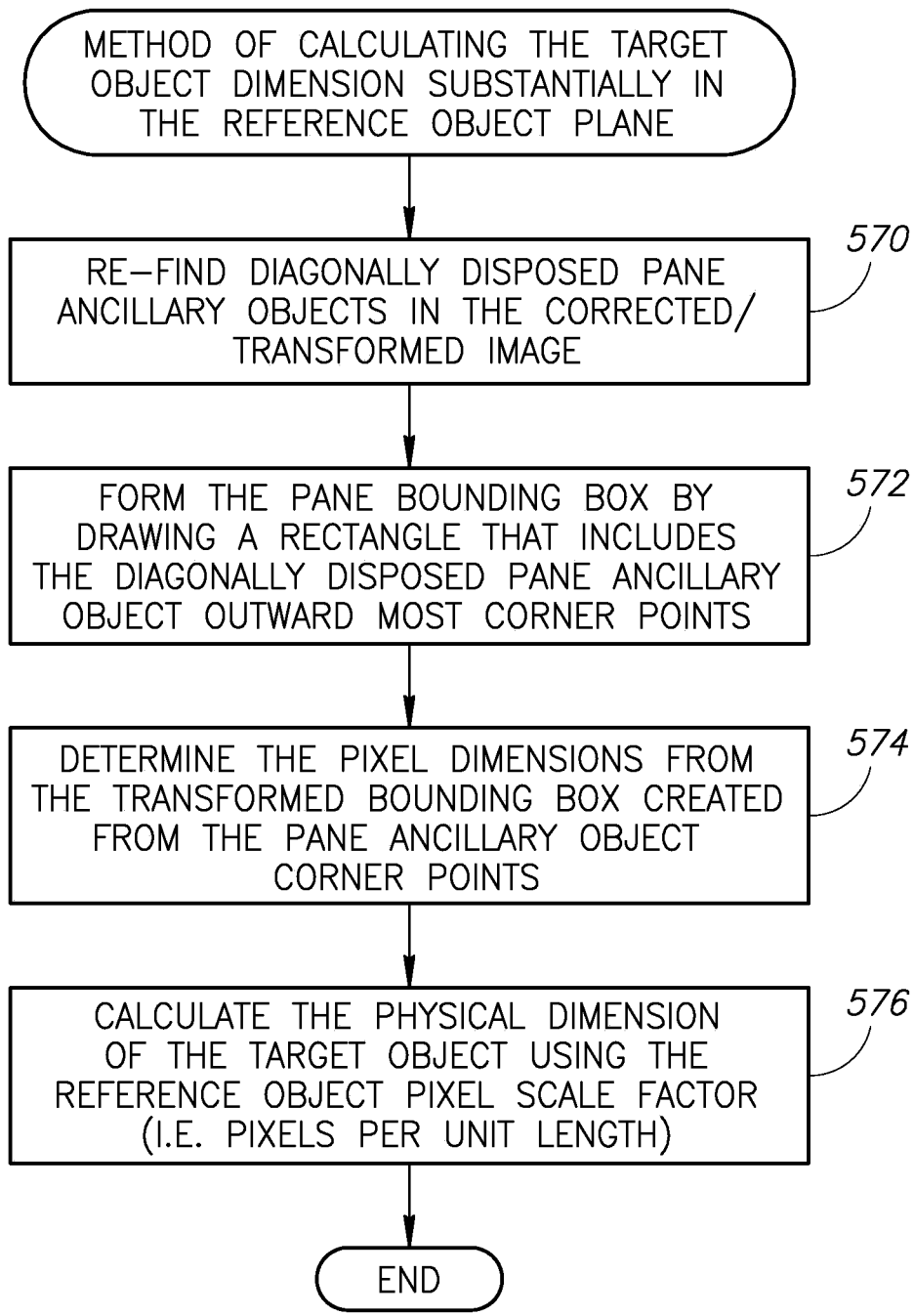
FIG. 27 is a flow diagram illustrating an example method of calculating the target object dimension.

A flow diagram illustrating an example method for calculating target object dimensions is shown in FIG. 27. The self-adhering pane ancillary objects are re-found in the corrected/transformed image (step 570). In one example, this is performed by using their saved locations in the distorted image. A bounding box 465 is drawn that includes the self-adhering pane ancillary object corner points 463, 461 nearest the primary object corners or edges that the ancillary object identifies (step 572). Thus, for ancillary objects placed at diagonal corners of a window pane such as shown in FIG. 21, the resulting bounding box 465 defines the pixel locations of the pane-sash edges. The pixel dimensions of the transformed bounding box 465 created from the pane ancillary objects are then determined (step 574). The pixel dimensions are then converted to the pane physical dimensions using the reference object pixel scale factor (i.e. pixels per unit length) (step 576).

The method for finding ancillary objects illustrated in FIG. 25 may also be used to find ancillary objects used to define non-transparent target objects such as walls or portions thereof. In such cases, an ancillary object edge adhered to the wall may be used to define a wall corner, the edge defined where the wall and floor or the wall and ceiling meet. An alternative, semi-automated, method may be preferred, especially for determining the wall/ceiling edge, in which ancillary objects are used for easily reached edges and a software tool, for example a cropping, marquee or line tool, is used by the end user, service provider or fabricator to identify the ceiling to wall edge in the digital image.

The terminology used herein is for the purpose of describing particular examples only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the technology in the form disclosed. As numerous modifications and changes will readily occur to those skilled in the art, it is intended that the technology not be limited to the limited number of examples described herein.

Accordingly, it will be appreciated that all suitable variations, modifications and equivalents may be resorted to, falling within the spirit and scope of the present technology. The examples were chosen and described in order to best explain the principles of the technology and the practical application, and to enable others of ordinary skill in the art to understand the technology for various examples with various modifications as are suited to the particular use contemplated.

What is claimed is:

1. A method of estimating target object dimensions within digital images, the method implemented by one or more computing devices and comprising:
    obtaining a digital image containing a target object and a first reference object having a first fiducial pattern having a highly saturated color, wherein the first reference object further has at least one of:
        an optical transmittance between about 2 percent and about 80 percent,
        a reflectance between about 15 percent and about 85 percent,
        a diffuse transmittance between about 5 percent and about 65 percent, or
        a direct transmittance less than about 10 percent and another diffuse transmittance greater than the direct transmittance;
    locating the first reference object in the digital image;
    calculating a pixel scale factor for the digital image based on both measured and known dimensions of the first reference object;
    locating the target object in the digital image; and
    calculating a dimension of the target object based on the pixel scale factor.

2. The method according to claim 1, wherein the digital image further comprises one or more ancillary objects, the method further comprises identifying the one or more ancillary objects and a corner or edge thereof in the digital image, and the target object is located in the digital image further based on the corner or edge of the one or more ancillary objects.

3. The method according to claim 2, wherein the one or more ancillary objects are one or more pane ancillary objects or comprise at least one colored object.

4. The method according to claim 1, wherein the first reference object has a first feature located at a known location relative to an edge of the first reference object that is used to calculate the pixel scale factor.

5. The method according to claim 4, wherein the first feature is a line segment.

6. The method according to claim 1, wherein the digital image contains a second reference object and the method further comprises:
    locating the second reference object in the digital image; and
    performing one or more calibrations for the digital image based on the first reference object and the second reference object.

7. The method according to claim 6, wherein the target image comprises a rectangular object, the digital image further comprises a third reference object and a fourth reference object, and each of the first, second, third, and fourth reference objects is located at a respective corner of the target object.

8. The method according to claim 6, wherein the first reference object has a first feature located at a known location relative to an edge of the first reference object, the second reference object has a second feature located at a known location relative to an edge of the second reference object, the first feature is a first line segment, the second feature is a second line segment, and the method further comprises:
    digitally extending each of the first line segment and the second line segment such that the first line segment and the second line segment meet at an intersection point; and
    identifying a corner or an edge area of the target object based on the intersection point of the first line segment and the second line segment.

9. A non-transitory machine readable medium having stored thereon instructions for estimating target object dimensions within digital images comprising executable code that, when executed by one or more processors, causes the one or more processors to:
    obtain a digital image containing a target object and a first reference object having a first fiducial pattern having a highly saturated color, wherein the first reference object further has at least one of:
        an optical transmittance between about 2 percent and about 80 percent,
        a reflectance between about 15 percent and about 85 percent,
        a diffuse transmittance between about 5 percent and about 65 percent, or
        a direct transmittance less than about 10 percent and another diffuse transmittance greater than the direct transmittance;
    locate the first reference object in a digital image;
    calculate a pixel scale factor for the digital image based on both measured and known dimensions of the first reference object;
    locate the target object in the digital image; and
    calculate a dimension of the target object based on the pixel scale factor.

10. The medium according to claim 9, wherein the digital image further comprises one or more ancillary objects, the executable code, when executed by the one or more processors, further causes the one or more processors to identify the one or more ancillary objects and a corner or edge thereof in the digital image, and the target object is located in the digital image further based on the corner or edge of the one or more ancillary objects.

11. The medium according to claim 10, wherein the one or more ancillary objects are one or more pane ancillary objects or comprise at least one colored object.

12. The medium according to claim 9, wherein the first reference object has a first feature located at a known location relative to an edge of the first reference object that is used to calculate the pixel scale factor.

13. The medium according to claim 12, wherein the first feature is a line segment.

14. The medium according to claim 9, wherein the digital image contains a second reference object and the executable code, when executed by the one or more processors, further causes the one or more processors to:

locate the second reference object in the digital image; and perform one or more calibrations for the digital image based on the first reference object and the second reference object.

15. The medium according to claim 14, wherein the target image comprises a rectangular object, the digital image further comprises a third reference object and a fourth reference object, and each of the first, second, third and fourth reference objects is located at a respective corner of the target object.

16. The medium according to claim 14, wherein the first reference object has a first feature located at a known location relative to an edge of the first reference object, the second reference object has a second feature located at a known location relative to an edge of the second reference object, the first feature is a first line segment, the second feature is a second line segment, and the executable code, when executed by the one or more processors, further causes the one or more processors to:

digitally extend each of the first line segment and the second line segment such that the first line segment and the second line segment meet at an intersection point; and identify a corner or an edge area of the target object based on the intersection point of the first line segment and the second line segment.

17. A method implemented by a computing device and comprising:

obtaining a digital image captured by an imaging capture device, the digital image comprising a target object, a reference object, and one or more pane ancillary objects, wherein each of the one or more pane ancillary objects is a colored object having a saturation level;

calculating a pixel scale factor based on measured and known dimensions of the reference object, wherein the reference object has at least one of:
   an optical transmittance between about 2 percent and about 80 percent,
   a reflectance between about 15 percent and about 85 percent,
   a diffuse transmittance between about 5 percent and about 65 percent, or
   a direct transmittance less than about 10 percent and another diffuse transmittance greater than the direct transmittance;

identifying the one or more pane ancillary objects and a corner or edge thereof in the digital image;

locating the target object in the digital image based on the identified corner or edge of the one or more pane ancillary objects; and calculating at least one dimension of the target object in accordance with the pixel scale factor.

18. The method according to claim 17, wherein the one or more pane ancillary objects are highly saturated colored objects.

* * * * *